US008255518B2

(12) United States Patent
Yahiro et al.

(10) Patent No.: US 8,255,518 B2
(45) Date of Patent: Aug. 28, 2012

(54) COMPUTER SYSTEM AND METHOD FOR MONITORING PERFORMANCE OF THE COMPUTER SYSTEM

(75) Inventors: Satomi Yahiro, Yokohama (JP); Hidetaka Sasaki, Yokohama (JP); Hideo Ohata, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 607 days.

(21) Appl. No.: 11/623,809

(22) Filed: Jan. 17, 2007

(65) Prior Publication Data

US 2008/0104248 A1    May 1, 2008

(30) Foreign Application Priority Data

Oct. 26, 2006    (JP) .................................. 2006-291281

(51) Int. Cl.
*G06F 15/173* (2006.01)
(52) U.S. Cl. .......................... 709/224; 709/217; 370/230
(58) Field of Classification Search .......... 709/223–226
See application file for complete search history.

(56) References Cited

U.S. PATENT DOCUMENTS

| 6,505,248 | B1 * | 1/2003 | Casper et al. ................. 709/224 |
| 6,625,648 | B1 * | 9/2003 | Schwaller et al. ............ 709/224 |
| 7,107,273 | B2 | 9/2006 | Ohata et al. |
| 7,194,533 | B1 * | 3/2007 | DeLuca ........................ 709/224 |
| 2004/0193827 | A1 * | 9/2004 | Mogi et al. .................... 711/170 |
| 2005/0119996 | A1 * | 6/2005 | Ohata et al. ....................... 707/3 |

FOREIGN PATENT DOCUMENTS

| JP | 2003-132019 | 5/2003 |
| JP | 2004-104540 | 4/2004 |
| JP | 2005-157933 | 6/2005 |
| JP | 2006-107126 | 4/2006 |

OTHER PUBLICATIONS

Office Action in JP 2006-291281, dated Oct. 4, 2011 (in Japanese, 3 pages); [English language partial translation (3 pages)].

* cited by examiner

*Primary Examiner* — Ian N Moore
*Assistant Examiner* — Jackie Zuniga
(74) *Attorney, Agent, or Firm* — Antonelli, Terry, Stout & Kraus, LLP.

(57) ABSTRACT

Provided is a computer system including a host computer, a storage system connected to the host computer via a network, and a management computer connected to the host computer and the storage system. The management computer obtains performance information indicating performance of resources contained in at least one of the host computer, the storage system, and the network, and obtains pieces of performance information of the resources in a sequence set based on already obtained performance information. This permits solving a problem of the computer system that, when the amount of performance information to be obtained is large. A long time is necessary for detecting a performance problem based on the performance information and investigating its causes.

20 Claims, 35 Drawing Sheets

METRICS VALUE TABLE (HOST SERVER A)

| DATE/TIME | RESOURCE IDENTIFIER | METRICS IDENTIFIER | METRICS VALUE |
|---|---|---|---|
| 2006/06/06 13:00 | FILE A | NUMBER OF I/O TIMES PER SECOND | 1214.5 |
| 2006/06/06 13:00 | FILE B | NUMBER OF I/O TIMES PER SECOND | 1248.5 |
| 2006/06/06 13:00 | FILE C | NUMBER OF I/O TIMES PER SECOND | 1232.5 |
| 2006/06/06 13:00 | FILE D | NUMBER OF I/O TIMES PER SECOND | 1200.5 |
| 2006/06/06 13:00 | FILE E | NUMBER OF I/O TIMES PER SECOND | 1247.8 |
| 2006/06/06 13:00 | FILE F | NUMBER OF I/O TIMES PER SECOND | 1272.5 |
| 2006/06/06 13:00 | FILE G | NUMBER OF I/O TIMES PER SECOND | 1472.5 |
| 2006/06/06 13:00 | VOLUME A | NUMBER OF I/O TIMES PER SECOND | 2200.5 |
| 2006/06/06 13:00 | VOLUME B | NUMBER OF I/O TIMES PER SECOND | 2245.5 |
| 2006/06/06 13:00 | VOLUME C | NUMBER OF I/O TIMES PER SECOND | 2233.5 |
| 2006/06/06 13:00 | PORT A | NUMBER OF I/O TIMES PER SECOND | 1237.3 |
| ... | ... | ... | ... |
| 2006/06/06 18:00 | FILE A | NUMBER OF I/O TIMES PER SECOND | 1248.1 |
| 2006/06/06 18:00 | FILE B | NUMBER OF I/O TIMES PER SECOND | 1214.5 |
| 2006/06/06 18:00 | FILE C | NUMBER OF I/O TIMES PER SECOND | 1223.1 |
| 2006/06/06 18:00 | FILE D | NUMBER OF I/O TIMES PER SECOND | 1125.1 |
| 2006/06/06 18:00 | FILE E | NUMBER OF I/O TIMES PER SECOND | 1236.2 |
| 2006/06/06 18:00 | FILE F | NUMBER OF I/O TIMES PER SECOND | 1268.2 |
| 2006/06/06 18:00 | FILE G | NUMBER OF I/O TIMES PER SECOND | 1465.8 |
| 2006/06/06 18:00 | VOLUME A | NUMBER OF I/O TIMES PER SECOND | 1989.3 |
| 2006/06/06 18:00 | VOLUME B | NUMBER OF I/O TIMES PER SECOND | 2156.3 |
| 2006/06/06 18:00 | VOLUME C | NUMBER OF I/O TIMES PER SECOND | 2224.6 |
| 2006/06/06 18:00 | PORT A | NUMBER OF I/O TIMES PER SECOND | 1253.2 |
| ... | ... | ... | ... |
| 2006/06/06 22:00 | FILE A | NUMBER OF I/O TIMES PER SECOND | 1256.2 |
| 2006/06/06 22:00 | FILE B | NUMBER OF I/O TIMES PER SECOND | 1236.2 |
| 2006/06/06 22:00 | FILE C | NUMBER OF I/O TIMES PER SECOND | 1210.3 |
| 2006/06/06 22:00 | FILE D | NUMBER OF I/O TIMES PER SECOND | 1198.2 |
| 2006/06/06 22:00 | FILE E | NUMBER OF I/O TIMES PER SECOND | 1245.8 |
| 2006/06/06 22:00 | FILE F | NUMBER OF I/O TIMES PER SECOND | 1267.9 |
| 2006/06/06 22:00 | FILE G | NUMBER OF I/O TIMES PER SECOND | 1458.2 |
| 2006/06/06 22:00 | VOLUME A | NUMBER OF I/O TIMES PER SECOND | 2004.5 |
| 2006/06/06 22:00 | VOLUME B | NUMBER OF I/O TIMES PER SECOND | 2175.3 |
| 2006/06/06 22:00 | VOLUME C | NUMBER OF I/O TIMES PER SECOND | 2245.3 |
| 2006/06/06 22:00 | PORT A | NUMBER OF I/O TIMES PER SECOND | 1245.6 |
| ... | ... | ... | ... |

FIG. 5

APPLICATION-FILE RELATION TABLE (HOST SERVER A)

| APPLICATION IDENTIFIER | FILE IDENTIFIER |
| --- | --- |
| APPLICATION A | FILE A |
| APPLICATION A | FILE B |
| APPLICATION A | FILE C |
| APPLICATION B | FILE D |
| APPLICATION B | FILE E |
| APPLICATION C | FILE F |
| APPLICATION C | FILE G |

*FIG. 6A*

FILE-VOLUME RELATION TABLE (HOST SERVER A)

| FILE IDENTIFIER | VOLUME IDENTIFIER |
|---|---|
| FILE A | VOLUME A |
| FILE B | VOLUME A |
| FILE C | VOLUME A |
| FILE D | VOLUME B |
| FILE E | VOLUME B |
| FILE F | VOLUME C |
| FILE G | VOLUME C |

*FIG. 6B*

VOLUME-LOGICAL VOLUME-PORT RELATION TABLE (HOST SERVER A)

| VOLUME IDENTIFIER | LOGICAL VOLUME IDENTIFIER | HOST SIDE PORT IDENTIFIER | STORAGE SIDE PORT IDENTIFIER |
|---|---|---|---|
| VOLUME A | LOGICAL VOLUME A | PORT A | PORT N |
| VOLUME B | LOGICAL VOLUME B | PORT A | PORT N |
| VOLUME C | LOGICAL VOLUME C | PORT A | PORT O |

*FIG. 6C*

COLLECTION PRIORITY TABLE (HOST SERVER A)

| RESOURCE IDENTIFIER | COLLECTION PRIORITY |
|---|---|
| FILE A | LOW |
| FILE B | LOW |
| FILE C | LOW |
| FILE D | LOW |
| FILE E | LOW |
| FILE F | HIGH B |
| FILE G | HIGH B |
| VOLUME A | LOW |
| VOLUME B | LOW |
| VOLUME C | HIGH B |
| PORT A | HIGH B |

FIG. 7

THRESHOLD SETTING INFORMATION TABLE (HOST SERVER A)

| RESOURCE IDENTIFIER | METRICS IDENTIFIER | CONDITION |
|---|---|---|
| PORT A | NUMBER OF I/O TIMES PER SECOND | NUMBER OF I/O TIMES PER SECOND< 1100 |

FIG. 8

METRICS VALUE TABLE (HOST SERVER B)

| DATE/TIME | RESOURCE IDENTIFIER | METRICS IDENTIFIER | METRICS VALUE |
|---|---|---|---|
| 2006/06/06 13:00 | FILE H | NUMBER OF I/O TIMES PER SECOND | 1214.5 |
| 2006/06/06 13:00 | FILE I | NUMBER OF I/O TIMES PER SECOND | 1248.5 |
| 2006/06/06 13:00 | FILE J | NUMBER OF I/O TIMES PER SECOND | 1232.5 |
| 2006/06/06 13:00 | VOLUME D | NUMBER OF I/O TIMES PER SECOND | 2200.5 |
| 2006/06/06 13:00 | PORT B | NUMBER OF I/O TIMES PER SECOND | 1237.5 |
| ... | ... | ... | ... |
| 2006/06/06 18:00 | FILE H | NUMBER OF I/O TIMES PER SECOND | 1225.3 |
| 2006/06/06 18:00 | FILE I | NUMBER OF I/O TIMES PER SECOND | 1235.2 |
| 2006/06/06 18:00 | FILE J | NUMBER OF I/O TIMES PER SECOND | 1256.2 |
| 2006/06/06 18:00 | VOLUME D | NUMBER OF I/O TIMES PER SECOND | 1198.3 |
| 2006/06/06 18:00 | PORT B | NUMBER OF I/O TIMES PER SECOND | 1243.3 |
| ... | ... | ... | ... |
| 2006/06/06 22:00 | FILE H | NUMBER OF I/O TIMES PER SECOND | 1204.5 |
| 2006/06/06 22:00 | FILE I | NUMBER OF I/O TIMES PER SECOND | 1247.3 |
| 2006/06/06 22:00 | FILE J | NUMBER OF I/O TIMES PER SECOND | 1225.3 |
| 2006/06/06 22:00 | VOLUME D | NUMBER OF I/O TIMES PER SECOND | 2201.5 |
| 2006/06/06 22:00 | PORT B | NUMBER OF I/O TIMES PER SECOND | 1245.3 |
| ... | ... | ... | ... |

FIG. 9

APPLICATION-FILE RELATION TABLE (HOST SERVER B)

| APPLICATION IDENTIFIER 1001 | FILE IDENTIFIER 1002 |
|---|---|
| APPLICATION D | FILE H |
| APPLICATION D | FILE I |
| APPLICATION D | FILE J |

Table 1000

*FIG. 10A*

FILE-VOLUME RELATION TABLE (HOST SERVER B)

| FILE IDENTIFIER 1011 | VOLUME IDENTIFIER 1012 |
|---|---|
| FILE H | VOLUME D |
| FILE I | VOLUME D |
| FILE J | VOLUME D |

Table 1010

*FIG. 10B*

VOLUME-LOGICAL VOLUME-PORT RELATION TABLE (HOST SERVER B)

| VOLUME IDENTIFIER 1021 | LOGICAL VOLUME IDENTIFIER 1022 | HOST SIDE PORT IDENTIFIER 1023 | STORAGE SIDE PORT IDENTIFIER 1024 |
|---|---|---|---|
| VOLUME D | LOGICAL VOLUME D | PORT B | PORT P |

Table 1020

*FIG. 10C*

COLLECTION PRIORITY TABLE (HOST SERVER A)

| RESOURCE IDENTIFIER | COLLECTION PRIORITY |
|---|---|
| FILE H | HIGH A |
| FILE I | HIGH A |
| FILE J | HIGH A |
| VOLUME D | HIGH A |
| PORT B | HIGH A |

*FIG. 11*

THRESHOLD SETTING INFORMATION TABLE (HOST SERVER B)

| RESOURCE IDENTIFIER | METRICS IDENTIFIER | CONDITION |
|---|---|---|
| PORT B | NUMBER OF I/O TIMES PER SECOND | NUMBER OF I/O TIMES PER SECOND< 1100 |

*FIG. 12*

METRICS VALUE TABLE (SAN SWITCH)

| DATE/TIME | RESOURCE IDENTIFIER | METRICS IDENTIFIER | METRICS VALUE |
|---|---|---|---|
| 2006/06/06 13:00 | PORT C | NUMBER OF I/O TIMES PER SECOND | 1213.6 |
| 2006/06/06 13:00 | PORT D | NUMBER OF I/O TIMES PER SECOND | 1247.5 |
| 2006/06/06 13:00 | PORT E | NUMBER OF I/O TIMES PER SECOND | 1252.3 |
| 2006/06/06 13:00 | PORT F | NUMBER OF I/O TIMES PER SECOND | 1236.5 |
| 2006/06/06 13:00 | PORT G | NUMBER OF I/O TIMES PER SECOND | 1224.3 |
| 2006/06/06 13:00 | PORT K | NUMBER OF I/O TIMES PER SECOND | 1212.3 |
| 2006/06/06 13:00 | PORT M | NUMBER OF I/O TIMES PER SECOND | 1452.3 |
| ... | ... | ... | ... |
| 2006/06/06 18:00 | PORT C | NUMBER OF I/O TIMES PER SECOND | 1215.3 |
| 2006/06/06 18:00 | PORT D | NUMBER OF I/O TIMES PER SECOND | 1265.3 |
| 2006/06/06 18:00 | PORT E | NUMBER OF I/O TIMES PER SECOND | 1245.6 |
| 2006/06/06 18:00 | PORT F | NUMBER OF I/O TIMES PER SECOND | 1243.6 |
| 2006/06/06 18:00 | PORT G | NUMBER OF I/O TIMES PER SECOND | 1235.2 |
| 2006/06/06 18:00 | PORT K | NUMBER OF I/O TIMES PER SECOND | 1425.6 |
| 2006/06/06 18:00 | PORT M | NUMBER OF I/O TIMES PER SECOND | 1245.7 |
| ... | ... | ... | ... |
| 2006/06/06 22:00 | PORT C | NUMBER OF I/O TIMES PER SECOND | 1214.5 |
| 2006/06/06 22:00 | PORT D | NUMBER OF I/O TIMES PER SECOND | 1253.3 |
| 2006/06/06 22:00 | PORT E | NUMBER OF I/O TIMES PER SECOND | 1248.3 |
| 2006/06/06 22:00 | PORT F | NUMBER OF I/O TIMES PER SECOND | 1278.8 |
| 2006/06/06 22:00 | PORT G | NUMBER OF I/O TIMES PER SECOND | 1289.6 |
| 2006/06/06 22:00 | PORT K | NUMBER OF I/O TIMES PER SECOND | 1286.3 |
| 2006/06/06 22:00 | PORT M | NUMBER OF I/O TIMES PER SECOND | 1425.3 |
| ... | ... | ... | ... |

*FIG. 13*

INTERPORT COMMUNICATION PATH TABLE (SAN SWITCH)

| HOST SIDE PORT IDENTIFIER (1401) | STORAGE SIDE PORT IDENTIFIER (1402) | SWITCH PORT IDENTIFIER LIST (1403) |
|---|---|---|
| PORT A | PORT N | { PORT C, PORT D, PORT H, PORT I } |
| PORT A | PORT O | { PORT C, PORT E, PORT J, PORT L } |
| PORT B | PORT P | { PORT F, PORT G, PORT K, PORT M } |

*FIG. 14*

COLLECTION PRIORITY TABLE (SAN SWITCH)

| RESOURCE IDENTIFIER (1501) | COLLECTION PRIORITY (1502) |
|---|---|
| PORT C | HIGH B |
| PORT D | LOW |
| PORT E | HIGH B |
| PORT F | HIGH A |
| PORT G | HIGH A |
| PORT H | LOW |
| PORT I | LOW |
| PORT J | HIGH B |
| PORT K | HIGH A |
| PORT L | HIGH B |
| PORT M | HIGH A |

*FIG. 15*

THRESHOLD SETTING INFORMATION TABLE (SAN SWITCH)

| RESOURCE IDENTIFIER (1601) | METRICS IDENTIFIER (1602) | CONDITION (1603) |
|---|---|---|
| PORT C | NUMBER OF I/O TIMES PER SECOND | NUMBER OF I/O TIMES PER SECOND< 1100 |

*FIG. 16*

METRICS VALUE TABLE (STORAGE SUBSYSTEM)

| DATE/TIME | RESOURCE IDENTIFIER | METRICS IDENTIFIER | METRICS VALUE |
|---|---|---|---|
| 2006/06/06 13:00 | PORT N | NUMBER OF I/O TIMES PER SECOND | 1215.6 |
| 2006/06/06 13:00 | PORT O | NUMBER OF I/O TIMES PER SECOND | 1253.3 |
| 2006/06/06 13:00 | PORT P | NUMBER OF I/O TIMES PER SECOND | 1100.2 |
| 2006/06/06 13:00 | LOGICAL VOLUME A | NUMBER OF I/O TIMES PER SECOND | 1199.3 |
| 2006/06/06 13:00 | LOGICAL VOLUME B | NUMBER OF I/O TIMES PER SECOND | 1238.7 |
| 2006/06/06 13:00 | LOGICAL VOLUME C | NUMBER OF I/O TIMES PER SECOND | 1268.9 |
| 2006/06/06 13:00 | LOGICAL VOLUME D | NUMBER OF I/O TIMES PER SECOND | 1425.3 |
| 2006/06/06 13:00 | PARITY GROUP A | NUMBER OF I/O TIMES PER SECOND | 1198.5 |
| 2006/06/06 13:00 | PARITY GROUP B | NUMBER OF I/O TIMES PER SECOND | 2238.9 |
| ... | ... | ... | ... |
| 2006/06/06 18:00 | PORT N | NUMBER OF I/O TIMES PER SECOND | 1217.5 |
| 2006/06/06 18:00 | PORT O | NUMBER OF I/O TIMES PER SECOND | 1242.3 |
| 2006/06/06 18:00 | PORT P | NUMBER OF I/O TIMES PER SECOND | 1112.3 |
| 2006/06/06 18:00 | LOGICAL VOLUME A | NUMBER OF I/O TIMES PER SECOND | 1200.5 |
| 2006/06/06 18:00 | LOGICAL VOLUME B | NUMBER OF I/O TIMES PER SECOND | 1238.6 |
| 2006/06/06 18:00 | LOGICAL VOLUME C | NUMBER OF I/O TIMES PER SECOND | 1268.7 |
| 2006/06/06 18:00 | LOGICAL VOLUME D | NUMBER OF I/O TIMES PER SECOND | 1468.7 |
| 2006/06/06 18:00 | PARITY GROUP A | NUMBER OF I/O TIMES PER SECOND | 2200.4 |
| 2006/06/06 18:00 | PARITY GROUP B | NUMBER OF I/O TIMES PER SECOND | 2236.8 |
| ... | ... | ... | ... |
| 2006/06/06 22:00 | PORT N | NUMBER OF I/O TIMES PER SECOND | 1213.2 |
| 2006/06/06 22:00 | PORT O | NUMBER OF I/O TIMES PER SECOND | 1247.9 |
| 2006/06/06 22:00 | PORT P | NUMBER OF I/O TIMES PER SECOND | 1223.3 |
| 2006/06/06 22:00 | LOGICAL VOLUME A | NUMBER OF I/O TIMES PER SECOND | 1177.2 |
| 2006/06/06 22:00 | LOGICAL VOLUME B | NUMBER OF I/O TIMES PER SECOND | 1253.8 |
| 2006/06/06 22:00 | LOGICAL VOLUME C | NUMBER OF I/O TIMES PER SECOND | 1267.2 |
| 2006/06/06 22:00 | LOGICAL VOLUME D | NUMBER OF I/O TIMES PER SECOND | 1369.4 |
| 2006/06/06 22:00 | PARITY GROUP A | NUMBER OF I/O TIMES PER SECOND | 2211.4 |
| 2006/06/06 22:00 | PARITY GROUP B | NUMBER OF I/O TIMES PER SECOND | 2238.7 |
| ... | ... | ... | ... |

*FIG. 17*

LOGICAL VOLUME-PARITY GROUP RELATION TABLE (STORAGE SUBSYSTEM)

| LOGICAL VOLUME IDENTIFIER | PARITY GROUP IDENTIFIER |
|---|---|
| LOGICAL VOLUME A | PARITY GROUP A |
| LOGICAL VOLUME B | PARITY GROUP A |
| LOGICAL VOLUME C | PARITY GROUP B |
| LOGICAL VOLUME D | PARITY GROUP B |

FIG. 18

COLLECTION PRIORITY TABLE (STORAGE SUBSYSTEM)

| RESOURCE IDENTIFIER | COLLECTION PRIORITY |
|---|---|
| PORT N | LOW |
| PORT O | HIGH B |
| PORT P | HIGH A |
| LOGICAL VOLUME A | LOW |
| LOGICAL VOLUME B | LOW |
| LOGICAL VOLUME C | HIGH B |
| LOGICAL VOLUME D | HIGH A |
| PARITY GROUP A | LOW |
| PARITY GROUP B | HIGH A |

FIG. 19

THRESHOLD SETTING INFORMATION TABLE (STORAGE SUBSYSTEM)

| RESOURCE IDENTIFIER | METRICS IDENTIFIER | CONDITION |
|---|---|---|
| PORT C | NUMBER OF I/O TIMES PER SECOND | NUMBER OF I/O TIMES PER SECOND< 1100 |

FIG. 20

METRICS VALUE TABLE (MANAGEMENT SOFTWARE) 2100

| DATE/TIME | RESOURCE IDENTIFIER | METRICS IDENTIFIER | METRICS VALUE |
|---|---|---|---|
| 2006/06/06 13:00 | FILE H | NUMBER OF I/O TIMES PER SECOND | 1214.5 |
| 2006/06/06 13:00 | FILE I | NUMBER OF I/O TIMES PER SECOND | 1248.5 |
| 2006/06/06 13:00 | FILE J | NUMBER OF I/O TIMES PER SECOND | 1232.5 |
| 2006/06/06 13:00 | VOLUME D | NUMBER OF I/O TIMES PER SECOND | 2200.5 |
| 2006/06/06 13:00 | PORT B | NUMBER OF I/O TIMES PER SECOND | 1237.5 |
| 2006/06/06 13:00 | PORT F | NUMBER OF I/O TIMES PER SECOND | 1236.5 |
| 2006/06/06 13:00 | PORT G | NUMBER OF I/O TIMES PER SECOND | 1224.3 |
| 2006/06/06 13:00 | PORT K | NUMBER OF I/O TIMES PER SECOND | 1212.3 |
| 2006/06/06 13:00 | PORT M | NUMBER OF I/O TIMES PER SECOND | 1452.3 |
| 2006/06/06 13:00 | PORT P | NUMBER OF I/O TIMES PER SECOND | 1100.2 |
| 2006/06/06 13:00 | LOGICAL VOLUME D | NUMBER OF I/O TIMES PER SECOND | 1425.3 |
| 2006/06/06 13:00 | PARITY GROUP B | NUMBER OF I/O TIMES PER SECOND | 2238.9 |
| ... | ... | ... | ... |
| 2006/06/06 18:00 | FILE H | NUMBER OF I/O TIMES PER SECOND | 1225.3 |
| 2006/06/06 18:00 | FILE I | NUMBER OF I/O TIMES PER SECOND | 1235.2 |
| 2006/06/06 18:00 | FILE J | NUMBER OF I/O TIMES PER SECOND | 1256.2 |
| 2006/06/06 18:00 | VOLUME D | NUMBER OF I/O TIMES PER SECOND | 1198.3 |
| 2006/06/06 18:00 | PORT B | NUMBER OF I/O TIMES PER SECOND | 1243.3 |
| 2006/06/06 18:00 | PORT F | NUMBER OF I/O TIMES PER SECOND | 1243.6 |
| 2006/06/06 18:00 | PORT G | NUMBER OF I/O TIMES PER SECOND | 1235.2 |
| 2006/06/06 18:00 | PORT K | NUMBER OF I/O TIMES PER SECOND | 1425.6 |
| 2006/06/06 18:00 | PORT M | NUMBER OF I/O TIMES PER SECOND | 1245.7 |
| 2006/06/06 18:00 | PORT P | NUMBER OF I/O TIMES PER SECOND | 1112.3 |
| 2006/06/06 18:00 | LOGICAL VOLUME D | NUMBER OF I/O TIMES PER SECOND | 1468.7 |
| 2006/06/06 18:00 | PARITY GROUP B | NUMBER OF I/O TIMES PER SECOND | 2236.8 |
| ... | ... | ... | ... |
| 2006/06/06 22:00 | FILE H | NUMBER OF I/O TIMES PER SECOND | 1204.5 |
| 2006/06/06 22:00 | FILE I | NUMBER OF I/O TIMES PER SECOND | 1247.3 |
| 2006/06/06 22:00 | FILE J | NUMBER OF I/O TIMES PER SECOND | 1225.3 |
| 2006/06/06 22:00 | VOLUME D | NUMBER OF I/O TIMES PER SECOND | 2201.5 |
| 2006/06/06 22:00 | PORT B | NUMBER OF I/O TIMES PER SECOND | 1245.3 |
| 2006/06/06 22:00 | PORT F | NUMBER OF I/O TIMES PER SECOND | 1278.8 |
| 2006/06/06 22:00 | PORT G | NUMBER OF I/O TIMES PER SECOND | 1289.6 |
| 2006/06/06 22:00 | PORT K | NUMBER OF I/O TIMES PER SECOND | 1286.3 |
| 2006/06/06 22:00 | PORT M | NUMBER OF I/O TIMES PER SECOND | 1425.3 |
| 2006/06/06 22:00 | PORT P | NUMBER OF I/O TIMES PER SECOND | 1245.3 |
| 2006/06/06 22:00 | LOGICAL VOLUME D | NUMBER OF I/O TIMES PER SECOND | 1369.4 |
| 2006/06/06 22:00 | PARITY GROUP B | NUMBER OF I/O TIMES PER SECOND | 2238.7 |
| ... | ... | ... | ... |

FILE-VOLUME RELATION TABLE (MANAGEMENT SOFTWARE)

| FILE IDENTIFIER | VOLUME IDENTIFIER |
|---|---|
| FILE A | VOLUME A |
| FILE B | VOLUME A |
| FILE C | VOLUME A |
| FILE D | VOLUME B |
| FILE E | VOLUME B |
| FILE F | VOLUME C |
| FILE G | VOLUME C |
| FILE H | VOLUME D |
| FILE I | VOLUME D |
| FILE J | VOLUME D |

*FIG. 22A*

LOGICAL VOLUME-PARITY GROUP RELATION TABLE (MANAGEMENT SOFTWARE)

| LOGICAL VOLUME IDENTIFIER | PARITY GROUP IDENTIFIER |
|---|---|
| LOGICAL VOLUME A | PARITY GROUP A |
| LOGICAL VOLUME B | PARITY GROUP A |
| LOGICAL VOLUME C | PARITY GROUP B |
| LOGICAL VOLUME D | PARITY GROUP B |

*FIG. 22B*

VOLUME-LOGICAL VOLUME-PORT CORRESPONDENCE TABLE (MANAGEMENT SOFTWARE) 2220

| 2221 VOLUME IDENTIFIER | 2222 LOGICAL VOLUME IDENTIFIER | 2223 HOST SIDE PORT IDENTIFIER | 2224 STORAGE SIDE PORT IDENTIFIER | 2225 SWITCH PORT IDENTIFIER LIST |
|---|---|---|---|---|
| VOLUME A | LOGICAL VOLUME A | PORT A | PORT N | { PORT C, PORT D, PORT H, PORT I } |
| VOLUME B | LOGICAL VOLUME B | PORT A | PORT N | { PORT C, PORT D, PORT H, PORT I } |
| VOLUME C | LOGICAL VOLUME C | PORT A | PORT O | { PORT C, PORT E, PORT J, PORT L } |
| VOLUME D | LOGICAL VOLUME D | PORT B | PORT P | { PORT F, PORT G, PORT K, PORT M } |

FIG. 22C

COLLECTION PRIORITY TABLE (MANAGEMENT SOFTWARE)

| RESOURCE IDENTIFIER | COLLECTION PRIORITY |
|---|---|
| FILE A | LOW |
| FILE B | LOW |
| FILE C | LOW |
| FILE D | LOW |
| FILE E | LOW |
| FILE F | HIGH B |
| FILE G | HIGH B |
| VOLUME A | LOW |
| VOLUME B | LOW |
| VOLUME C | HIGH B |
| PORT A | HIGH B |
| FILE H | HIGH A |
| FILE I | HIGH A |
| FILE J | HIGH A |
| VOLUME D | HIGH A |
| PORT B | HIGH A |
| PORT C | HIGH B |
| PORT D | LOW |
| PORT E | HIGH B |
| PORT F | HIGH A |
| PORT G | HIGH A |
| PORT H | LOW |
| PORT I | LOW |
| PORT J | HIGH B |
| PORT K | HIGH A |
| PORT L | HIGH B |
| PORT M | HIGH A |
| PORT N | LOW |
| PORT O | HIGH B |
| PORT P | HIGH A |
| LOGICAL VOLUME A | LOW |
| LOGICAL VOLUME B | LOW |
| LOGICAL VOLUME C | HIGH B |
| LOGICAL VOLUME D | HIGH A |
| PARITY GROUP A | LOW |
| PARITY GROUP B | HIGH A |

*FIG. 23*

THRESHOLD SETTING INFORMATION TABLE (MANAGEMENT SOFTWARE)

| RESOURCE IDENTIFIER | METRICS IDENTIFIER | CONDITION |
|---|---|---|
| PORT N | NUMBER OF I/O TIMES PER SECOND | NUMBER OF I/O TIMES PER SECOND< 1100 |
| PORT O | NUMBER OF I/O TIMES PER SECOND | NUMBER OF I/O TIMES PER SECOND< 1100 |
| PORT P | NUMBER OF I/O TIMES PER SECOND | NUMBER OF I/O TIMES PER SECOND< 1100 |

*FIG. 24*

ABOVE-THRESHOLD VALUE HISTORY TABLE (MANAGEMENT SOFTWARE)

| DATE/TIME OF OCCURRENCE | RESOURCE IDENTIFIER | METRICS IDENTIFIER | METRICS VALUE |
|---|---|---|---|
| 2006/05/01 13:00 | PORT P | NUMBER OF I/O TIMES PER SECOND | 1002.3 |
| 2006/05/10 13:00 | PORT P | NUMBER OF I/O TIMES PER SECOND | 1003.5 |
| 2006/05/20 13:00 | PORT P | NUMBER OF I/O TIMES PER SECOND | 1000.6 |

*FIG. 25*

PERFORMANCE LOAD TARGET SETTING TABLE (MANAGEMENT SOFTWARE)

| PERFORMANCE ITEM | PERFORMANCE ITEM TARGET VALUE |
|---|---|
| CPU UTILIZATION RATE | 70% |

PERFORMANCE LOAD INFORMATION TABLE (MANAGEMENT SOFTWARE)

| PERFORMANCE ITEM | PERFORMANCE ITEM VALUE |
|---|---|
| CPU UTILIZATION RATE | 60% |

COMPUTER SYSTEM AND METHOD FOR MONITORING PERFORMANCE OF THE COMPUTER SYSTEM

CLAIM OF PRIORITY

The present application claims priority from Japanese application JP2006-291281 filed on Oct. 26, 2006, the content of which is hereby incorporated by reference into this application.

BACKGROUND

This invention relates to performance management of a computer system which includes a storage system, and more particularly, to a method of monitoring performance of a computer system by using an agent.

Conventionally, a storage network in which a plurality of computers access an integrated storage system via a network is realized. The storage network as described above can increase utilization efficiency of storage systems whose sizes are on the increase, and reduce management costs. Thus, the storage network is being put into wide use as an architecture for a data center. In a computer system into which the storage network as described above is introduced, to monitor and adjust performance of each application system, it is necessary to grasp a correlation among hardware equipment or the like and time transition thereof by comprehensively collecting pieces of performance information regarding various hardware and software equipments constituting the network. This is because the application systems before the introduction of the storage network have been independent of each other in a unit of a server composed of a processor unit and an external storage system connected to the processor unit, so it has been unnecessary to consider performance interferences between the application systems. However, in the storage network environment, there is a possibility that performance interference is caused between the application systems in a part (e.g., network system or storage system) shared by the plurality of computers.

An example of a performance monitoring technique in a networked computer system is disclosed in U.S. Pat. No. 6,505,248. According U.S. Pat. No. 6,505,248, performance is managed by an agent arranged for each of hardware resource and software resource which are monitoring targets, and management software for uniformly managing performance information of the entire system.

Each of the agents obtains the performance information by directly communicating with the monitoring target. Specifically, the agent executes polling with respect to the monitoring target to obtain a metrics value of resources. Here, the resources are physical or logical elements constituting the computer system. The metrics is a performance monitoring item (e.g., CPU utilization rate or number of I/Os) constituting resource performance information.

On the other hand, the management software collects and stores the pieces of performance information obtained by the agents, and provides the stored pieces of performance information according to a request from an administrator or the like. Accordingly, it is possible to uniformly manage operation states and performance of the hardware resource and the software resource constituting the computer system.

When the size of the uniformly managed computer system increases, the number of resources to be monitored also increases. Along with an increase in the number of resources, an amount of the performance information which the management software must obtain also increases, whereby it is necessary to process a large amount of performance information. JP 2005-157933 A discloses a method of automatically adjusting a target range from which performance information is to be subsequently obtained and an obtaining frequency based on the information obtained by the management software.

SUMMARY

As intervals of the polling executed by the management software becomes longer, it is required a long time to obtaining the performance information. For example, when the management software is suspended due to system maintenance or a fault of the management software or the like and is then resumed, the management software exhaustively collects all pieces of the performance information obtained by the agents while the management software has been suspended by polling after the resumption. Since the amount of the performance information stored by the agent becomes larger as a suspension period of the management software becomes longer, time necessary for the polling also becomes longer. In a large-scaled computer system, polling processing may take several hours because the number of resources to be the monitoring targets is large. As a result, there arises a problem in that detection of a performance problem (e.g., deterioration in performance) and investigation of its causes are delayed.

According to a representative invention disclosed in this application, there is provided a computer system including: a host computer; a storage system coupled to the host computer via a network; and a management computer coupled to the host computer and to the storage system, in which: the host computer includes a first interface coupled to the network, a first processor coupled to the first interface, and a first memory coupled to the first processor; the storage system includes a physical storage device for storing data written by the host computer; the management computer includes a second interface coupled to the host computer and to the storage system, a second processor coupled to the second interface, and a second memory coupled to the second processor; the management computer obtains performance information indicating performance of resources included in at least one of the host computer, the storage system, and the network; and the management computer obtains pieces of performance information of the resources in sequence set based on the obtained performance information.

According to an embodiment of this invention, even when the amount of performance information to be obtained is large, it is possible to quickly detect a performance problem by preferentially obtaining performance information assumed to be relatively useful.

BRIEF DESCRIPTION OF THE DRAWINGS

FIG. 5 is an explanatory diagram of a metrics value table for the host server according to the embodiment of this invention.

FIG. 6A is an explanatory diagram of an application-file relation table for the host server according to the embodiment of this invention.

FIG. 6B is an explanatory diagram of a file-volume relation table for the host server according to the embodiment of this invention.

FIG. 6C is an explanatory diagram of a volume-logical volume-port relation table for the host server according to the embodiment of this invention.

FIG. 7 is an explanatory diagram of a collection priority table for the host server according to the embodiment of this invention.

FIG. 8 is an explanatory diagram of a threshold setting information table for the host server according to the embodiment of this invention.

FIG. 9 is an explanatory diagram of a metrics value table for another host server according to the embodiment of this invention.

FIG. 10A is an explanatory diagram of an application-file relation table for another host server according to the embodiment of this invention.

FIG. 10B is an explanatory diagram of a file-volume relation table for another host server according to the embodiment of this invention.

FIG. 10C is an explanatory diagram of a volume-logical volume-port relation table for another host server according to the embodiment of this invention.

FIG. 11 is an explanatory diagram of a collection priority table for another host server according to the embodiment of this invention.

FIG. 12 is an explanatory diagram of a threshold setting information table for another host server according to the embodiment of this invention.

FIG. 13 is an explanatory diagram of a metrics value table for a SAN switch according to the embodiment of this invention.

FIG. 14 is an explanatory diagram of an interport communication path table for the SAN switch according to the embodiment of this invention.

FIG. 15 is an explanatory diagram of a collection priority table for the SAN switch according to the embodiment of this invention.

FIG. 16 is an explanatory diagram of a threshold setting information table for the SAN switch according to the embodiment of this invention.

FIG. 17 is an explanatory diagram of a metrics value table for a storage subsystem according to the embodiment of this invention.

FIG. 18 is an explanatory diagram of a logical volume-parity group relation table for the storage subsystem according to the embodiment of this invention.

FIG. 19 is an explanatory diagram of a collection priority table for the storage subsystem according to the embodiment of this invention.

FIG. 20 is an explanatory diagram of a threshold setting information table for the storage subsystem according to the embodiment of this invention.

FIG. 21 is an explanatory diagram of a metrics value table used by storage network performance management software according to the embodiment of this invention.

FIG. 22A is an explanatory diagram of a file-volume relation table used by the storage network performance management software according to the embodiment of this invention.

FIG. 22B is an explanatory diagram of a logical volume-parity group relation table used by the storage network performance management software according to the embodiment of this invention.

FIG. 22C is an explanatory diagram of a volume-logical volume-port correspondence table used by the storage network performance management software according to the embodiment of this invention.

FIG. 23 is an explanatory diagram of a collection priority table used by the storage network performance management software according to the embodiment of this invention.

FIG. 24 is an explanatory diagram of a threshold setting information table used by the storage network performance management software according to the embodiment of this invention.

FIG. 25 is an explanatory diagram of an above-threshold value history table used by the storage network performance management software according to the embodiment of this invention.

FIG. 26 is an explanatory diagram of a performance load target setting table used by the storage network management software according to the embodiment of this invention.

FIG. 27 is an explanatory diagram of a performance load information table used by the storage network performance management software according to the embodiment of this invention.

DETAILED DESCRIPTION OF THE PREFERRED EMBODIMENTS

The preferred embodiments of this invention will be described below referring to the accompanying drawings.

Figure 1A:
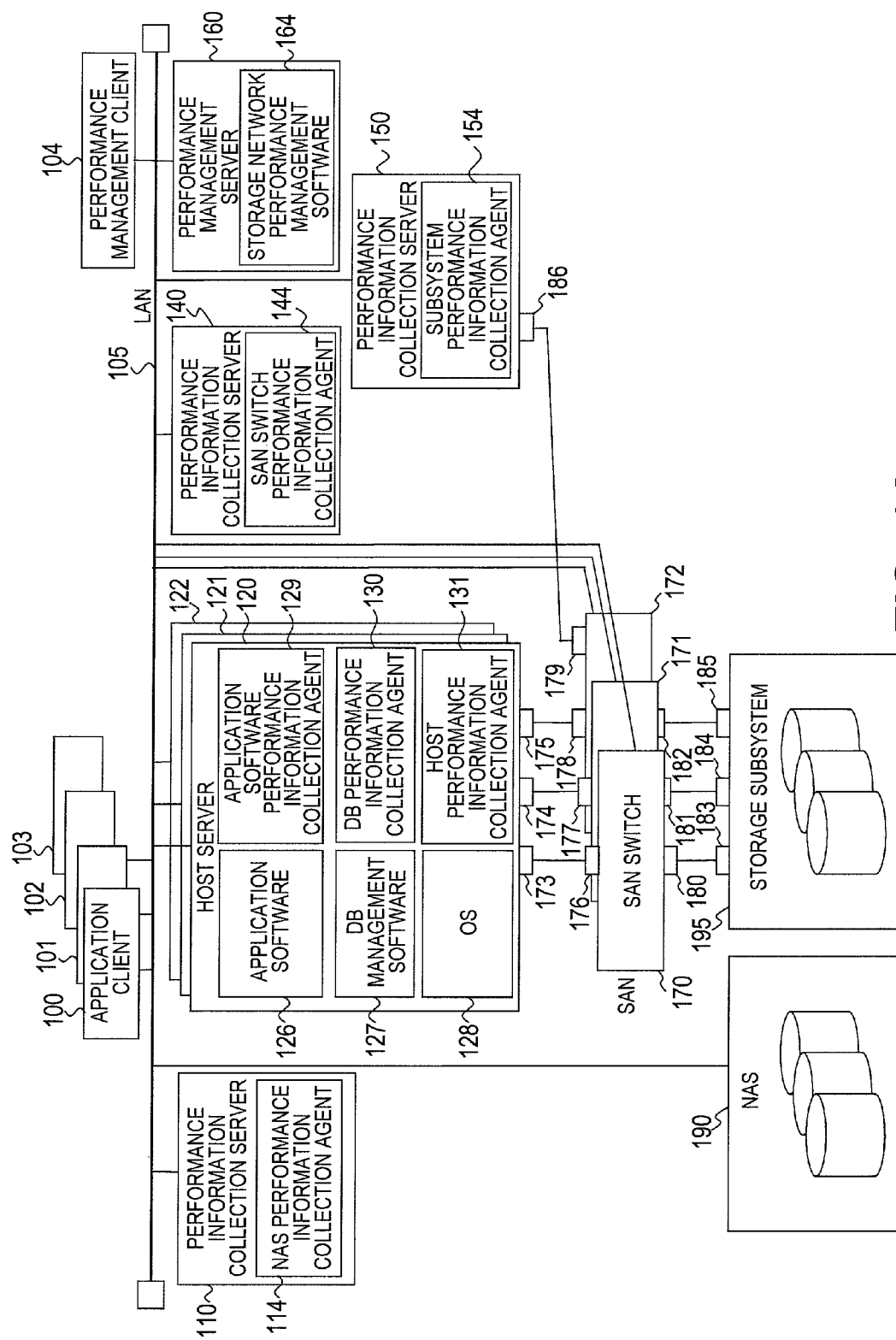
FIG. 1A is a block diagram showing a configuration of a computer system according to an embodiment of this invention.

FIG. 1A is a block diagram showing a configuration of a computer system according to an embodiment of this invention.

The computer system of this embodiment includes application clients 100 to 103, a performance management client 104, a performance information collection server 110, host servers 120 to 122, performance information collection servers 140 and 150, a performance management server 160, a network attached storage (NAS) 190, a storage subsystem 195, and storage area network (SAN) switches 170 to 172. The above-mentioned devices except the storage subsystem 195 are interconnected via a local area network (LAN) 105.

The application clients 100 to 103 are devices, such as personal computers, work stations, or thin client terminals, which provide user interface functions of a user system. The application clients 100 to 103 communicate with application software 126 or the like of the host servers 120 to 122 via the LAN 105.

The host severs 120 to 122 are computers for executing various processings according to requests received from the application clients 100 to 103 via the LAN 105. Hardware configurations of the host servers 120 to 122 will be described below referring to FIG. 1F.

The host servers 120 to 122 each hold at least a software program such as application software 126, database (DB) management software 127, an operating system (OS) 128, an application software performance information collection agent 129, a DB performance information collection agent 130, and a host performance information collection agent 131.

The application software 126 is a software program for providing an application logical function of an application system. Specifically, the application software 126 requests the DB management software 127 to refer to or update data when necessary in response to processing requests from the application clients 100 to 103. The host server 120 to 122 may hold a plurality of programs for application software 126.

The DB management software 127 is a software program for providing a data management function of the application system. Specifically, the DB management software 127 executes processing regarding definition, an operation, and management of data stored in the storage subsystem 195 or in the NAS 190. The application software 126 and the DB management software 127 used by the application software 126 may be executed by the same host server among the host servers 120 to 122, or respectively by dedicated one of the host severs 120 to 122.

Figure 1B:
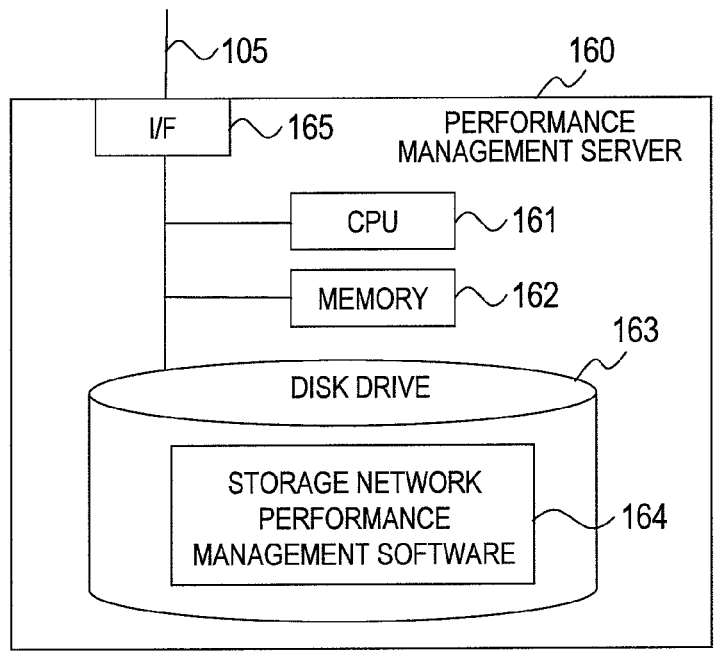
FIG. 1B is a block diagram showing a hardware configuration of a performance management server according to the embodiment of this invention.
Figure 1C:
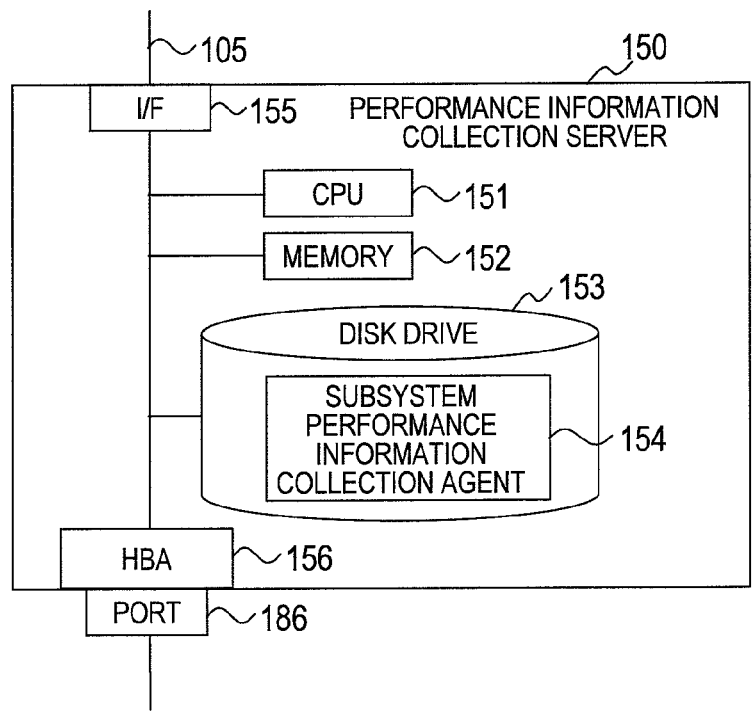
FIG. 1C is a block diagram showing a hardware configuration of a performance information collection server according to the embodiment of this invention.
Figure 1D:
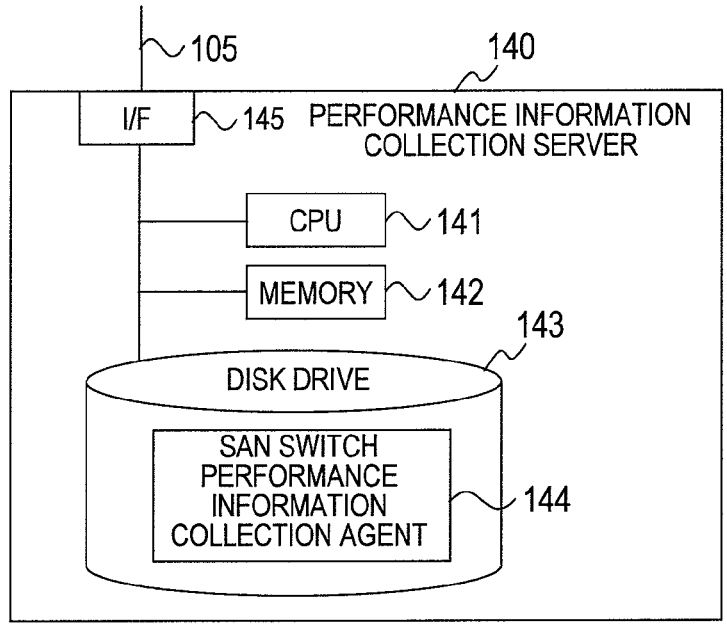
FIG. 1D is a block diagram showing a hardware configuration of the performance information collection server according to the embodiment of this invention.
Figure 1E:
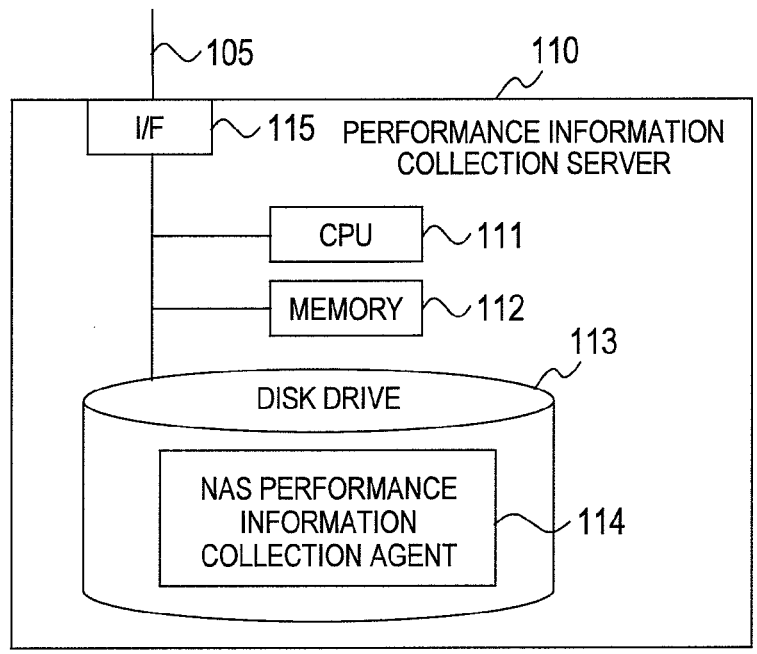
FIG. 1E is a block diagram showing a hardware configuration of the performance information collection server according to the embodiment of this invention.
Figure 1F:
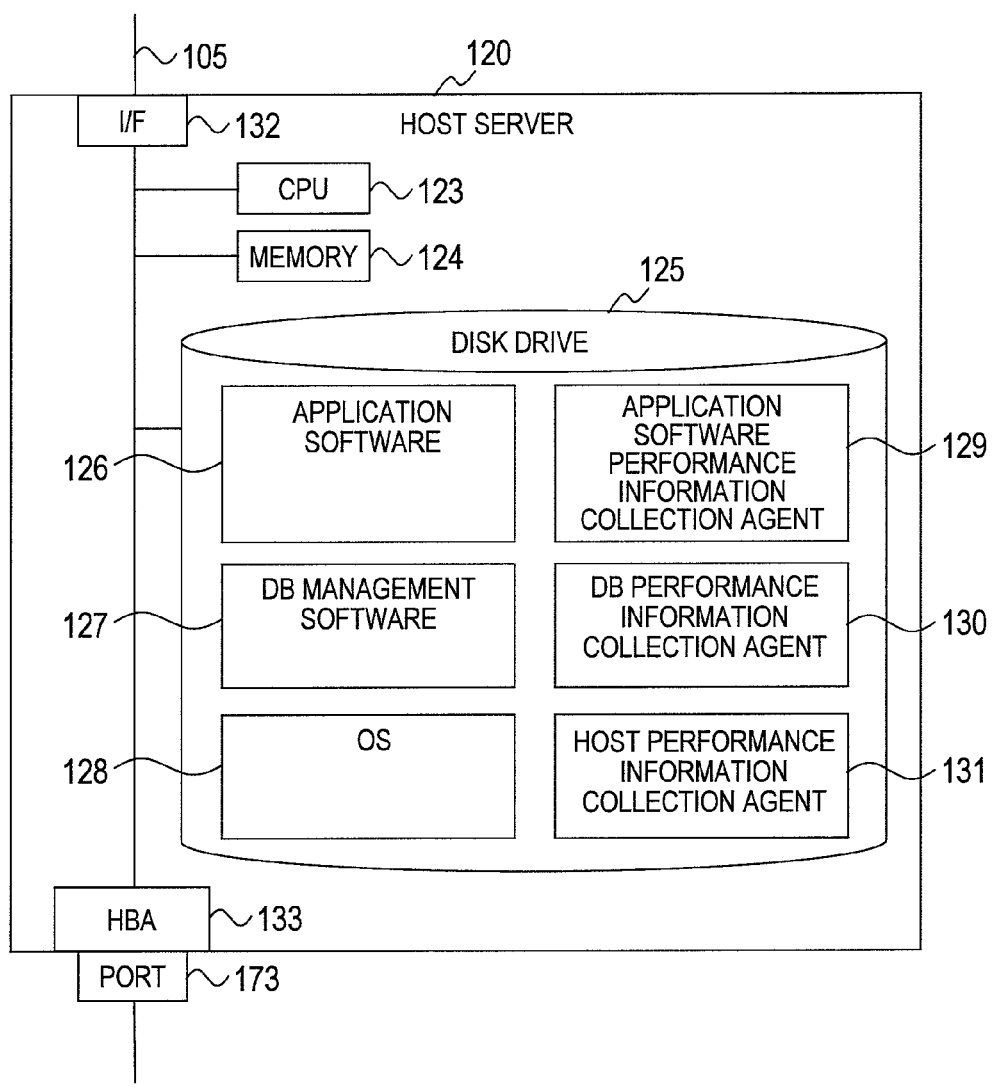
FIG. 1F is a block diagram showing a hardware configuration of a host server according to the embodiment of this invention.

Data access from the DB management software 127 to the storage system 195 is executed via the OS 128, ports 173 to 175 of a host bus adaptor (HBA) 133 shown in FIG. 1F, host side ports 176 to 178 of the SAN switches 170 to 172, storage side ports 180 to 182 of the SAN switches 170 to 172, and ports 183 to 185 of the storage subsystem 195. Data access from the DB management software 127 to the NAS 190 is executed via the OS 128 and the LAN 105.

The performance management client 104, the performance management server 160, and the performance information collection servers 110, 140, and 150 are computers disposed to manage performance of the storage network and the application system. Hardware configurations of the performance management server 160 and the performance information collection servers 110, 140, and 150 will be described below referring to FIGS. 1B to 1E.

Storage network performance management software 164 held by the performance management server 160, a NAS performance information collection agent 114, a SAN switch performance information collection agent 144, and a subsystem performance information collection agent 154 held by each of the performance information collection servers, respectively, and the application software performance information collection agent 129, the DB performance information collection agent 130, and the host performance information collection agent 131 held by the host servers 120 to 122 are software programs for managing performance of the storage network and the application system.

The performance management client 104 is a device for providing a user interface function of the storage network performance management software 164. The performance management client 104 communicates with the storage network performance management software 164 of the performance management server 160 via the LAN 105.

The storage network performance management software 164 is a software program for collecting and analyzing performance information of the computer system to which the storage network is introduced. The performance information is information indicating performance of hardware and software resources constituting the computer system. To obtain performance information from various hardware and software resources constituting the computer system, the storage network performance management software 164 uses pieces of performance information collection agent software dedicated to the hardware resources and software resources. Various configurations and arrangements are conceivable for the performance information collection agents, and thus an example will be described below.

The application software performance information collection agent 129 and the DB performance information collection agent 130 are software programs for respectively obtaining performance information regarding the application software 126 and the DB management software 127.

The host performance information collection agent 131 obtains performance information regarding the host servers 120 to 122, the OS 128, and the ports 173 to 175.

The subsystem performance information collection agent 154 obtains performance information regarding the storage subsystem 195, and ports 183 to 185 of the storage subsystem 195 via the port 186 and the SAN switches 170 to 172.

The NAS performance information collection agent 114 obtains performance information regarding the NAS 190, via the LAN 105.

The SAN switch performance information collection agent 144 obtains performance information regarding the SAN switches 170 to 172 and ports 176 to 182 of the SAN switches 170 to 172, via the LAN 105.

The subsystem performance information collection agent 154, the NAS performance information collection agent 114, and the SAN switch performance information collection agent 144 may be collectively executed by a single performance information server, or respectively by a dedicated performance information collection server.

Configurations of the performance information collection agents and the storage network performance management software 164 will be described below referring to FIGS. 2A and 2B.

The storage subsystem 195 is a data storage system for providing data storage areas to the host servers 120 to 122. Specifically, the storage subsystem 195 includes physical disks 301 to 308 for storing data shown in FIG. 3, and a controller (not shown) for controlling data writing/reading in/from a physical volume. Data to be written in the storage subsystem 195 by the application software 126 and the DB management software 127 of the host servers 120 to 122 via the OS 128 are eventually stored in the physical disks 301 to 308.

The storage subsystem 195 is connected to the host servers 120 to 122 via a storage area network (SAN). In the example of FIG. 1, a plurality of SAN switches 170 to 172 constitute a SAN.

As in the case of the storage subsystem 195, the NAS 190 is a data storage system for providing data storage areas to the host servers 120 to 122. However, the NAS 190 is connected to the host servers 120 to 122 via the LAN 105.

FIG. 1B is a block diagram showing a hardware configuration of a performance management server 160 according to the embodiment of this invention.

The performance management server 160 of this embodiment includes a CPU 161, a memory 162, a disk drive 163, and an interface (I/F) 165 connected to one another.

The CPU 161 is a processor for executing a software program stored in the memory 162.

For example, the memory 162 is a semiconductor memory to store the software program executed by the CPU 161 and other data.

For example, the disk drive 163 is a hard disk drive (HDD) to store the software program executed by the CPU 161 and other data. In the example of FIG. 1B, the disk drive 163 stores the storage network performance management software 164. The storage network performance management software 164 is copied in the memory 162 when necessary to be executed by the CPU 161.

For the disk drive 163, any types of disk drives except the HDD, such as an optical disk drive may be used. Alternatively, the disk drive 163 may be substituted by a semiconductor memory such as a flash memory, for example.

The I/F 165 is an interface connected to the LAN 105. The I/F 165 communicates with other computers or the like connected to the LAN 105.

FIG. 1C is a block diagram showing a hardware configuration of a performance information collection server 150 according to the embodiment of this invention.

The performance information collection server 150 of this embodiment includes a CPU 151, a memory 152, a disk drive 153, an I/F 155, and a host bus adapter (HBA) 156 connected to one another.

The CPU 151 is a processor for executing a software program stored in the memory 152.

For example, the memory 152 is a semiconductor memory to store the software program executed by the CPU 151 and other data.

For example, the disk drive 153 is an HDD to store the software program executed by the CPU 151 and other data. In the example of FIG. 1C, the disk drive 153 stores the subsystem performance information collection agent 154. The subsystem performance information collection agent 154 is copied in the memory 152 when necessary to be executed by the CPU 151. For the disk drive 153, any types of disk drives or semiconductor memory may be used as in the disk drive 163.

The I/F 155 is an interface connected to the LAN 105. The I/F 155 communicates with other computers or the like connected to the LAN 105.

The HBA 156 is an interface connected to at least one of the SAN switches 170 to 172. The HBA 156 includes one or more ports 186 connected to the SAN switches 170 to 172. The HBA 156 communicates with the storage subsystem 195 via the SAN switches 170 to 172 to obtain performance information regarding the storage subsystem 195. For example, the HBA 156 uses a fibre channel (FC) protocol. However, any other protocols may be used.

FIG. 1D is a block diagram showing a hardware configuration of a performance information collection server 140 according to the embodiment of this invention.

The performance information collection server 140 of this embodiment includes a CPU 141, a memory 142, a disk drive 143, and an I/F 145 connected to one another.

The CPU 141 is a processor for executing a software program stored in the memory 142.

For example, the memory 142 is a semiconductor memory to store the software program executed by the CPU 141 and other data.

For example, the disk drive 143 is an HDD to store the software program executed by the CPU 141 and other data. In the example of FIG. 1D, the disk drive 143 stores the SAN switch performance information collection agent 144. The SAN switch performance information collection agent 144 is copied in the memory 142 when necessary to be executed by the CPU 141. For the disk drive 143, any types of disk drives or semiconductor memory may be used as in the disk drive 163.

The I/F 145 is an interface connected to the LAN 105. The I/F 145 communicates with other computers or the like connected to the LAN 105.

FIG. 1E is a block diagram showing a hardware configuration of a performance information collection server 110 according to the embodiment of this invention.

The performance information collection server 110 of this embodiment includes a CPU 111, a memory 112, a disk drive 113, and an I/F 115 connected to one another.

The CPU 111 is a processor for executing software program stored in the memory 112.

For example, the memory 112 is a semiconductor memory to store the software program executed by the CPU 111 and other data.

For example, the disk drive 113 is an HDD to store the software program executed by the CPU 111 and other data. In the example of FIG. 1E, the disk drive 113 stores the NAS performance information collection agent 114. The NAS performance information collection agent 114 is copied in the memory 112 when necessary to be executed by the CPU 111. For the disk drive 113, any types of disk drives or semiconductor memory may be used as in the disk drive 163.

The I/F 115 is an interface connected to the LAN 105. The I/F 115 communicates with other computers or the like connected to the LAN 105.

FIG. 1F is a block diagram showing a hardware configuration of the host server 120 according to the embodiment of this invention.

The hardware configurations of the host servers 121 and 122 are similar to that of the host server 120, and thus description thereof will be omitted.

The host server 120 of this embodiment includes a CPU 123, a memory 124, a disk drive 125, an I/F 132, and an HBA 133 connected to one another.

The CPU 123 is a processor for executing a software program stored in the memory 124.

For example, the memory 124 is a semiconductor memory to store the software program executed by the CPU 123 and other data.

For example, the disk drive 125 is an HDD to store the software program executed by the CPU 123 and other data. In the example of FIG. 1F, the disk drive 125 stores the application software 126, the DB management software 127, an OS 128, the application software performance information collection agent 129, the DB performance information collection agent 130, and the host performance information collection agent 131. The software programs are copied in the memory 124 when necessary to be executed by the CPU 123. For the disk drive 125, any types of disk drives or semiconductor memory may be used as in the disk drive 163.

The I/F 132 is an interface connected to the LAN 105. The I/F 132 communicates with other computers or the like connected to the LAN 105.

The HBA 133 is an interface connected to at least one of the SAN switches 170 to 172. The HBA 133 includes one or more ports 173 connected to the SAN switches 170 to 172. The HBA 133 communicates data written to/read from the storage subsystem 195 via the SAN switches 170 to 172. For example, the HBA 133 uses a fibre channel (FC) protocol. However, any other protocols may be used.

Figure 2A:
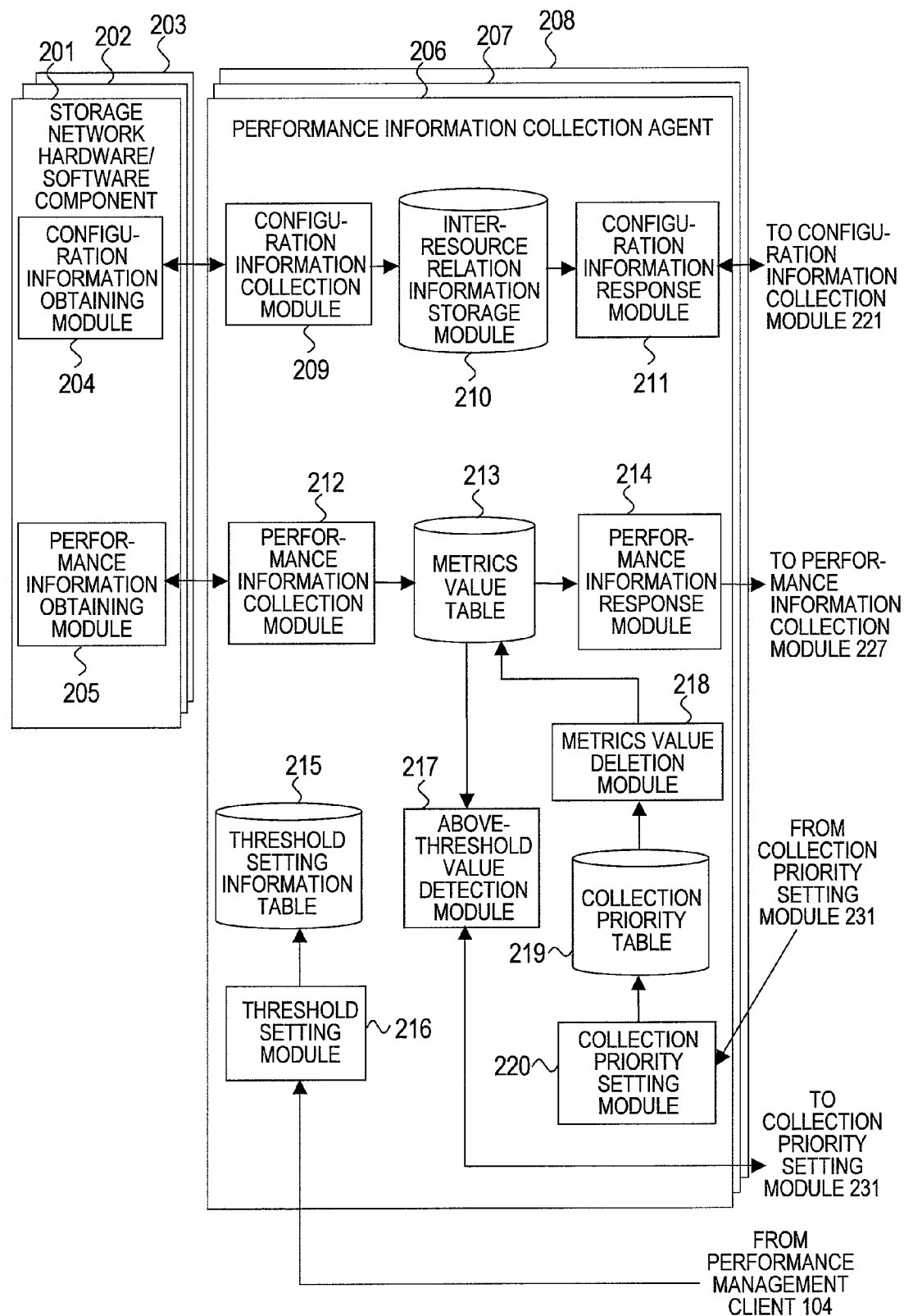
FIG. 2A is a functional block diagram of a performance information collection agent according to the embodiment of this invention.

FIG. 2A is a functional block diagram of the performance information collection agent according to the embodiment of this invention.

In FIG. 2A, storage network hardware/software components 201 to 203 are hardware devices or software programs constituting the computer system which employs the storage network. These include one or more resources which are monitoring targets of the storage network performance management software 164.

Specifically, the storage network hardware/software components 201 to 203 respectively correspond to any of the host servers 120 to 122, the application software 126, the DB management software 127, the OS 128, the storage subsystem 195, the NAS 190, the SAN switches 170 to 172, and the ports 173 to 185. FIG. 2A shows only three storage network hardware/software components 201 to 203. In reality, however, the storage network hardware/software components 201 to 203 are provided in a number same as that of the hardware device and software program to be the monitoring targets.

The storage network hardware/software components 201 to 203 each include a configuration information obtaining module 204 and a performance information obtaining module 205. These modules are modules constituting parts of software programs when the storage network hardware/software components 201 to 203 are software programs. Alternatively, when the storage network hardware/software components 201 to 203 are hardware devices, these modules are parts of the hardware devices, or program modules executed by the hardware devices.

The performance information collection agents 206 to 208 are software programs for obtaining performance information from the storage network hardware/software components 201 to 203. Specifically, the performance information collection agents 206 to 208 each correspond to any of the NAS performance information collection agent 114, the application software performance information collection agent 129, the DB performance information collection agent 130, the host performance information collection agent 131, the SAN switch performance information collection agent 144, and the subsystem performance information collection agent 154 of FIG. 1A. FIG. 2A shows only three performance information collection agents 206 to 208. In reality, however, an optional number of performance information collection agents 206 to 208 may be present.

The performance information collection agents 206 to 208 each include a configuration information collection module 209, an interresource relation information storage module 210, a configuration information response module 211, a performance information collection module 212, a metrics value table 213, a performance information response module 214, a threshold setting information table 215, a threshold setting module 216, an above-threshold value detection module 217, a metrics value deletion module 218, a collection priority table 219, and a collection priority setting module 220.

The configuration information collection module 209, the configuration information response module 211, the performance information collection module 212, the performance information response module 214, the threshold setting module 216, the above-threshold value detection module 217, the metrics value deletion module 218, and the collection priority setting module 220 are modules constituting parts of the performance information collection agents 206 to 208. The interresource relation information storage module 210, the metrics value table 213, the threshold setting information table 215, and the collection priority table 219 are storage areas such as a memory 112 or a disk drive 113 managed by the performance information collection agents 206 to 208. These modules and tables will be described below in detail.

Figure 2B:
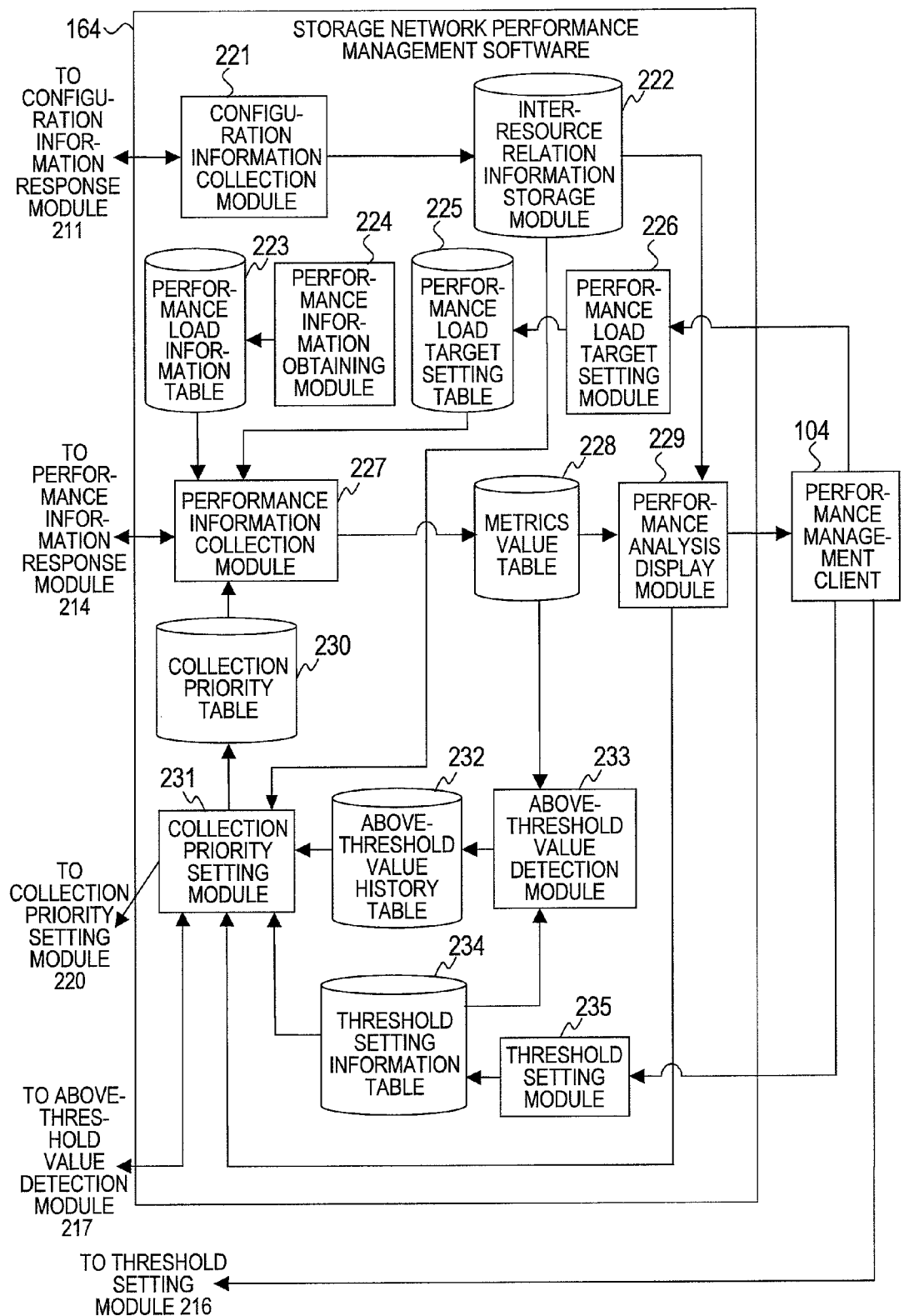
FIG. 2B is a functional block diagram of storage network performance management software according to the embodiment of this invention.

FIG. 2B is a functional block diagram of the storage network performance management software 164 according to the embodiment of this invention.

The storage network performance management software 164 includes a configuration information collection module 221, an interresource relation information storage module 222, a performance load information table 223, a performance information obtaining module 224, a performance load target setting table 225, a performance load target setting module 226, a performance information collection module 227, a metrics value table 228, a performance analysis display module 229, a collection priority table 230, a collection priority setting module 231, an above-threshold value history table 232, an above-threshold value detection module 233, a threshold setting information table 234, and a threshold setting module 235.

The configuration information collection module 221, the performance information obtaining module 224, the performance load target setting module 226, the performance information collection module 227, the performance analysis display module 229, the collection priority setting module 231, the above-threshold value detection module 233, and the threshold setting module 235 are each modules constituting a part of the storage network performance management software 164. The interresource relation information storage module 222, the performance load information table 223, the performance load target setting table 225, the metrics value table 228, the collection priority table 230, the above-threshold value history table 232, and the threshold setting information table 234 are storage areas such as a memory 162 or a disk drive 163 managed by the storage network performance management software 164. These modules and tables will be described below in detail.

Referring to FIGS. 2A and 2B, an outline of collection and monitoring of performance information of the computer system will be described.

When a fault occurs in a certain part of the computer system, the fault may affect performance. The fault may be a hardware or software fault, or a temporary fault in the operation, such as concentration of loads. For example, when a hardware fault occurs, a deterioration of performance is generally observed in the hardware resource having the fault or a resource having a performance dependent relation with that hardware resource.

The storage network performance management software 164 detects a performance problem (e.g., performance deterioration), and obtains resource performance information of the computer system from the performance information collection agents 206 to 208 to provide information useful for specifying a fault or the like causing the problem to the user.

The performance information collection module 212 of each of the performance information collection agents 206 to 208 is started by a timer (not shown) according to the predetermined scheduling setting, or by the storage network performance management software 164.

When started, the performance information collection module 212 requests transmission of a measured metrics value to the performance information obtaining module 205 of the monitoring target of each of the storage network hardware/software components 201 to 203.

The performance information obtaining module 205 measures metrics values regarding the storage network hardware/software components 201 to 203 including the performance information obtaining module 205. The metrics values are values referred to as pieces of performance information of the storage network hardware/software components 201 to 203, e.g., a number of I/Os per second, an I/O data amount per second, and the like. The performance information obtaining module 205 transmits the measured metrics values in response to a request from the performance information collection module 212.

The performance information collection module 212 stores the metrics values received from the performance information obtaining module 205 in the metrics value table 213.

Upon reception of the request from the performance information collection module 227 of the storage network performance management software 164, the performance information response module 214 reads the requested metrics value from the metrics value table 213 to transmit the value to the performance information collection module 227.

The above-threshold value detection module 217 judges whether the metrics value stored in the metrics value table 213 has exceeded a predetermined threshold value. If the metrics value has exceeded the predetermined threshold value, the above-threshold value detection module 217 transmits the notification to the collection priority setting module 231 of the storage network performance management software 164.

The threshold value referred to by the above-threshold value detection module 217 is stored in the threshold setting information table 215. The threshold setting module 216 stores the threshold value in the threshold setting information table 215 according to a request from the performance management client 104.

If the data amount stored in the metrics value table 213 exceeds a predetermined value, the metrics value deletion module 218 deletes the metrics values from the metrics value table 213. In this case, the metrics value deletion module 218 refers to the collection priority table 219 to delete a metrics value of a resource of low collection priority (in other words, metrics value supposed to be relatively useless).

As described below, the collection priority is originally set or referred to so that the storage network performance management software 164 can decide a sequence of obtaining metrics values from each of the performance information collection agents 206 to 208. However, the metrics value deletion module 218 refers to the collection priority to delete metrics values from the metrics value table 213. Deletion processing of the metrics values will be described below in detail by referring to FIGS. 33 to 35.

The collection priority table 219 stores the collection priority referred to by the metrics value deletion module 218. The collection priority setting module 220 stores the collection priority in the collection priority table 219 according to a request from the collection priority setting module 231 of the storage network performance management software 164.

The configuration information collection module 209 is started by the timer according to the predetermined scheduling setting, or by the storage network performance management software 164.

When started, the configuration information collection module 209 requests transmission of interresource relation information to the storage network hardware/software components 201 to 203 which are the monitoring targets.

The interresource relation information is information indicating a performance dependent relation among resources. The performance dependent relation will be described below by referring to FIG. 3.

The configuration information obtaining module 204 transmits interresource relation information regarding the storage network hardware/software components 201 to 203 including the configuration information obtaining module 204 according to a request from the configuration information collection module 209.

The configuration information collection module 209 stores the interresource relation information received from the configuration information obtaining module 204 in the interresource relation information storage module 210.

Upon reception of a request from the configuration information collection module 221 of the storage network performance management software 164, the configuration information response module 211 reads the requested interresource relation information from the interresource relation information storage module 210 to transmit the information to the configuration information collection module 221.

For example, the configuration information collection module 221 of the storage network performance management software 164 periodically transmits a transmission request of interresoruce relation information to the configuration information response module 211 according to the predetermined scheduling setting. The configuration information collection module 221 stores the interresource relation information received from the configuration information response module 211 in the interresource relation information storage module 222.

For example, the performance information collection module 227 of the storage network performance management software 164 periodically requests transmission of a metrics value to the performance information response module 214 according to the predetermined scheduling setting. The performance information response module 214 that has received this request reads the requested metrics value from the metrics value table 213 to transmit the value to the performance information collection module 227. The performance information collection module 227 stores the metrics value received from the performance information response module 214 in the metrics value table 228.

If metrics values not stored in the metrics value table 228 are stored in the metrics value table 213 of the performance information collection agents 206 to 208, normally, the performance information collection module 227 requests transmission of all those metrics values to the performance information response module 214.

However, if the number of metrics values requested to be transmitted is large, it takes a long time to obtain all the metrics values. As a result, it takes a long time until the occurrence of a problem such as a performance deterioration of each resource is detected, and a cause of the problem is uncovered. For example, such a problem occurs when the performance information collection module 227 cannot obtain metrics values for a long period of time because of a system fault or a fault of the storage network performance management software 164 itself.

In such a case, to quickly detect the performance problem and to uncover its cause, the performance information collection module 227 does not request transmission targeting all the metrics values which are not obtained yet, but refers to the collection priority table 230 to request transmission targeting metrics values of resources of high collection priority. The collection priority is assigned for each resource.

In principle, the collection priority is assigned by the collection priority setting module 231 based on the metrics values already obtained by the storage network performance management software 164 (i.e., metrics values already stored in the metrics value table 228). To set the metrics value, the collection priority setting module 231 may refer to the inter-resource relation information storage module 222, the above-threshold value history table 232, the threshold setting information table 234, and a result of calculation by the performance analysis display module 229. Further, the collection priority setting module 231 may set collection priority based on a notification received from the above-threshold value detection module 217.

A procedure of setting the collection priority will be described below in detail by referring to FIGS. 28A to 31. A procedure of obtaining metrics values based on the collection priority will be described below in detail by referring to FIGS. 32A and 32B.

The above-threshold value history table 232 stores information indicating a resource whose metrics value has once exceeded a threshold value. For example, the collection priority setting module 231 may presume that a possibility of reoccurrence of a performance problem is high for a resource whose metrics value has once exceeded the threshold value. In this case, the collection priority setting module 231 may set high collection priority to the resource whose metrics value has once exceeded the threshold value in the past.

The above-threshold value detection module 233 refers to the metrics value table 228 and the threshold setting information table 234 to judge whether a metrics value has exceeded the threshold value. Then, the above-threshold value detection module 233 stores information indicating a resource whose metrics value has exceeded the threshold value in the above-threshold value history table 232.

The threshold setting information table 234 stores a threshold value of a metrics value set to detect a problem such as a performance deterioration.

The threshold setting module 235 stores the threshold value in the threshold setting information table 234 according to a request from the performance management client 104.

The performance analysis display module 229 retrieves the metrics value stored in the metrics value table 228 to return the metrics value according to a request from the performance management client 104. Additionally, the performance analysis display module 229 refers to the metrics value table 228 to predict a current metrics value. Alternatively, the performance analysis display module 229 can judge whether the metrics value in on the increase or decrease. For example, the collection priority setting module 231 may presume that a possibility of an occurrence of a performance problem is high for a resource whose current metrics value is predicted to exceed the threshold value. In this case, the collection priority setting module 231 may set high collection priority to the resource whose current metrics value is predicted to exceed the threshold value.

After acquisition of all the metrics values of the resources of high collection priority, the performance information collection module 227 may subsequently obtain metrics values of resources of low collection priority. However, to suppress an influence on the performance of the computer system, the metrics values of the resources of low collection priority may be obtained when performance load of the computer system is not too large. Thus, the performance information collection module 227 refers to the performance load information table 223 and the performance load target setting table 225.

The performance load information table 223 stores information indicating actual system loads of the computer system. This information is obtained by the performance information obtaining module 224.

The performance load target setting table 225 stores a target value of a performance load of the computer system. This target value is set by the performance load target setting module 226 according to a request from the performance management client 104.

Pieces of information held in the tables or the like shown in FIGS. 2A and 2B will be described below in detail by referring to FIGS. 5 to 27. Processing executed by each module of FIGS. 2A and 2B will be described below in detail by referring to FIGS. 28A to 35.

Figure 3:
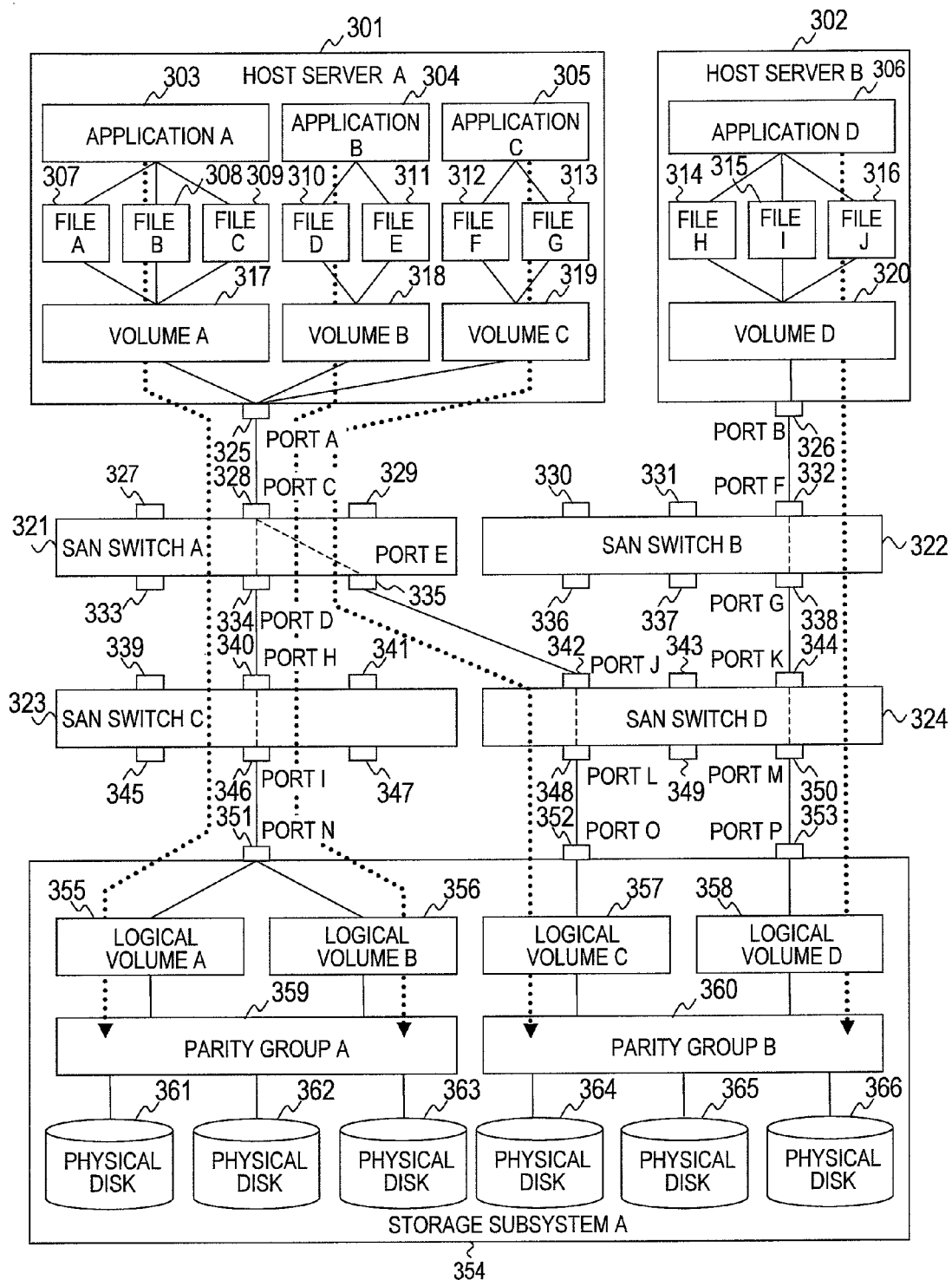
FIG. 3 is an explanatory diagram of a dependence relation regarding performance among resources according to the embodiment of this invention.

FIG. 3 is an explanatory diagram of a performance dependent relation among resources according to the embodiment of this invention.

The resources are components of the storage network which become targets of metrics value acquisition. The metrics values are values of performance monitoring items (e.g., CPU utilization rate, number of I/Os, and the like) constituting resource performance information. The hardware devices and the software programs constituting the storage network include various resources. The resources of the storage network affect one another in terms of performance. Specifically, for example, when performance of one resource drops due to a fault or the like, the other resources may be affected by this deteriorated performance to also drop in performance. Such a relation in which the resources affect one anther through performance fluctuation will be referred to as "performance dependent relation" in the description below. In other words, the resources which affect one anther through performance fluctuation have a performance dependent relation.

When there is a performance dependent relation among the resources, if a problem such as a fault occurs in a certain resource, a performance deterioration caused by the problem may be observed in another resource having a performance dependent relation with the resource with the problem. In other words, even when a performance deterioration is observed in a certain resource, a cause of the performance deterioration is not always the resource itself. Accordingly, when performance fluctuation is observed, the performance dependent relation among the resources is referred to in order to uncover a cause of the fluctuation.

In the example of FIG. 3, the hardware devices constituting the storage network include host servers A301 and B302, SAN switches A321, B322, C323, and D324, and a storage subsystem A354.

The host servers A301 and B302 each correspond to any of the host servers 120 to 122 of FIG. 1A. In the host server A301, applications A303, B304, and C305 are being operated. In the host server B302, an application D306 is being operated. These applications correspond to the application software 126 of FIG. 1A. The applications A303 to D306 are resources which are targets of information acquisition of the application software performance information collection agent 129.

Files A307 to J316, volumes A317 to D320, and ports A325 to B326 are resources which are targets of information acquisition of the host performance information collection agent 131. The files A307 to J316 are units by which the OS 128 provides data I/O services.

In the example of FIG. 3, the files A307 to C309 are allocated to the application A303. The files D310 and E311 are allocated to the application B304. The files F312 and G313 are allocated to the application C305. The files H314 to J316 are allocated to the application D306. The files A307 to J316 each store data read/written by the applications to which the files have been allocated.

The volumes A317 to D320 are managed as areas for storing the files A307 to J316 in an external storage system (e.g., storage subsystem 195) by the OS 128.

In the example of FIG. 3, the files A307 to C309 are stored in the volume A317. The files D310 to E311 are stored in the volume B318. The files F312 to G313 are stored in the volume C319. The files H314 to J316 are stored in the volume D320.

Thus, the files A307 to J316 are allocated to the applications A303 to D306, and the files A307 to J316 are allocated to the volumes A317 to D320. For example, presuming a case where the application A303 uses the file A307 and the file A307 is stored in the volume A317, when a load of accessing the file A307 from the application A303 increases, loads of the application A303, the file A307, and the volume A317 increase. Accordingly, there is a performance dependent relation among these resources.

The SAN switches A321 to D324 correspond to the SAN switches 170 to 172 of FIG. 1A. The SAN switches A321 to D324 are targets of information acquisition for the SAN switch performance information collection agent 144. Specifically, the SAN switch performance information collection agent 144 obtains information regarding ports 327 to 350 disposed in the SAN switches A321 to D324. In other words, the ports 327 to 350 are resources which are the targets of information acquisition. The ports 327 to 350 correspond to the ports 176 to 182 of FIG. 1A. Alphabetical identifiers such as a port C328 are added to those referred to in the description below among the ports 327 to 350.

The numbers of SAN switches and ports shown in FIG. 3 are both larger than those of the SAN switches and ports shown in FIG. 1A. This is because those are omitted from the drawing in FIG. 1A.

A storage subsystem A354 correspond to the storage subsystem 195 of FIG. 1A. The storage subsystem A354 includes ports N351 to P353, logical volumes A355 to D358, parity groups A359 to B360, and physical disks 361 to 366 as resources which are targets of information acquisition of the subsystem performance information collection agent 154.

The physical disks 361 to 366 are physical HDD's. The physical disks 361 to 366 may also be physical storage devices other than HDD (e.g., optical disk devices or semiconductor memory devices).

The parity groups A359 to B360 are logically one high-performance and highly reliable disk drive generated from a plurality of physical disks 361 to 366 by a function of the storage subsystem 195. For example, the parity group A359 may be generated from the physical disks 361 to 363, and the parity group B360 may be generated from the physical disks 364 to 366.

The logical volumes A355 to D358 are logical disk drives generated by dividing the parity groups A359 to B360 due to the function of the storage system 195. The storage subsystem 195 can generate logical volumes A355 to D358 to sizes suited to uses of the host servers 120 to 122.

The volumes A317 to D320 of the host servers A301 to B302 are allocated to the logical volumes A355 to D358 of the storage subsystem A354. The logical volumes A355 to D368 each are allocated to any one of the parity groups A359 to B360. At least two of the physical disks 361 to 366 are allocated to the parity groups A359 to B 360. Accordingly, there is a performance dependent relation among the resources.

When a correlation is established between the logical volumes A355 to D358 and the volumes A317 to D320 allocated thereto, paths of data to be transferred therebetween are determined. In other words, the ports A325 to P353, through which transferred data passes, are determined. Data I/O loads applied on the volumes A317 to D320 become loads of communication on the ports A325 to P353 of the data paths. Accordingly, there is a performance dependent relation among the volumes A317 to D320, the logical volumes A355 to D358 to which the volumes A317 to D320 are allocated, and the ports A325 to P353 on the data paths.

In the example of FIG. 3, the volume A317 is allocated to the logical volume A355. Data to be transferred between the volume A317 and the logical volume A355 passes through the ports A325, C328, D334, H340, I346, and N351. Thus, for example, when the number of I/Os per second for the logical volume A355 is reduced by a fault occurring in the storage subsystem A354, the numbers of I/O times per second of the ports A325, C328, D334, H340, I346 and N351 are all reduced. Accordingly, there is a performance dependent relation among the resources.

Similarly, in the example of FIG. 3, the volume B318 is allocated to the logical volume B356. Data to be transferred between the volume B318 and the logical volume B356 passes through the ports A325, C328, D334, H340, I346, and N351. The volume C319 is allocated to the logical volume C357. Data to be transferred between the volume C319 and the logical volume C357 passes through the ports A325, C328, E335, J342, L348, and O352. The volume D320 is allocated to the logical volume D358. Data transferred between the volume D320 and the logical volume D358 passes through the ports B326, F332, G338, K344, M350, and P353.

Figure 4:
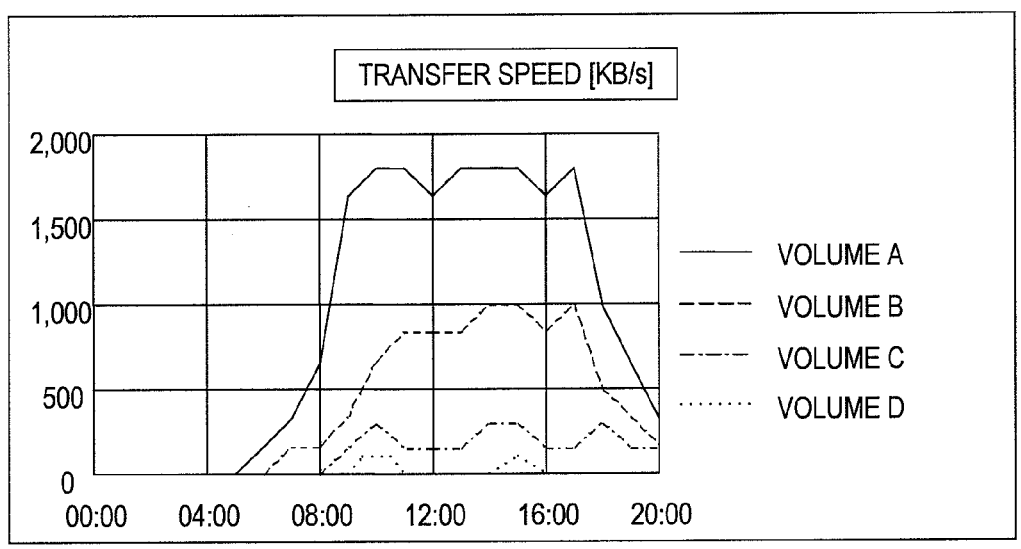
FIG. 4 is an explanatory diagram of a display screen of performance information according to the embodiment of this invention.

FIG. 4 is an explanatory diagram of a display screen of performance information according to the embodiment of this invention.

The screen of FIG. 4 is displayed in the performance management client 104 by the performance analysis display module 229 of the storage network management software 164.

FIG. 4 shows an example of displaying pieces of performance information of the plurality of volumes A317 to D320 by a graph. An abscissa and an ordinate of the graph indicate time and metrics values, respectively. In the example of FIG. 4, the metrics value of the ordinate is a transfer speed (kilobytes/second). Accordingly, transitions in performance information of resources can be compared with one another by graphically displaying the performance information.

The resource performance information may also be displayed in a form other than the graph (e.g., table form).

Next, a table used by each performance information collection agent will be described.

First, referring to FIGS. 5 to 8, a table used by the performance information collection agent for collecting performance information regarding the host server A301 will be described.

FIG. 5 is an explanatory diagram of a metrics value table regarding the host server A301 according to the embodiment of this invention.

A metrics value table 500 of FIG. 5 holds metrics values obtained regarding the resources included in the host server A301. These metrics values are obtained by the performance information collection module 212 belonging to at least one of the application software performance information collection agent 129, the DB performance information collection agent 130, and the host performance information collection agent 131, which are held by the host server A301. In other words, the metrics value table 500 corresponds to the metrics value table 213 held by at least one of the application software performance information collection agent 129, the DB performance information collection agent 130, and the host performance information collection agent 131, which are held by the host server A301.

The metrics value table 500 includes columns of a date/time 501, a resource identifier 502, a metrics identifier 503, and a metrics value 504.

A date and time of metrics value collection are registered in the date/time 501.

Identifiers of resources which are targets of metrics value collection are registered in the resource identifier 502. In the example of FIG. 5, identifiers for the targets of metrics value collection (e.g., file A, volume A, and port A) among the hardware resource or software resource included in the host server A301 are registered.

Types of collected metrics values are registered in the metrics identifier 503. In the example of FIG. 5, the number of I/Os per second is registered. However, other types (e.g., I/O data amount per second, CPU rate or the like) may also be registered.

Collected metrics values are registered in the metrics value 504.

Each row of the metrics value table 500 corresponds to a metrics value collected for a certain resource at a certain date/time. For example, a top row of FIG. 5 indicates that a metrics value regarding the file A307 obtained at 13:00 on Jun. 6, 2006, is 1214.5 (number of I/Os per second). In other words, the number of I/Os for the file A307 is 1214.5 at a point of time 13:00 on Jun. 6, 2006.

FIGS. 6A to 6C show tables included in the interresource relation information storage module 210 for the host server A301 according to the embodiment of this invention.

FIG. 6A is an explanatory diagram of an application-file relation table for the host server A301 according to the embodiment of this invention.

The application-file relation table 600 shown in FIG. 6A shows a correlation between applications A303 to C305 operated in the host server A301 and files A307 to G313 allocated to the applications A303 to C305. There is a performance dependent relation between the applications A303 to C305 and the files A307 to G313 allocated to the applications A303 to C305.

The application-file relation table 600 is generated based on information obtained by the configuration information collection module 209 belonging to at least one of the application software performance information collection agent 129, the DB performance information collection agent 130, and the host performance information collection agent 131, which are held by the host server A301, and is stored in the interresource relation information storage module 210.

The application-file relation table 600 includes columns of an application identifier 601 and a file identifier 602.

Identifiers of applications A303 to C305 operated in the host server A301 are registered in the application identifier 601.

Identifiers of files A307 to G313 allocated to the applications A303 to C305 are registered in the file identifier 602.

In the example of FIG. 6A, "FILE A", "FILE B", and "FILE C" are registered as file identifiers 602 corresponding to the value "APPLICATION A" of the application identifier 601. "FILE D" and "FILE E" are registered corresponding to "APPLICATION B". "FILE F" and "FILE G" are registered corresponding to "APPLICATION C". These indicate that the files A307 to G313 are allocated to the applications A303 to C305 as shown in FIG. 3.

FIG. 6B is an explanatory diagram of a file-volume relation table for the host server A301 according to the embodiment of this invention.

The file-volume relation table 610 shown in FIG. 6B shows a correlation between the files A307 to G313 managed by the host server A301 and volumes A317 to C319 storing the files A307 to G313. There is a performance dependent relation between the files A307 to G313 and the volumes A317 to C319 storing the files A307 to G313. The file-volume relation table 610 is generated based on information obtained by the configuration information collection module 209 belonging to at least one of the application software performance information collection agent 129, the DB performance information collection agent 130, and the host performance information collection agent 131, which are held by the host server A301, and is stored in the interresource relation information storage module 210.

The file-volume relation table 610 includes columns of a file identifier 611 and a volume identifier 612.

Identifiers of the files A307 to G313 managed by the host server A301 are registered in the file identifier 611.

Identifiers of the volumes A317 to C319 storing the files A307 to G313 are registered in the volume identifier 612.

In the example of FIG. 6B, "VOLUME A" is registered as a volume identifier 612 corresponding to the values FILE A", "FILE B", and "FILE C" of the file identifier 611. "VOLUME B" is registered corresponding to "FILE D" and "FILE E". "VOLUME C" is registered corresponding to "FILE F" and "FILE G". These indicate that the files A307 to G313 are stored in the volumes A317 to C319 as shown in FIG. 3.

FIG. 6C is an explanatory diagram of a volume-logical volume-port relation table for the host server A301 according to the embodiment of this invention.

The volume-logical volume-port relation table 620 shown in FIG. 6C shows a correlation among the volumes A317 to C319 managed by the host server A301, the logical volumes A355 to C357 to which the volumes A317 to C319 are allocated, and the port A325 of the host server A301 and the ports N351 to P353 of the storage subsystem A354 through which data transferred between the volumes A317 to C319 and the logical volumes A355 to C357 passes. There is a performance dependent relation among these resources.

The volume-logical volume-port relation table 620 is generated based on information obtained by the configuration information collection module 209 belonging to at least one of the application software performance information collection agent 129, the DB performance information collection agent 130, and the host performance information collection agent 131, which are held by the host server A301, and is stored in the interresource relation information storage module 210.

The volume-logical volume-port relation table 620 includes columns of a volume identifier 621, a logical volume identifier 622, a host side port identifier 623, and a storage side port identifier 624.

Identifiers of the volumes A317 to C319 managed by the host server A301 are registered in the volume identifier 621.

Identifiers of the logical volumes A355 to D358 to which the volumes A317 to C319 are allocated are registered in the logical volume identifier 622.

Identifiers of the port A325 of the host server A301 through which data transferred between the volumes A317 to C319 and the logical volumes A355 to D358 passes is registered in the host side port identifier 623.

Identifiers of the ports N351 to P353 of the storage subsystem A354 through which data transferred between the volumes A317 to C319 and the logical volumes A355 to D358 allocated to them passes are registered in the storage side port identifier 624.

For example, in a top row of FIG. 6C, a volume A, a logical volume A, a port A, and a port N are registered as the volume identifier 621, the logical volume identifier 622, the host side port identifier 623, and the storage side port identifier 624. These indicate that the volume A317 is allocated to the logical volume A355, and the data transferred between the volume A317 and the logical volume A355 passes through the port A325 and the port N351.

FIG. 7 is an explanatory diagram of a collection priority table for the host server A301 according to the embodiment of this invention.

The collection priority table 700 of FIG. 7 holds information indicating collection priority of metrics values set for the resources included in the host server A301.

The collection priority is originally referred to when the storage network performance management software 164 collects metrics values from the performance information collection agents. As described below, the storage network performance management software 164 preferentially collects metrics values regarding resources to which high collection priority has been set.

However, the collection priority held in the collection priority table 700 is referred to when the metrics value deletion module 218 deletes the metrics values held in the metrics value table 500. As described below, metrics values of resources to which low collection priority has been set are preferentially deleted from the metrics value table 500.

This collection priority is assigned by the collection priority setting module 220 belonging to at least one of the application software performance information collection agent 129, the DB performance information collection agent 130, and the host performance information collection agent 131, which are held by the host server A301. In other words, the collection priority table 700 corresponds to the collection priority table 219 held by at least one of the application software performance information collection agent 129, the DB performance information collection agent 130, and the host performance information collection agent 131, which are held by the host server A301.

As described below, the collection priority setting module 220 sets the collection priority table 700 according to an instruction received from the collection priority setting module 231 of the storage network performance management software 164.

The collection priority table 700 includes columns of a resource identifier 701 and collection priority 702.

In the resource identifier 701, an identifier of a resource which is a target of performance information collection, among the resources included in the host server A301, is registered.

A value indicating collection priority set for each resource is registered in the collection priority 702.

In the example of FIG. 7, collection priority "LOW" is registered corresponding to a resource identifier "FILE A", and collection priority "High B" is registered corresponding to a resource identifier "FILE F". These indicate that collection priority "LOW" is set in the file A307, and collection priority "High B" is set in the file F312. In other words, collection priority higher than that of the file A307 is set to the file F312. In this case, a metrics value of the file A307 is deleted from the metrics value table 500 in preference to that of the file F312.

In the collection priority 702, "High A", "High C", or the like may be registered in place of "LOW" and "High B". Meanings thereof will be described later. The "LOW" indicates collection priority lower than any of the "High A", "High B", and "High C".

FIG. 8 is an explanatory diagram of a threshold setting information table for the host server A301 according to the embodiment of this invention.

The threshold setting information table 800 of FIG. 8 holds information indicating threshold values of metrics values set for the resources included in the host server A301.

This threshold value is set by the threshold setting module 216 belonging to at least one of the application software performance information collection agent 129, the DB performance information collection agent 130, and the host performance information collection agent 131 held by the host server A301. In other words, the threshold setting information table 800 corresponds to the threshold setting information table 215 held by at least one of the application software performance information collection agent 129, the DB performance information collection agent 130, and the host performance information collection agent 131 held by the host server A301.

The threshold setting module 216 sets the threshold setting information table 800 according to an instruction received from the performance management client 104. The user can transmit an instruction of setting an optional threshold value to the threshold setting module 216 by operating the performance management client 104.

The threshold setting information table 800 is referred to by the above-threshold value detection module 217.

The threshold setting information table 800 includes columns of a resource identifier 801, a metrics identifier 802, and a condition 803.

In the resource identifier 801, an identifier of a resource to which a threshold value of a metrics value is set among the resources included in the host server A301 is registered.

Information indicating a type of a metrics value in which a threshold value is set is registered in the metrics identifier 802.

A condition corresponding to the threshold value of the metrics value is set in the condition 803.

In the example of FIG. 8, a metrics identifier "NUMBER OF I/O PER SECOND" and a condition "NUMBER OF I/O PER SECOND<1100" are registered corresponding to a resource identifier "PORT A". These indicate that a threshold value of the metrics value "NUMBER OF I/O PER SECOND" is set in the port A325, and that the set threshold value is "NUMBER OF I/O PER SECOND IS LESS THAN 1100". In this case, the above-threshold value detection module 217 judges that the metrics value has exceeded the threshold value when the number of I/Os per second as a metrics value obtained for the port A325 is less than 1100.

Next, referring to FIGS. 9 to 12, a table used by the performance information collection agent for collecting performance information regarding the host server B302 will be described.

FIG. 9 is an explanatory diagram of a metrics value table regarding the host server B302 according to the embodiment of this invention.

A metrics value table 900 of FIG. 9 holds metrics values obtained regarding the resources included in the host server B302. As in the metrics value table 500 shown in FIG. 5, the metrics value table 900 corresponds to the metrics value table 213 held by at least one of the application software performance information collection agent 129, the DB performance information collection agent 130, and the host performance information collection agent 131 held by the host server B302.

The metrics value table 900 includes columns of a date/time 901, a resource identifier 902, a metrics identifier 903, and a metrics value 904. Description thereof will be omitted as it is similar to that of the date/time 501, the resource identifier 502, the metrics identifier 503, and the metrics value 504 of the metrics value table 500.

FIGS. 10A to 10C show tables included in the interresource relation information storage module 210 of the host server B302.

FIG. 10A is an explanatory diagram of an application-file relation table for the host server B302 according to the embodiment of this invention.

The application-file relation table 1000 shown in FIG. 10A shows a correlation between the application D306 operated in the host server B302 and files H314 to J316 allocated to the application D306. There is a performance dependent relation between the application D306 and the files H314 to J316 allocated to the application D306. The application-file relation table 1000 is generated based on information obtained by the configuration information collection module 209 belonging to at least one of the application software performance information collection agent 129, the DB performance information collection agent 130, and the host performance information collection agent 131, which are held by the host server B302, and is stored in the interresource relation information storage module 210.

The application-file relation table 1000 includes columns of an application identifier 1001 and a file identifier 1002. Description of these columns will be omitted as it is similar to that of the application identifier 601 and the file identifier 602 of the application-file relation table 600.

FIG. 10B is an explanatory diagram of a file-volume relation table for the host server B302 according to the embodiment of this invention.

The file-volume relation table 1010 shown in FIG. 10B shows a correlation between the files H314 to J316 managed by the host server B302 and the volume D320 storing the files H314 to J316. There is a performance dependent relation between the files H314 to J316 and the volume D320 storing the files H314 to J316. The file-volume relation table 1010 is generated based on information obtained by the configuration information collection module 209 belonging to at least one of the application software performance information collection agent 129, the DB performance information collection agent 130, and the host performance information collection agent 131, which are held by the host server B302, and is stored in the interresource relation information storage module 210.

The file-volume relation table 1010 includes columns of a file identifier 1011 and a volume identifier 1012. Description of these columns will be omitted as it is similar to that of the file identifier 611 and the volume identifier 612 of the file-volume relation table 610.

FIG. 10C is an explanatory diagram of a volume-logical volume-port relation table for the host server B302 according to the embodiment of this invention.

The volume-logical volume-port relation table 1020 shown in FIG. 10C shows a correlation among the volume D320 managed by the host server B302, the logical volume D358 to which the volume D320 is allocated, and the port B326 of the host server B302 and the port P353 of the storage subsystem A354 through which data transferred between the volume D320 and the logical volume D358 passes. There is a performance dependent relation among these resources.

The volume-logical volume-port relation table 1020 is generated based on information obtained by the configuration information collection module 209 belonging to at least one of the application software performance information collection agent 129, the DB performance information collection agent 130, and the host performance information collection agent 131, which are held by the host server B302, and is stored in the interresource relation information storage module 210.

The volume-logical volume-port relation table 1020 includes columns of a volume identifier 1021, a logical volume identifier 1022, a host side port identifier 1023, and a storage side port identifier 1024. Description of these columns will be omitted as it is similar to that of the volume identifier 621, the logical volume identifier 622, the host side port identifier 623, and the storage side port identifier 624 of the volume-logical volume-port relation table 620.

FIG. 11 is an explanatory diagram of a collection priority table for the host server B302 according to the embodiment of this invention.

The collection priority table 1100 of FIG. 11 holds information indicating collection priority of metrics values set for the resources included in the host server B302.

Similar to the description of FIG. 7, the collection priority held in the collection priority table 1100 is referred to when the metrics value deletion module 218 deletes the metrics values held in the metrics value table 900. As described below, metrics values of resources to which low collection priority has been set are preferentially deleted from the metrics value table 900.

This collection priority is assigned by the collection priority setting module 220 belonging to at least one of the application software performance information collection agent 129, the DB performance information collection agent 130, and the host performance information collection agent 131, which are held by the host server B302. In other words, the collection priority table 1100 corresponds to the collection priority table 219 held by at least one of the application software performance information collection agent 129, the DB performance information collection agent 130, and the host performance information collection agent 131, which are held by the host server B302.

As described below, the collection priority setting module 220 sets the collection priority table 1100 according to an instruction received from the collection priority setting module 231 of the storage network performance management software 164.

The collection priority table 1100 includes columns of a resource identifier 1101 and collection priority 1102. Description of these columns will be omitted as it is similar to that of the resource identifier 701 and the collection priority 702 of the collection priority table 700.

FIG. 12 is an explanatory diagram of a threshold setting information table for the host server B302 according to the embodiment of this invention.

The threshold setting information table 1200 of FIG. 12 holds information indicating threshold values of metrics values set for the resources included in the host server B302.

This threshold value is set by the threshold setting module 216 belonging to at least one of the application software performance information collection agent 129, the DB performance information collection agent 130, and the host performance information collection agent 131 held by the host server B302. In other words, the threshold setting information table 1200 corresponds to the threshold setting information table 215 held by at least one of the application software performance information collection agent 129, the DB performance information collection agent 130, and the host performance information collection agent 131 held by the host server B302.

The threshold setting module 216 sets the threshold setting information table 1200 according to an instruction received from the performance management client 104. The user can transmit an instruction of setting an optional threshold value to the threshold setting module 216 by operating the performance management client 104.

The threshold setting information table 1200 is referred to by the above-threshold value detection module 217.

The threshold setting information table 1200 includes columns of a resource identifier 1201, a metrics identifier 1202, and a condition 1203. Description of these columns will be omitted as it is similar to that of the resource identifier 801, the metrics identifier 802, and the condition 803 of the threshold setting information table 800.

Next, referring to FIGS. 13 to 16, a table used by the SAN switch performance information collection agent 144 for collecting performance information regarding the SAN switches A321 to D324 will be described.

FIG. 13 is an explanatory diagram of a metrics value table regarding the SAN switches A321 to D324 according to the embodiment of this invention.

A metrics value table 1300 of FIG. 13 holds metrics values obtained regarding the resources included in the SAN switches A321 to D324. These metrics values are obtained by the performance information collection module 212 belonging to the SAN switch performance information collection agent 144. In other words, the metrics value table 1300 corresponds to the metrics value table 213 held by the SAN switch performance information collection agent 144.

The metrics value table 1300 includes columns of a date/time 1301, a resource identifier 1302, a metrics identifier 1303, and a metrics value 1304. Description of these columns will be omitted as it is similar to that of the columns of the date/time 501, the resource identifier 502, the metrics identifier 503, and the metrics value 504 of the metrics value table 500.

In the example of FIG. 13, a top row indicates that a metrics value obtained from the port C328 at 13:00 on Jun. 6, 2006 is 1213.6 (number of I/Os per second).

FIG. 14 is an explanatory diagram of an interport communication path table for the SAN switches A321 to D324 according to the embodiment of this invention.

The interport communication path table 1400 shown in FIG. 14 holds information indicating ports C328 to M350 of the SAN switches A321 to D324 which become paths through which data transferred between the ports A325 to B326 of the host servers A301 to B302 and the ports N351 to P353 of the storage subsystem A354 passes. When one data path passes through a plurality of ports, there is a performance dependent relation among the ports.

The interport communication path table 1400 is generated based on information obtained by the configuration information collection module 209 belonging to the SAN switch performance information collection agent 144, and is stored in the interresource relation information storage module 210.

The interport communication path table 1400 includes columns of a host side port identifier 1401, a storage side port identifier 1402, and a switch port identifier list 1403.

In the host side port identifier 1401, identifiers of the ports A325 to B326 of the host servers A301 to B302 through which data transferred between the host servers A301 to B302 and the storage subsystem A354 passes are registered.

In the storage side port identifier 1402, identifiers of the ports N351 to P353 of the storage subsystem A354 through which data transferred between the host servers A301 to B302 and the storage subsystem A354 passes are registered.

In the switch port identifier list 1403, identifiers of the ports C328 to M350 of the SAN switches A321 to D324 through which data transferred between the ports A325 to B326 of the host servers A301 to B302 and the ports N351 to P353 of the storage subsystem A354 passes are registered.

In the example of FIG. 14, a top row indicates that a data path from the port A325 of the host server A301 to the port N351 of the storage subsystem A354 passes through the ports C328, D334, H340, and I346 as shown in FIG. 3.

FIG. 15 is an explanatory diagram of a collection priority table for SAN switches A321 to D324 according to the embodiment of this invention.

The collection priority table 1500 of FIG. 15 holds information indicating collection priority of metrics values set for the resources included in the SAN switches A321 to D324.

Similar to the description of FIG. 7, the collection priority held in the collection priority table 1500 is referred to when the metrics value deletion module 218 deletes the metrics values held in the metrics value table 1300. Metrics values of resources to which low collection priority has been set are preferentially deleted from the metrics value table 1300.

This collection priority is assigned by the collection priority setting module 220 belonging to the SAN switch performance information collection agent 144. In other words, the collection priority table 1500 corresponds to the collection priority table 219 held by the SAN switch performance information collection agent 144.

The collection priority setting module 220 sets the collection priority table 1500 according to an instruction received from the collection priority setting module 231 of the storage network performance management software 164.

The collection priority table 1500 includes columns of a resource identifier 1501 and a collection priority 1502. Description of these columns will be omitted as it is similar to that of the resource identifier 701 and the collection priority 702 of the collection priority table 700.

FIG. 16 is an explanatory diagram of a threshold setting information table for the SAN switches A321 to D324 according to the embodiment of this invention.

The threshold setting information table 1600 of FIG. 16 holds information indicating threshold values of metrics values set for the resources included in the SAN switches A321 to D324.

This threshold value is set by the threshold setting module 216 belonging to the SAN switch performance information collection agent 144. In other words, the threshold setting information table 1600 corresponds to the threshold setting information table 215 held by the SAN switch performance information collection agent 144.

The threshold setting module 216 sets the threshold setting information table 1600 according to an instruction received from the performance management client 104. The user can transmit an instruction of setting an optional threshold value to the threshold setting module 216 by operating the performance management client 104.

The threshold setting information table 1600 is referred to by the above-threshold value detection module 217.

The threshold setting information table 1600 includes columns of a resource identifier 1601, a metrics identifier 1602, and a condition 1603. Description of these columns will be omitted as it is similar to that of the resource identifier 801, the metrics identifier 802, and the condition 803 of the threshold setting information table 800.

Next, referring to FIGS. 17 to 20, a table used by the subsystem performance information collection agent 154 for collecting performance information regarding the storage subsystem A354 will be described.

FIG. 17 is an explanatory diagram of a metrics value table regarding the storage subsystem A354 according to the embodiment of this invention.

A metrics value table 1700 of FIG. 17 holds metrics values obtained regarding the resources included in the storage subsystem A354. These metrics values are obtained by the performance information collection module 212 belonging to the subsystem performance information collection agent 154. In other words, the metrics value table 1700 corresponds to the metrics value table 213 held by the subsystem performance information collection agent 154.

The metrics value table 1700 includes columns of a date/time 1701, a resource identifier 1702, a metrics identifier 1703, and a metrics value 1704. Description of these columns will be omitted as it is similar to that of the columns of a date/time 501, the resource identifier 502, the metrics identifier 503, and the metrics value 504 of the metrics value table 500.

FIG. 18 is an explanatory diagram of a logical volume-parity group relation table for the storage subsystem A354 according to the embodiment of this invention.

The logical volume-parity group relation table 1800 of FIG. 18 holds information indicating a correlation between logical volumes A355 to D358 and parity groups A359 to B360 to which the logical volumes A355 to D358 are allocated. There is a performance dependent relation among these resources.

The logical volume-parity group relation table 1800 is generated based on information obtained by the configuration information collection module 209 belonging to the subsystem performance information collection agent 154, and is stored in the interresource relation information storage module 210.

The logical volume-parity group relation table 1800 includes columns of a logical volume identifier 1801 and a parity group identifier 1802.

In the logical volume identifier 1801, identifiers of the logical volumes A355 to D358 managed by the storage subsystem A354 are registered.

In the parity group identifier 1802, identifiers of the parity groups A359 to B360 to which the logical volumes A355 to D358 are allocated are registered.

In the example of FIG. 18, as shown in FIG. 3, the logical volumes A355 and B356 are allocated to the parity group A359, and the logical volumes C357 and D358 are allocated to the parity group B360.

FIG. 19 is an explanatory diagram of a collection priority table for the storage subsystem A354 according to the embodiment of this invention.

The collection priority table 1900 of FIG. 19 holds information indicating collection priority of metrics values set for the resources included in the storage subsystem A354.

Similar to the description of FIG. 7, the collection priority held in the collection priority table 1900 is referred to when the metrics value deletion module 218 deletes the metrics values held in the metrics value table 1700. Metrics values of resources to which low collection priority has been set are preferentially deleted from the metrics value table 1700.

This collection priority is assigned by the collection priority setting module 220 belonging to the subsystem performance information collection agent 154. In other words, the collection priority table 1900 corresponds to the collection priority table 219 held by the subsystem performance information collection agent 154.

The collection priority setting module 220 sets the collection priority table 1900 according to an instruction received from the collection priority setting module 231 of the storage network performance management software 164.

The collection priority table 1900 includes columns of a resource identifier 1901 and collection priority 1902. Description of these columns will be omitted as it is similar to that of the resource identifier 701 and the collection priority 702 of the collection priority table 700.

FIG. 20 is an explanatory diagram of a threshold setting information table for the storage subsystem A354 according to the embodiment of this invention.

The threshold setting information table 2000 of FIG. 20 holds information indicating threshold values of metrics values set for the resources included in the storage subsystem A354.

This threshold value is set by the threshold setting module 216 belonging to the subsystem performance information collection agent 154. In other words, the threshold setting information table 2000 corresponds to the threshold setting information table 215 held by the subsystem performance information collection agent 154.

The threshold setting module 216 sets the threshold setting information table 2000 according to an instruction received from the performance management client 104. The user can transmit an instruction of setting an optional threshold value to the threshold setting module 216 by operating the performance management client 104.

The threshold setting information table 2000 is referred to by the above-threshold value detection module 217.

The threshold setting information table 2000 includes columns of a resource identifier 2001, a metrics identifier 2002, and a condition 2003. Description of these columns will be omitted as it is similar to that of the resource identifier 801, the metrics identifier 802, and the condition 803 of the threshold setting information table 800.

Next, referring to FIGS. 21 to 27, tables used by the storage network performance management software 164 of the performance management server 160 will be described.

FIG. 21 is an explanatory diagram of a metrics value table used by the storage network performance management software 164 according to the embodiment of this invention.

The metrics value table 2100 shown in FIG. 21 corresponds to the metrics value table 228 held by the storage network performance management software 164 shown in FIG. 2B. The performance information collection module 227 obtains information held by the metrics value table 213 of each performance information collection agent by periodically executing polling for each performance information collection agent, and stores obtained information in the metrics value table 228. Thus, pieces of information held in the metrics value tables 500, 900, 1300, and 1700 are all stored in the metrics value table 2100 in principle.

However, the pieces of information stored in the metrics value tables 500, 900, 1300, and 1700 after the execution of polling are not stored in the metrics value table 2100 until next polling is executed. Accordingly, when polling is not executed for a long period of time due to, e.g., a system fault or the like, a great amount of information may be left in the metrics value tables 500, 900, 1300, and 1700 without being stored in the metrics value table 2100.

The metrics value table 2100 includes columns of a date/time 2101, a resource identifier 2102, a metrics identifier 2103, and a metrics value 2104. Description of these columns will be omitted as it is similar to that of the columns of the date/time 501, the resource identifier 502, the metrics identifier 503, and the metrics value 504 of the metrics value table 500.

FIGS. 22A to 22C show tables included in the interresource relation information storage module 222.

FIG. 22A is an explanatory diagram of a file-volume relation table used by the storage network performance management software 164 according to the embodiment of this invention.

The file-volume relation table 2200 shown in FIG. 22A is stored in the interresource relation information storage module 222 held by the storage network performance management software 164 shown in FIG. 2B. The configuration information collection module 221 obtains pieces of information held by file-volume relation tables 610 and 1010 included in the interresource relation information storage module 210 by executing polling for each performance information collection agent, and stores obtained information in the file-volume relation table 2200. Accordingly, the file-volume relation table 2200 holds both of the pieces of information held by the file-volume relation tables 610 and 1010.

The file-volume relation table 2200 includes columns of a file identifier 2201 and a volume identifier 2202. Description of these columns is similar to that of the file identifier 611 and the volume identifier 612 of the file-volume relation table 610, and thus it will be omitted.

FIG. 22B is an explanatory diagram of a logical volume-parity group relation table used by the storage network performance management software 164 according to the embodiment of this invention.

The logical volume-parity group relation table 2210 shown in FIG. 22B is stored in the interresource relation information storage module 222 held by the storage network performance management software 164 shown in FIG. 2B. The configuration information collection module 221 obtains information held by the logical volume-parity group relation table 1800 included in the interresource relation information storage module 210 by executing polling for the subsystem performance information collection agent 154, and stores obtained information in the logical volume-parity group relation table 2210. Accordingly, the logical volume-parity group relation table 2210 holds the same information as that held by the logical volume-parity group relation table 1800.

The logical volume-parity group relation table 2210 includes columns of a logical volume identifier 2211 and a parity group identifier 2212. Description of these columns is similar to that of the logical volume identifier 1801 and the parity group identifier 1802 of the logical volume-parity group relation table 1800, and thus it will be omitted.

FIG. 22C is an explanatory diagram of a volume-logical volume-port correspondence table used by the storage network performance management software 164 according to the embodiment of this invention.

The volume-logical volume-port correspondence table 2220 shown in FIG. 22C is stored in the interresource relation information storage module 222 held by the storage network performance management software 164 shown in FIG. 2B.

The configuration information collection module 221 obtains pieces of information held by the volume-logical volume-port relation tables 620 and 1020 and the interport communication path table 1400 included in the interresource relation information storage module 210 by executing polling for each performance information collection agent, and stores the obtained pieces of information in the volume-logical volume-port correspondence table 2220. Accordingly, the volume-logical volume-port correspondence table 2220 holds the pieces of information held by the volume-logical volume-port relation tables 620 and 1020 and the interport communication path table 1400.

The volume-logical volume-port correspondence table 2220 includes columns of a volume identifier 2221, a logical volume identifier 2222, a host side port identifier 2223, a storage side port identifier 2224, and a switch port identifier list 2225.

The volume identifier 2221 corresponds to volume identifiers 621 and 1021 of the volume-logical volume-port relation tables 620 and 1020. Accordingly, description of the volume identifier 2221 will be omitted.

The logical volume identifier 2222 corresponds to logical volume identifiers 622 and 1022 of the volume-logical volume-port relation tables 620 and 1020. Accordingly, description of the logical volume identifier 2222 will be omitted.

The host side port identifier 2223 corresponds to host side port identifiers 623 and 1023 of the volume-logical volume-port relation tables 620 and 1020. Further, the host side port identifier 2223 corresponds to a host side port identifier 1401 of the interport communication path table 1400. Accordingly, description of the host side port identifier 2223 will be omitted.

The storage side port identifier 2224 corresponds to storage side port identifiers 624 and 1024 of the volume-logical volume-port relation tables 620 and 1020. Further, the storage side port identifier 2224 corresponds to a storage side port identifier 1402 of the interport communication path table 1400. Accordingly, description of the storage side port identifier 2224 will be omitted.

The switch port identifier list 2225 corresponds to a switch port identifier list 1403 of the interport communication path table 1400. Accordingly, the switch port identifier list 2225 will be omitted.

In the example of FIG. 22C, a top row indicates that a volume A317 is allocated to the logical volume A355, and a data path from the volume A317 to the logical volume A355 passes through the ports A325, C328, D334, H340, I346, and N351.

FIG. 23 is an explanatory diagram of a collection priority table used by the storage network performance management software 164 according to the embodiment of this invention.

The collection priority table 2300 shown in FIG. 23 corresponds to the collection priority table 230 held by the storage network performance management software 164 shown in FIG. 2B. Information held by the collection priority table 2300 is set by the collection priority setting module 231. The collection priority setting module 220 sets collection priority tables 700, 1100, 1500, and 1900 held by the performance information collection agents according to an instruction received from the collection priority setting module 231. Accordingly, the collection priority table 2300 holds data held by at least one of the collection priority tables 700, 1100, 1500, and 1900.

The collection priority table 2300 includes columns of a resource identifier 2301 and a collection priority 2302. Description of these columns will be omitted as it is similar to that of the resource identifier 701 and the collection priority 702 of the collection priority table 700.

FIG. 24 is an explanatory diagram of a threshold setting information table used by the storage network performance management software 164 according to the embodiment of this invention.

The threshold setting information table 2400 shown in FIG. 24 corresponds to the threshold setting information table 234 held by the storage network performance management software 164 shown in FIG. 2B. Information held by the threshold setting information table 2400 is set by the threshold setting module 235 according to an instruction received from the performance management client 104. Threshold setting information tables 800, 1200, 1600, and 2000 held by the performance information collection agents are set by the threshold setting module 216 according to an instruction received from the performance management client 104. Accordingly, the threshold setting information table 2400 holds data held by at least one of the threshold setting information tables 800, 1200, 1600, and 2000.

The threshold setting information table 2400 includes columns of a resource identifier 2401, a metrics identifier 2402, and a condition 2403. Description of these columns will be omitted as it is similar to that of the resource identifier 801, the metrics identifier 802, and the condition 803 of the threshold setting information table 800.

FIG. 25 is an explanatory diagram of an above-threshold value history table used by the storage network performance management software 164 according to the embodiment of this invention.

The above-threshold value history table 2500 shown in FIG. 25 holds information indicating a history of metrics values which have exceeded the set threshold value.

The above-threshold value history table 2500 corresponds to the above-threshold value history table 232 shown in FIG. 2B. The above-threshold value detection module 233 refers to the metrics value table 2100 and the threshold setting information table 2400 to judge whether a value registered in the metrics value 2104 has exceeded a threshold value set in the condition 2403. Then, information regarding metrics values exceeding the threshold value is stored in the above-threshold value history table 2500.

The above-threshold value history table 2500 includes columns of an occurrence date/time 2501, a resource identifier 2502, a metrics identifier 2503, and a metrics value 2504. When any one of the metrics values registered in the metrics value table 2100 exceeds the threshold value, the above-threshold value detection module 233 registers values in a date/time 2101, a resource identifier 2102, a metrics identifier 2103, and a metrics value 2104 of a row including the metrics value in the occurrence date/time 2501, the resource identifier 2502, the metrics identifier 2503, and the metrics value 2504.

In the example of FIG. 25, a top row indicates that a metrics value "1002.3" (number of I/Os per second) regarding the port P353 obtained at 13:00 on May 1, 2006 has exceeded a threshold value "NUMBER OF I/O PER SECOND<1100" (refer to FIG. 24).

FIG. 26 is an explanatory diagram of a performance load target setting table used by the storage network performance management software 164 according to the embodiment of this invention.

The performance load target setting table 2600 shown in FIG. 26 holds a value set as a target value of a performance load of the computer system. The performance load target setting table 2600 corresponds to the performance load target setting table 225 shown in FIG. 2B. In other words, the performance load target setting table 2600 is set by the performance load target setting module 226 according to an instruction received from the performance management client 104.

The performance load target setting table 2600 includes columns of a performance item 2601 and a performance item target value 2602.

An item used as an index of performance evaluation of the computer system is registered in the performance item 2601. For example, as an index of performance evaluation, an optional index such as a utilization rate of the CPU 123 by each of the host servers 120 to 122, the number of I/Os per second, or the amount of I/O data per second can be used.

A target value of the item set in the performance item 2601 is registered in the performance item target value 2602.

The user can set an optional performance item 2601 and an optional performance item target value 2602 by operating the performance management client 104.

In the example of FIG. 26, as a performance item target value, a CPU utilization rate 70% of each of the host servers 120 to 122 is set.

The performance load target setting table 2606 is referred to together with a performance load information table 2700 shown in FIG. 27 by the performance information collection module 227. This processing will be described below.

FIG. 27 is an explanatory diagram of the performance load information table used by the storage network performance management software 164 according to the embodiment of this invention.

The performance load information table 2700 shown in FIG. 27 holds a value of a performance load measured in the computer system. The performance load information table 2700 corresponds to the performance load information table 223 shown in FIG. 2B. In other words, the performance load information table 2700 holds a value of a performance load obtained by the performance information obtaining module 224.

The performance load information table 2700 includes columns of a performance item 2701 and a performance item value 2702.

The same item as that of the performance item 2601 shown in FIG. 26 is registered in the performance item 2701.

The value of the performance load obtained by the performance information obtaining module 224 is registered in the performance item value 2702. The performance information obtaining module 224 periodically obtains a value of a performance load to update the value of the performance item value 2702.

In the example of FIG. 27, most recently obtained actual measured value of a CPU utilization rate of each of the host servers 120 to 122 is 60%.

Next, processing executed by each module of the embodiment of this invention will be described by referring to flowcharts.

Figure 28A:
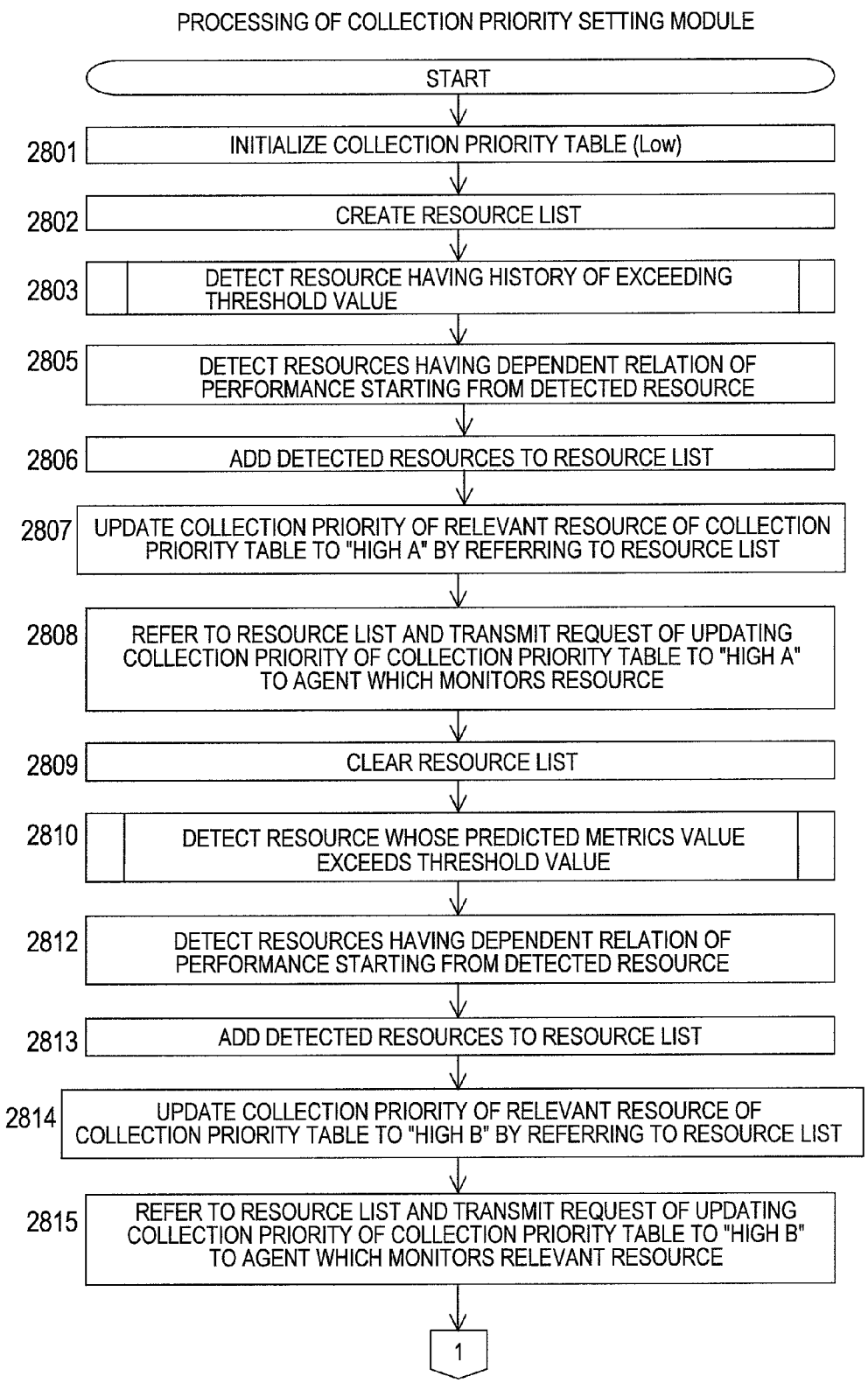
FIG. 28A is a flowchart of processing executed by a collection priority setting unit of the storage network performance management software according to the embodiment of this invention.
Figure 28B:
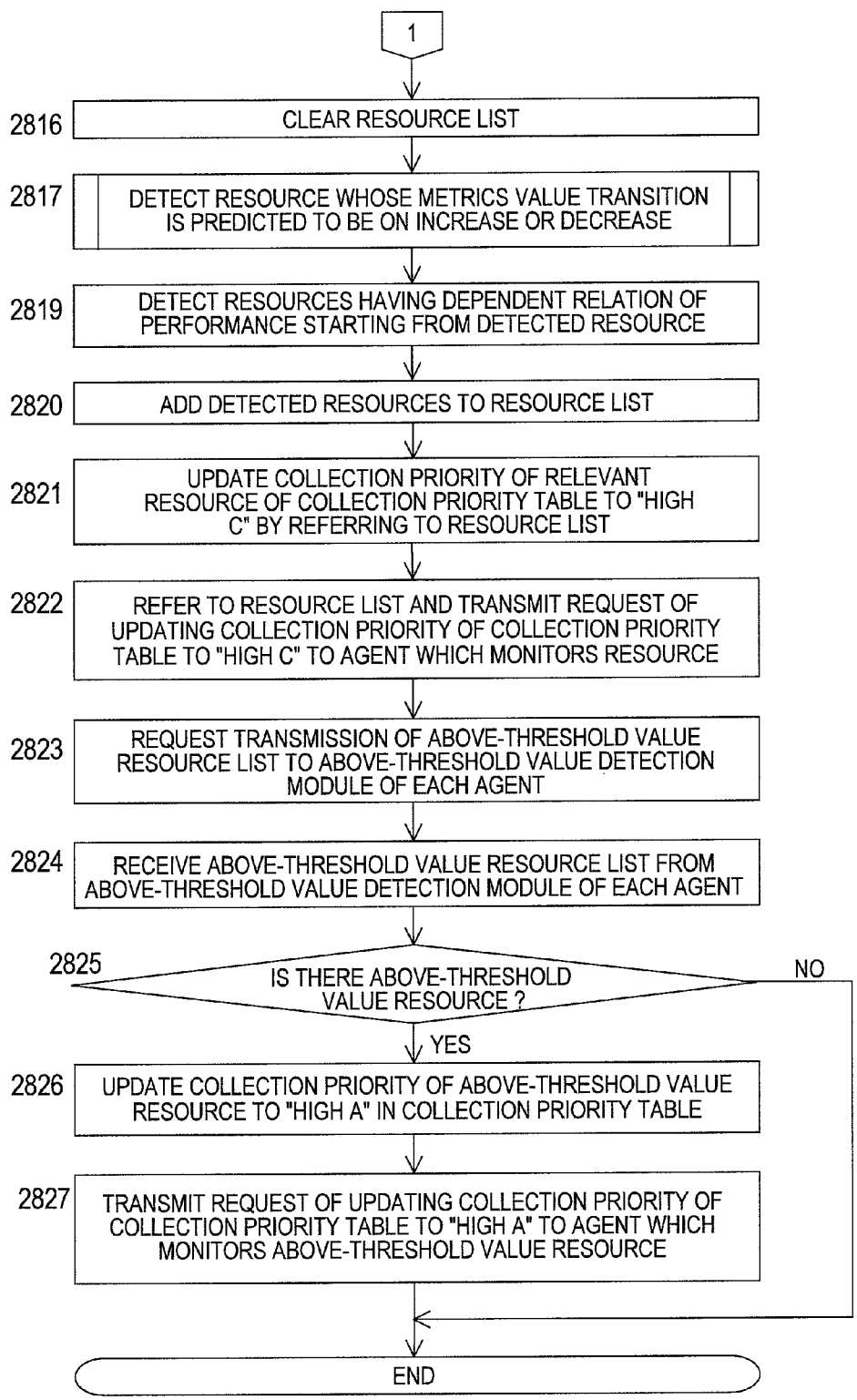
FIG. 28B is a flowchart of processing executed by the collection priority setting unit of the storage network performance management software according to the embodiment of this invention.

FIGS. 28A and 28B are flowcharts of processing executed by the collection priority setting module 231 of the storage network performance management software 164 according to the embodiment of this invention.

First, an outline of the processing will be given.

The storage network performance management software 164 obtains a metrics value of each resource to detect an occurrence of a problem such as a performance deterioration in each resource and to uncover a cause of the problem. Accordingly, it can be said that as compared with a metrics value of a resource to which a problem such as a performance deterioration has not occurred, the metrics value of the resource to which the problem has occurred is useful for the storage network performance management software 164 and its user. Hence, to quickly detect an occurrence of a problem, collection priority is preferably set high for the resource to which the problem has occurred.

On the other hand, as described above, there is a performance dependent relation among the resources. Thus, a resource to which a fault has occurred and a resource to which a performance problem has occurred due to the fault are not always the same. It can accordingly be said that to quickly uncover a cause of the problem, a metrics value of a resource having a performance dependent relation with the resource to which the problem has occurred is useful. Hence, collection priority is preferably set high for such resource.

Whether a problem such as a performance deterioration has occurred currently in a resource cannot be judged unless a current metrics value is obtained. However, a possibility of an occurrence of a problem at present can be estimated based on metrics values obtained in the past. Further, a possibility of a problem that may occur in the future can be predicted. According to this embodiment, collection priority is assigned based on a possibility of an occurrence of a problem at present or in the future. In other words, a metrics value of a resource having a high possibility of causing a problem is predicted to be useful for detecting a performance problem. A metrics value regarding a resource having a performance dependent relation with the resource predicted of having a high possibility of causing a problem is predicted to be useful for investigating a cause of a performance problem. Hence, high collection priority is assigned for such resource.

A possibility of an occurrence of a performance problem can be predicted by various methods. For example, a possibility of a reoccurrence of a problem is high for a resource to which a problem has occurred in the past as compared with a resource to which no problem has occurred. Alternatively, a current metrics value can be predicted based on the obtained metrics values. By comparing a case where the predicted metrics value exceeds a predetermined threshold value with a case where the predicted metrics value does not exceed the threshold value, a possibility of an occurrence of a performance problem is predicted to be high. Otherwise, a rate of change of the metrics value can be calculated based on the already obtained metrics values. When the calculated rate of change exceeds a predetermined threshold value, in other words, when the metrics value in on the increase or decrease, a possibility of an occurrence of a problem is predicted to be high as compared with the case where the rate of change does not exceed the predetermined threshold value.

According to this embodiment, a possibility of an occurrence of a performance problem is predicted based on the aforementioned three criteria. Further, according to this embodiment, a possibility of an occurrence of a performance problem is highest when a problem has occurred in the past, a possibility of an occurrence of a performance problem is second to highest when a predicted current metrics value exceeds a predetermined threshold value, and a possibility of an occurrence of a performance problem is third to highest when a calculated rate of change of a metrics value exceeds a predetermined threshold value. In a resource to which a possibility of an occurrence of a performance problem is judged to be high, higher collection priority is assigned, for a metrics value of that resource is predicted to be more useful.

A possibility of an occurrence of a performance problem may be predicted based on criteria other than that mentioned above. Also, an order of priority different from the aforementioned one may be set for priorities of the three criteria.

Next, processing will be described in detail.

The processings shown in FIGS. 28A and 28B may be executed immediately before polling by taking an opportunity of the polling executed by the storage network performance management software 164 to obtain metrics values. Alternatively, the processings shown in FIGS. 28A and 28B may be executed beforehand irrespective of an execution timing of polling.

First, the collection priority setting module 231 initializes the collection priority table 2300 (2801). Specifically, the collection priority setting module 231 sets the collection priorities 2302 of all the rows of the collection priority table 2300 to "LOW".

The collection priority setting module 231 creates a resource list (not shown) (2802). The resource list is a list in which resources detected in processing of step 2803 and after are temporarily stored. At a point of time when the step 2802 is finished, no resources have been registered in the resource list.

Then, the collection priority setting module 231 detects a resource which has a history of exceeding a threshold value (2803). The detected resource is added to the resource list. This detection processing will be described below referring to FIG. 29.

Then, based on the resource detected in the step 2803, the collection priority setting module 231 detects resources having a performance dependent relation with the detected resource (2805). Specifically, the collection priority setting module 231 refers to the volume-logical volume-port correspondence table 2220 to detect all the resources registered in the row including the resource detected in the step 2803 as resources having a performance dependent relation.

The collection priority setting module 231 adds the resources detected in the step 2805 to the resource list (2806).

The collection priority setting module 231 refers to the resource list to update a value of the collection priority 2302 of the collection priority table 2300 corresponding to the resources registered in the resource list to "High A" (2807). As a result, "High A" is set as the collection priority 2302 of the resource detected in the step 2803, and "High A" is also set in the resources having the performance dependent relation with this resource.

Subsequently, referring to the resource list, the collection priority setting module 231 transmits a request of updating a value of collection priority to "High A" to the performance information collection agents 206 to 208 which monitor the resources registered in the resource list (2808). For example, when "PORT F" is registered in the resource list, the collection priority setting module 231 transmits a request of updating a value of the collection priority 1502 corresponding to the "PORT F" to the SAN switch performance information collection agent 144. The collection priority setting module 220 of the SAN switch performance information collection agent 144 that has received this request updates the value of the collection priority 1502 corresponding to the "PORT F" of the collection priority table 1500 to "High A" (refer to the fourth row of FIG. 15).

The collection priority setting module 231 clears the resource list (2809). As a result, at a point of time when the step 2809 is finished, no resources have been registered in the resource list.

Then, the collection priority setting module 231 detects a resource to which a predicted metrics value exceeds a threshold value (2801). The detected resource is added to the resource list. This detection processing will be described below referring to FIG. 30.

Then, based on the resource detected in the step 2810, the collection priority setting module 231 detects resources having a performance dependent relation with the detected resource (2812). This detection is executed referring to the volume-logical volume-port correspondence table 2220 as in the case of the step 2805.

The collection priority setting module 231 adds the resources detected in the step 2812 to the resource list (2813).

The collection priority setting module 231 refers to the resource list to update a value of the collection priority 2302 of the collection priority table 2300 corresponding to the resources registered in the resource list to "High B" (2814). As a result, "High B" is set as the collection priority 2302 of the resource detected in the step 2810, and "High B" is also set in the resources having the performance dependent relation with this resource.

Then, as described above in the step 2808, the collection priority setting module 231 refers to the resource list to transmit a request of updating a value of the collection priority to "High B" to the performance information collection agents 206 to 208 which monitor the resources registered in the resource list (2815). As described above in the step 2808, the collection priority setting module 220 of the performance information collection agents 206 to 208 that have received this request updates the value of the collection priority registered in the collection priority table 219 which is managed by the collection priority setting module 220 to "High B".

When the value of the collection priority 2302 of the collection priority table 2300 corresponding to the resource registered in the resource list has been updated to "High A" before the step 2814 is executed, the collection priority setting module 231 does not need to execute the steps 2814 and 2815. It is because when one resource is relevant to a plurality of collection priorities, highest priority of the relevant collection priorities are set for the resource. When the steps 2814 and 2815 are not executed, collection priority 2302 of a resource which satisfies both of the conditions "High A" and "High B" becomes "High A".

The collection priority setting module 231 clears the resource list (2816). As a result, at a point of time when the step 2816 is finished, no resources have been registered in the resource list.

Then, the collection priority setting module 231 detects a resource to which a transition of a metrics value exhibits the increase or decrease (2817). The detected resource is added to the resource list. This detection processing will be described below referring to FIG. 31.

Then, based on the resource detected in the step 2817, the collection priority setting module 231 detects resources having a performance dependent relation with the detected resource (2819). This detection is executed referring to the volume-logical volume-port correspondence table 2220 as in the case of the step 2805.

The collection priority setting module 231 adds the resources detected in the step 2819 to the resource list (2820).

The collection priority setting module 231 refers to the resource list to update a value of the collection priority 2302 of the collection priority table 2300 corresponding to the resources registered in the resource list to "High C" (2821). As a result, "High C" is set as the collection priority 2302 of the resource detected in the step 2817, and "High C" is also set in the resources having the performance dependent relation with this resource.

Then, as described above in the step 2808, the collection priority setting module 231 refers to the resource list to transmit a request of updating a value of the collection priority to "High C" to the performance information collection agents 206 to 208 which monitor the resources registered in the resource list (2822). As described above in the step 2808, the collection priority setting module 220 of the performance information collection agents 206 to 208 that have received this request updates the value of the collection priority registered in the collection priority table 219 which is managed by the collection priority setting module 220 to "High C".

When the value of the collection priority 2302 of the collection priority table 2300 corresponding to the resource registered in the resource list has been updated to "High A" or "High B" before the step 2814 is executed, the collection priority setting module 231 does not need to execute the steps 2814 and 2815. If neither of the steps 2814 and 2815 is executed, collection priority 2302 of a resource which satisfies both conditions of "High A" and "High C" becomes "High A", and collection priority 2302 of a resource which satisfies both conditions of "High B" and "High C" becomes "High B".

Next, the collection priority setting module 231 requests transmission of a list of resources whose metrics values exceed a threshold value to the performance information collection agents 206 to 208 (2823). The above-threshold value detection module 217 of the performance information collection agents 206 to 208 which have received this request refers to the metrics value table 213 and the threshold setting information table 215, and transmits a list of resources whose metrics values exceed the threshold value to the collection priority setting module 231.

For example, the SAN switch performance information collection agent 144 refers to the metrics value table 1300 and the threshold setting information table 1600, and transmits a list of resource identifiers 1302 of resources whose metrics values 1304 exceed a threshold value of a condition 1603 (in the example of FIG. 16, resources whose metrics values 1304 are less than 100) to the collection priority setting module 231.

The collection priority setting module 231 receives the list of the resources whose metrics values exceed the metrics value from the above-threshold value detection module 217 of the performance information collection agents 206 to 208 (2824).

Then, the collection priority setting module 231 judges whether there is resource whose metrics values exceed the threshold value (2825). Specifically, the collection priority setting module 231 judges whether one or more resource identifiers are included in the list received in the step 2824.

If it is judged in the step 2825 that one or more resource identifiers are included in the list, metrics values actually exceed the threshold value in one or more resources. In this case, the collection priority setting module 231 updates the value of the collection priority 2302 of the collection priority table 2300 corresponding to the resources represented by the resource identifiers included in the received list to "High A" (2826).

The collection priority setting module 231 transmits a request of updating the value of collection priority to "High A" to the performance information collection agents 206 to 208 for monitoring the resources whose metrics values exceed the threshold value (2827). As described above in the step 2808, the collection priority setting module 220 of the performance information collection agents 206 to 208 which have received this request updates the value of the collection priority registered in the collection priority table 219 which is managed by the collection priority setting module 220 to "High A".

Upon an end of the processing of the step 2827, the collection priority setting module 231 finishes the process.

If it is judged in the step 2825 that no resource identifier is included in the list, a metrics value of any resource does not exceed the threshold value. In this case, the collection priority setting module 231 finishes the processing without executing the steps 2826 and 2827.

Figure 29:
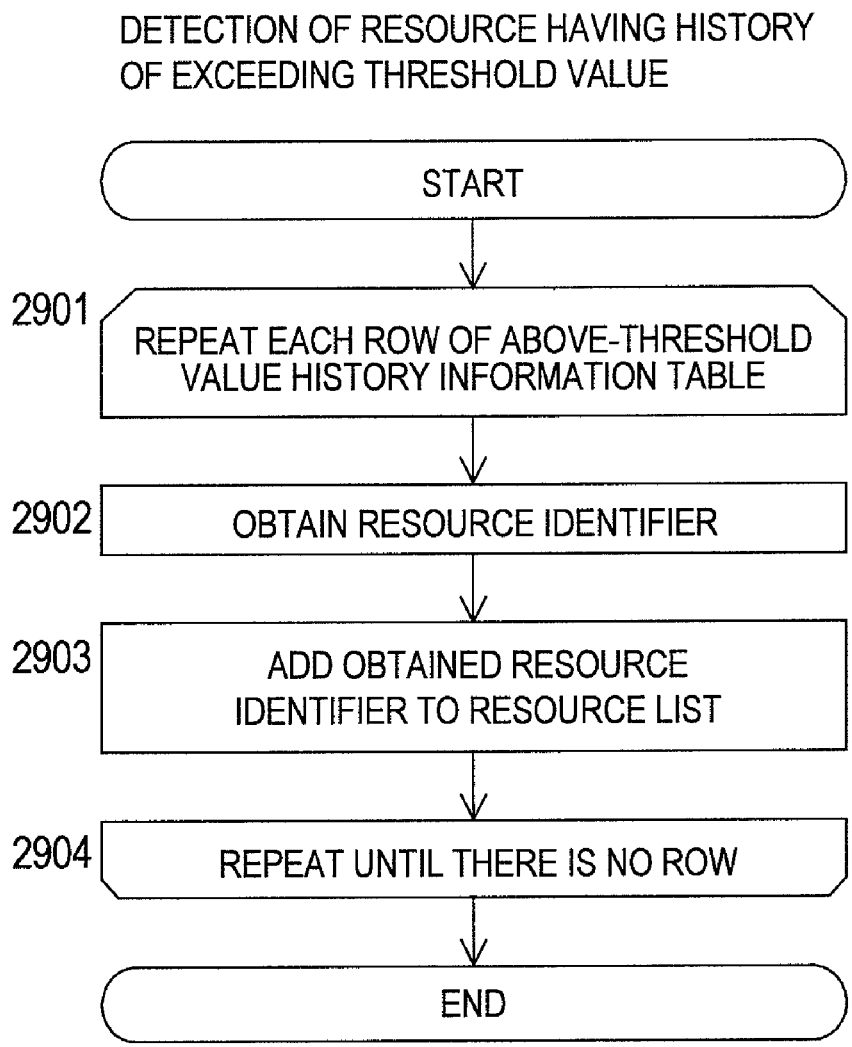
FIG. 29 is a flowchart of processing executed by the collection priority setting unit to detect resources which have a history of exceeding a threshold value according to the embodiment of this invention.

FIG. 29 is a flowchart of processing executed by the collection priority setting module 231 to detect a resource which has a history of exceeding the threshold value according to the embodiment of this invention.

The processing shown in FIG. 29 is executed in the step 2803 of FIG. 28A.

The collection priority setting module 231 executes the following steps 2902 and 2903 for each row of the above-threshold value history table 2500 (2901 and 2904).

First, the collection priority setting module 231 obtains a resource identifier 2502 for one row of the above-threshold value history table 2500 (2902). The above-threshold value history table 2500 stores a metrics value 2504 which has exceeded the threshold value and a resource identifier 2502 corresponding to the metrics value (in other words, an identifier of resource in which the metrics value has been observed). Accordingly, the resource identifier 2502 obtained in the step 2902 is a resource identifier in which a performance problem has occurred.

Then, the collection priority setting module 231 adds the resource identifier obtained in the step 2902 to the resource list (2903).

Upon an end of the steps 2902 and 2903 for all the rows of the above-threshold value history table 2500, the collection priority setting module 231 finishes the processing of FIG. 29 to execute processing of the step 2805 and after of FIG. 28A.

Figure 30:
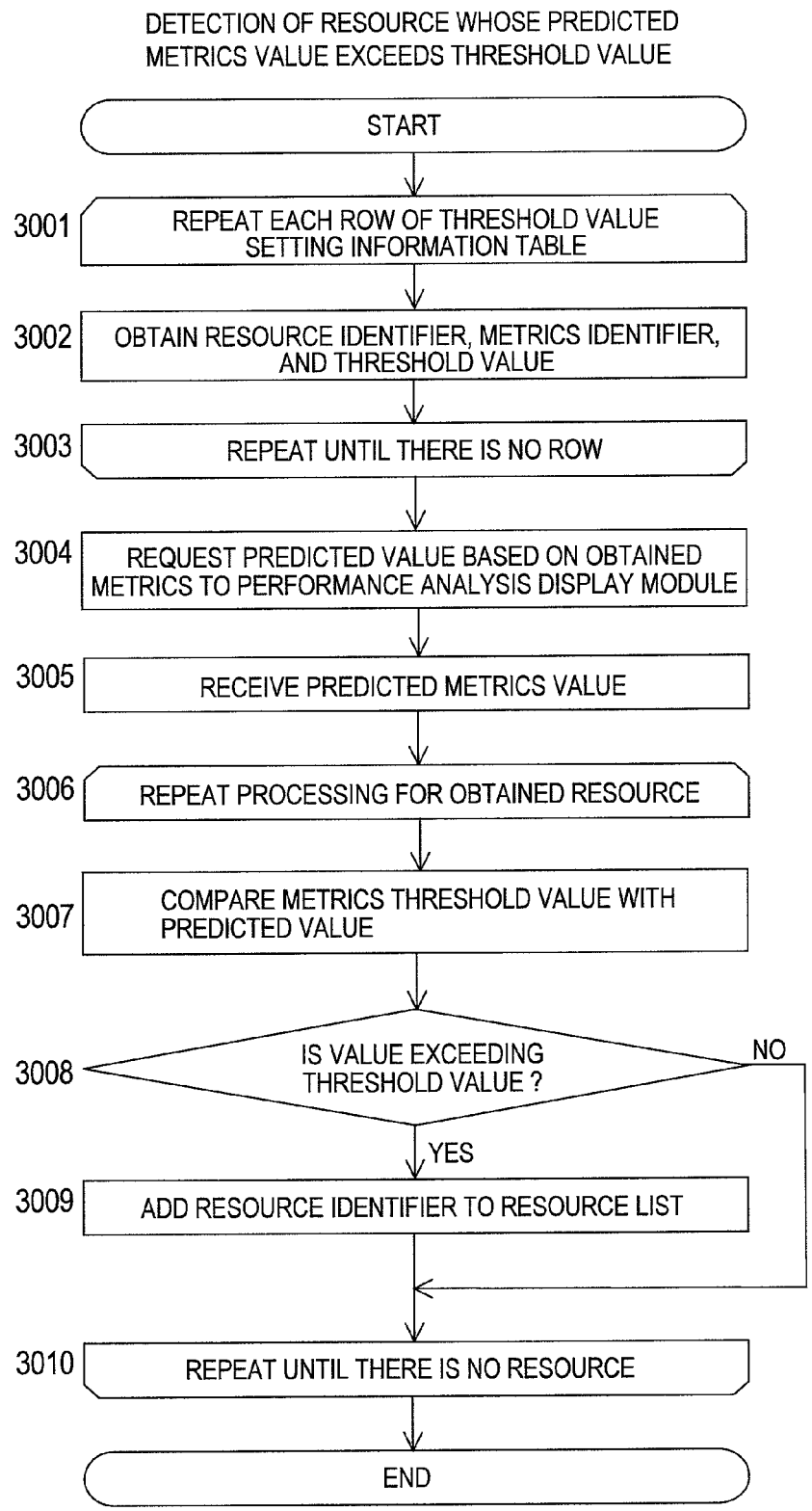
FIG. 30 is a flowchart of processing executed by the collection priority setting unit to detect resources whose predicted metrics value exceeds a threshold value according to the embodiment of this invention.

FIG. 30 is a flowchart of processing executed by the collection priority setting module 231 to detect a resource whose predicted metrics value exceeds the threshold value according to the embodiment of this invention.

The processing shown in FIG. 30 is executed in the step 2810 of FIG. 28A.

First, the collection priority setting module 231 obtains a resource identifier 2401, a metrics identifier 2402, and a condition 2403 (3001 to 3003) from all rows of the threshold setting table 2400.

Then, the collection priority setting module 231 requests the performance analysis display module 229 to calculate predicted metrics values based on the metrics value obtained by the storage network performance management software 164 in the past for all the resources obtained in the steps 3001 to 3003 (3004). The metrics values obtained by the storage network performance management software 164 are metrics values which have been stored in the metrics value table 2100. The predicted metrics values are current metrics values predicted based on the metrics values obtained in the past.

The performance analysis display module 229 that has received the request of the step 3004 calculates predicted metrics values based on the metrics values stored in the metrics value table 2100. The performance analysis display module 229 may calculate the predicted metrics values by any method. For example, the performance analysis display module 229 can calculate the predicted metrics values by a well-known method such as a method of least squares. The performance analysis display module 229 transmits the calculated predicted metrics values to the collection priority setting module 231.

The collection priority setting module 231 receives the calculated predicted metrics values from the performance analysis display module 229 (3005).

The collection priority setting module 231 compares the predicted metrics values with the threshold value of the metrics values for all the resources obtained in the steps 3001 to 3003 (3006 and 3007).

The collection priority setting module 231 judges whether the predicted metrics values exceed the threshold value as a result of the comparison of the step 3007 (3008).

If it is judged in the step 3008 that the predicted metrics values exceed the threshold value, it is predicted that a metrics value of a judgment target resource currently exceeds the threshold value. In this case, the collection priority setting module 231 adds the judgment target resource of the step 3008 to the resource list (3009).

On the other hand, if it is judged in the step 3008 that the predicted metrics values do not exceed the threshold value, it is predicted that the metrics value of the judgment target resource does not currently exceed the threshold value. In this case, the collection priority setting module 231 does not execute the step 3009.

Upon an end of the processing of the steps 3007 to 3009 for all the resources, the collection priority setting module 231 finishes the processing of FIG. 30 to execute processing of the step 2812 and after of FIG. 28A.

Figure 31:
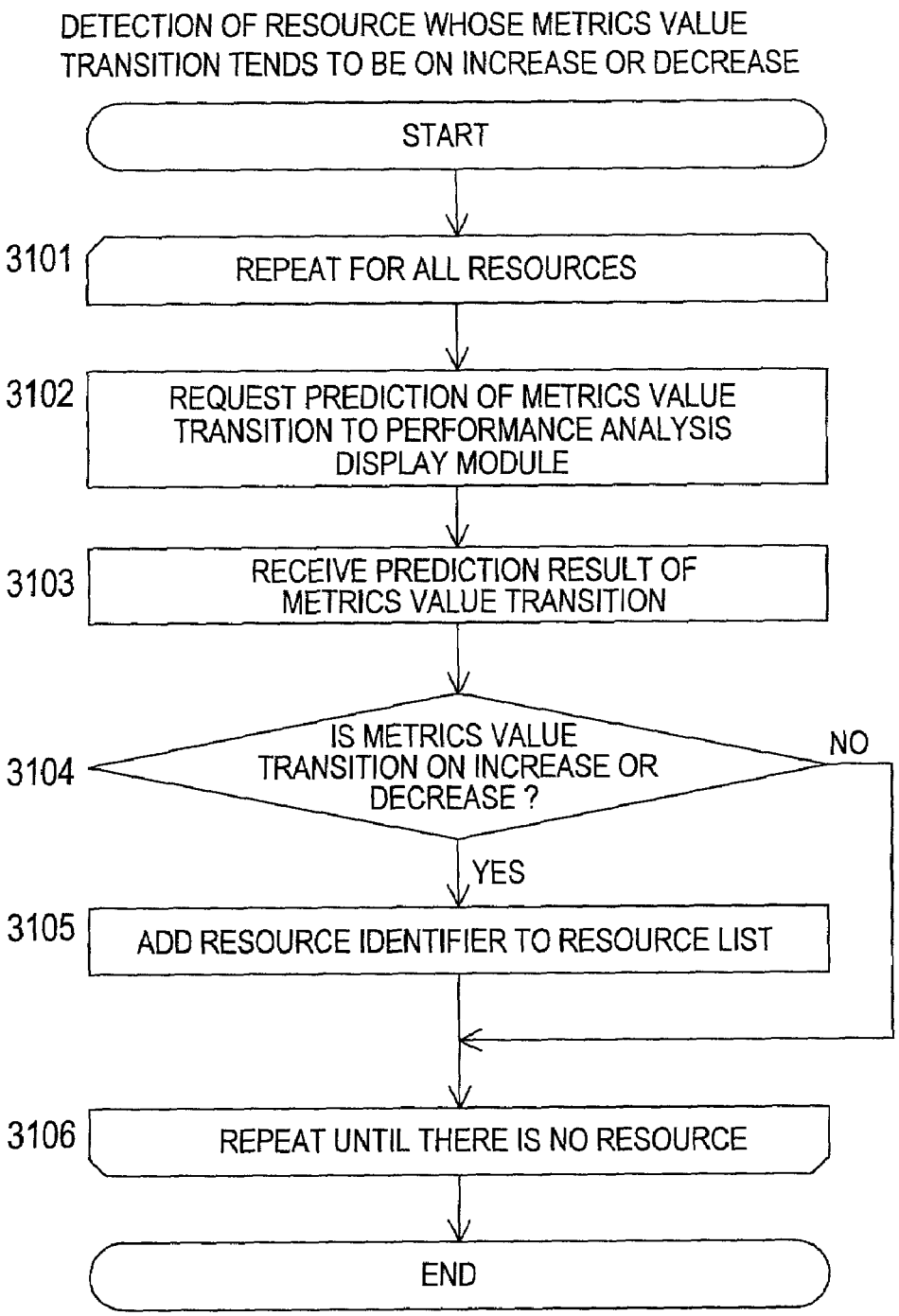
FIG. 31 is a flowchart of processing executed by the collection priority setting unit to detect resources whose metrics value is on the increase or on the decrease according to the embodiment of this invention.

FIG. 31 is a flowchart of processing executed by the collection priority setting module 231 to detect a resource to which a transition of a metrics value exhibits the increase or decrease according to the embodiment of this invention.

The processing shown in FIG. 31 is executed in the step 2817 of FIG. 28B.

The collection priority setting module 231 executes steps 3102 to 3105 for each resource. Upon an end of the execution of the steps 3102 to 3105 for all the resources, the collection priority setting module 231 finishes the processing of FIG. 31.

First, the collection priority setting module 231 requests the performance analysis display module 229 to predict a transition of a metrics value of a processing target resource (3102).

The performance analysis display module 229 that has received the request of the step 3102 predicts a transition of metrics values so far based on the metrics values stored in the metrics value table 2100. As in the case of the step 3004 of FIG. 30, the performance analysis display module 229 can predict the transition of the metrics values by a well-known method such as a method of least squares. The performance analysis display module 229 transmits a prediction result of the transition of the metrics values to the collection priority setting module 231.

The collection priority setting module 231 receives the prediction result of the metrics values from the performance analysis display module 229 (3103).

Then, the collection priority setting module 231 judges whether the prediction result of the transition of the metrics values received in the step 3103 exhibits the increase or decrease (3104). Specifically, for example, if the predicted transition of the metrics values exhibits the increase, and an increase rate exceeds a predetermined threshold value, the collection priority setting module 231 may judge that the predicted result exhibits the increase in the step 3104. Alternatively, if the predicted transition of the metrics values exhibits the decrease, and its decrease rate exceeds a predetermined threshold value, the collection priority setting module 231 may judge that the predicted result exhibits the decrease in the step 3104. Thus, when the rate of transition of the metrics values is calculated, and the rate of transition exceeds the predetermined threshold value, it is judged that the predicted result of the transition of the metrics values exhibits the increase or decrease "YES" (in the step 3104).

If it is judged in the step 3104 that the predicted result of the transition of the metrics values exhibits the increase or decrease, the collection priority setting module 231 adds a resource identifier of the processing target resource to the resource list (3105).

On the other hand, if it is judged in the step 3104 that the predicted result of the transition of the metrics values exhibit neither increase nor decrease, the collection priority setting module 231 does not execute the step 3105.

Upon an end of the processing of the steps 3102 to 3105 for all the resources, the collection priority setting module 231 finishes the processing of FIG. 31 to execute processing of the step 2819 and after of FIG. 28B.

Figure 32A:
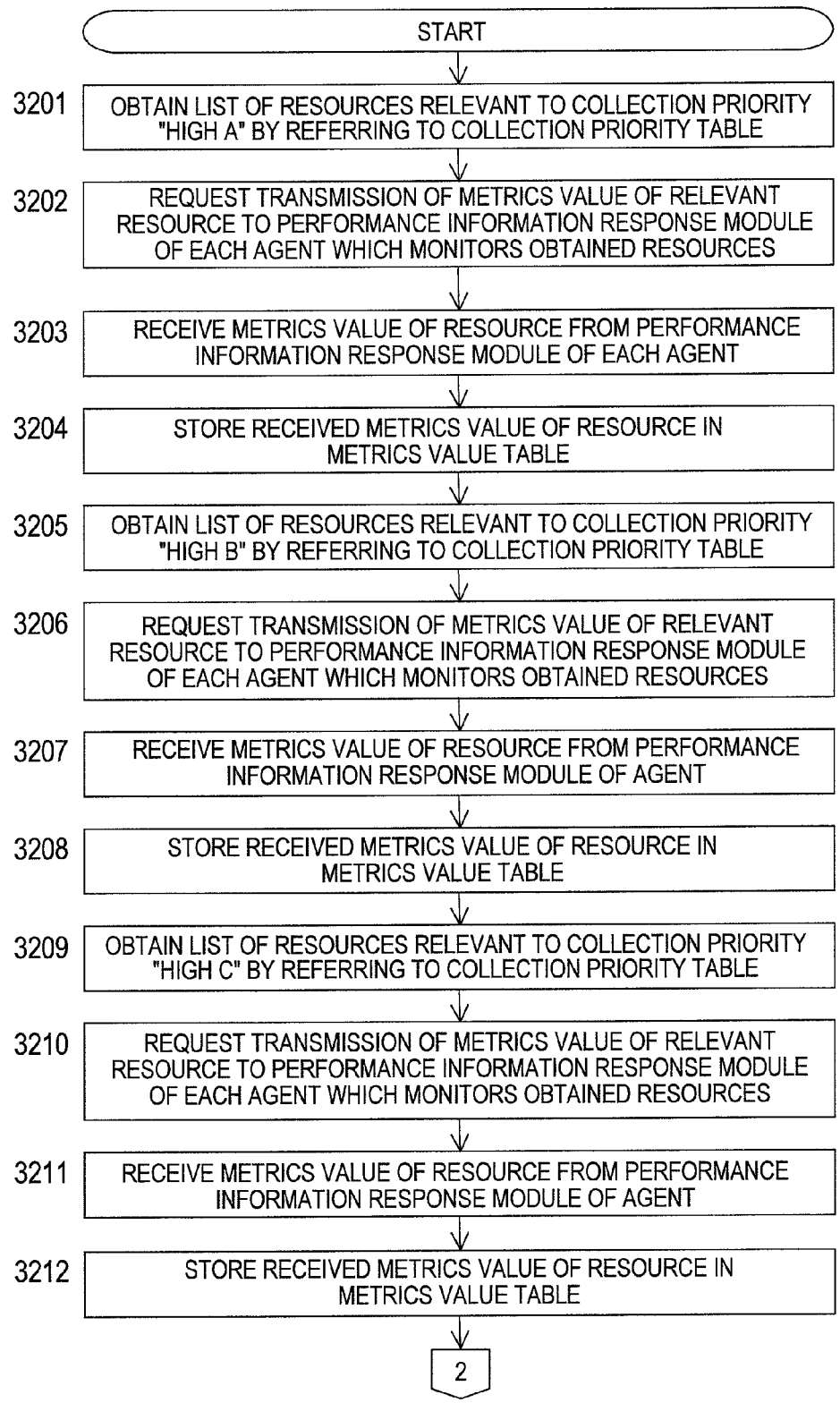
FIG. 32A is a flowchart of processing executed by a performance information collection unit of the storage network performance management software according to the embodiment of this invention.
Figure 32B:
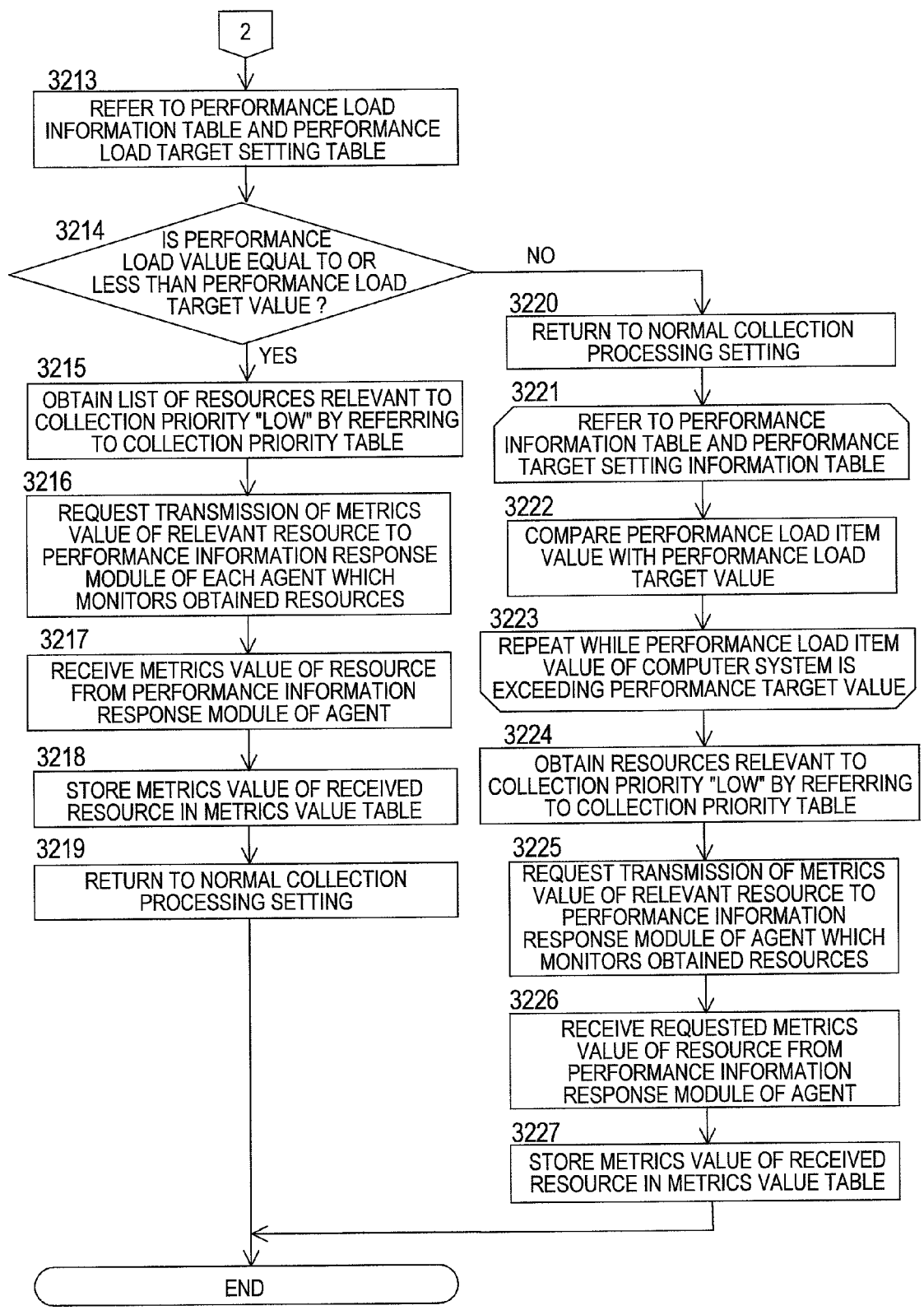
FIG. 32B is a flowchart of processing executed by the performance information collection unit of the storage network performance management software according to the embodiment of this invention.

FIGS. 32A and 32B are flowcharts of processing executed by the performance information collection module 227 of the storage network performance management software 164 according to the embodiment of this invention.

As described above, normally, the storage network performance management software 164 periodically requests transmission of all the metrics values yet to be obtained by the storage network performance management software 164 among the metrics values stored in the metrics value table 213 of the performance information collection agents 206 to 208. However, for example, when such polling is suspended for a long time, the amount of transmission request target metrics values is increased and therefore it is required a long time to obtain them. In such a case, the processings shown in FIGS. 32A and 32B are executed.

First, the performance information collection module 227 refers to the collection priority table 2300 to obtain a list of resource identifiers 2301 of resources to which "High A" is set as collection priority 2302 (3201).

Then, the performance information collection module 227 requests transmission of the metrics values of the resources (resources in which the collection priority 2302 is "High A") to the performance information response module 214 of the performance information collection agents 206 to 208 which monitors the resources indicated by the list obtained in the step 3201 (3202).

The performance information response module 214 that has received the request of the step 3202 reads metrics values regarding the request target resources from the metrics value table 213, and transmits the read metrics values to the performance information collection module 227.

The performance information collection module 227 receives the metrics values regarding the request target resources from the performance information response module 214 (3203).

Next, the performance information collection module 227 stores the metrics values received in the step 3203 in the metrics value table 2100 (3204).

Next, the performance information collection module 227 refers to the collection priority table 2300 to obtain a list of resource identifiers 2301 of resources to which "High B" is set as collection priority 2302 (3205).

Then, the performance information collection module 227 requests transmission of the metrics values of the resources (resources in which the collection priority 2302 is "High B") to the performance information response module 214 of the performance information collection agents 206 to 208 which monitors the resources indicated by the list obtained in the step 3205 (3206).

The performance information response module 214 that has received the request of the step 3206 reads metrics values regarding the request target resources from the metrics value table 213, and transmits the read metrics values to the performance information collection module 227.

The performance information collection module 227 receives the metrics values regarding the request target resources from the performance information response module 214 (3207).

Next, the performance information collection module 227 stores the metrics values received in the step 3207 in the metrics value table 2100 (3208).

Next, the performance information collection module 227 refers to the collection priority table 2300 to obtain a list of resource identifiers 2301 of resources to which "High C" is set as collection priority 2302 (3209).

Then, the performance information collection module 227 requests transmission of the metrics values of the resources (resources in which the collection priority 2302 is "High C") to the performance information response module 214 of the performance information collection agents 206 to 208 which monitors the resources indicated by the list obtained in the step 3209 (3210).

The performance information response module 214 that has received the request of the step 3210 reads metrics values regarding the request target resources from the metrics value table 213, and transmits the read metrics values to the performance information collection module 227.

The performance information collection module 227 receives the metrics values regarding the request target resources from the performance information response module 214 (3211).

Next, the performance information collection module 227 stores the metrics values received in the step 3211 in the metrics value table 2100 (3212).

Thus, the metrics values have been obtained for the resources of relatively high collection priority (in the example, resources to which "High A", "High B", or "High C" is set as collection priority). According to this embodiment, the "High A" indicates highest collection priority. The metrics value regarding the resource to which "High A" is set as collection priority is most preferentially obtained (3201 to 3204).

On the other hand, a metrics value regarding a resource to which relatively low collection priority is assigned (in the example, "LOW") is predicted to be not relatively useful for detecting a performance problem and uncovering a cause of the problem. In reality, however, some of such metrics values may be useful. Accordingly, the performance information collection module 227 obtains a metrics value of a resource of relatively low collection priority after the performance information collection module 227 obtains a metrics value of a resource of relatively high priority (3213 to 3227).

However, a possibility that some of the metrics values of the resources of relatively low collection priority are useful is low. Thus, to prevent interference of a load of obtaining useless metrics values with other processing, the performance information collection module 227 obtains metrics values only when a load of the computer system is low. When a load of the computer system is high, the metrics values may be obtained after the load becomes low (3220 to 3227) or acquisition may be cancelled. If the acquisition is cancelled, the steps 3221 to 3227 are not executed. In the latter case, at a point of time when the processing of FIG. 32A is started, metrics values of resources to which collection priority 2302 is "LOW" among those metrics values stored in the metrics value table 213 are not collected after all.

Processing of the step 3213 and after will be described.

The performance information collection module 227 refers to the performance load information table 2700 and the performance load target setting table 2600 (3213).

Then, the performance information collection module 227 judges whether an actually measured value of a performance load is equal to or less than a value set as a target value of the performance load (3214). The actually measured value of the performance load is registered as a performance item value 2702 of the performance load information table 2700. The target value of the performance load is registered as a performance item target value 2602 of the performance load target setting table 2600.

If it is judged in the step 3214 that the actually measured performance load is equal to or less than the target value, there is room for performance in the computer system. In other words, in this case, even when processing of obtaining metrics values is further executed, a possibility of interference with other processing executed by the computer system is low. Accordingly, in this case, the performance information collection module 227 refers to the collection priority table 2300 to obtain a list of resource identifiers 2301 of the resources to which "LOW" is registered as collection priority 2302 (3215).

Then, the performance information collection module 227 requests transmission of the metrics values of the resources (resources in which the collection priority 2302 is "LOW") to the performance information response module 214 of the performance information collection agents 206 to 208 which monitors the resources indicated by the list obtained in the step 3215 (3216).

The performance information response module 214 that has received the request of the step 3216 reads metrics values regarding the request target resources from the metrics value table 213, and transmits the read metrics values to the performance information collection module 227.

The performance information collection module 227 receives the metrics values regarding the request target resources from the performance information response module 214 (3217).

Next, the performance information collection module 227 stores the metrics values received in the step 3217 in the metrics value table 2100 (3218).

When the step 3218 is finished, at least the metrics values stored in the metrics value table 213 at the time of starting the processing of FIG. 32A have all been stored in the metrics value table 2100. Thereafter, normal collection processing is executed (3219), and the performance information collection module 227 finishes the processing shown in FIGS. 32A and 32B. The normal processing is processing in which the performance information collection module 227 requests transmission of all the unobtained metrics values.

On the other hand, if it is judged in the step 3214 that the actually measured performance load is equal to or less than the target value, there is no room for performance in the computer system. In other words, in this case, when processing of obtaining metrics values is further executed, a possibility of interference with other processing executed by the computer system is high. Thus, in this case, even when metrics values regarding the resources to which collection priority 2302 is "LOW" have not been collected, execution of normal collection processing is first started (3220).

However, the metrics values stored in the metrics value table 213 corresponding to the collection priority "LOW" are not targets of the normal collection processing of the step 3220. Those metrics values are sequentially obtained by processing of the step 3221 and after.

Subsequently, the performance information collection module 227 refers to the performance load information table 2700 and the performance load target setting table 2600 (3221).

Then, as in the case of the step 3214, the performance information collection module 227 compares the actually measured value of the performance load with the value set as the target value of the performance load (3222). The performance information collection module 227 repeats the steps 3221 and 3222 until the actually measured value of the performance load becomes equal to or less than the value set as the target value of the performance load (3223).

When the actually measured value of the performance load becomes equal to or less than the value set as the target value of the performance load, the performance information collection module 227 refers to the collection priority table 2300. Then, the performance information collection module 227 obtains a list of resource identifiers 2301 of the resources to which "LOW" is registered as collection priority 2302 (3224).

Then, the performance information collection module 227 requests transmission of the metrics values of the resources (resources in which the collection priority 2302 is "LOW") to the performance information response module 214 of the performance information collection agents 206 to 208 which monitors the resources indicated by the list obtained in the step 3224 (3225).

The performance information response module 214 that has received the request of the step 3216 reads metrics values regarding the request target resources from the metrics value table 213, and transmits the read metrics values to the performance information collection module 227.

The performance information collection module 227 receives the metrics values regarding the request target resources from the performance information response module 214 (3226).

Next, the performance information collection module 227 stores the metrics values received in the step 3226 in the metrics value table 2100 (3227).

Thus, the performance information collection module 227 finishes the processings shown in FIGS. 32A and 32B.

As described above, according to the processings of FIGS. 32A and 32B, the performance information collection module 227 obtains the metrics values of the resources of high collection priority in preference to those of the resources of low collection priority. The metrics values of the resources of low collection priority may not be obtained after all, or may be obtained later when the load of the computer system is low (in other words, when there is room for performance of the computer system).

Next, referring to FIGS. 33 to 35, processing executed by the metrics value deletion module 218 of the performance information collection agents 206 to 208 will be described.

The performance information collection agents 206 to 208 store metrics values obtained from the management target storage network hardware/software components 201 to 203 in the metrics value table 213.

However, as there is a limit on a capacity of the volumes managed by the performance information collection agents 206 to 208, the metrics values exceeding a predetermined data amount cannot be stored in the metrics value table 213. Accordingly, when stored data reaches an upper limit of the storage capacity, the stored metrics values must be deleted to store more metrics values.

The metrics values that have been transmitted from the performance information response module 214 to the storage network performance management software 164 may be deleted from the metrics value table 213 as those metrics values are stored in the metrics value table 228 of the storage network performance management software 164. However, if metrics values that have not been transmitted to the storage network performance management software 164 are deleted, a chance for the storage network performance management software 164 to obtain the deleted metrics values is lost. As a result, the storage network performance management software 164 cannot detect a performance problem or investigate its cause based on the deleted metrics values. Accordingly, it is not preferable to delete the metrics values which have not been transmitted to the storage network performance management software 164 from the metrics value table 213.

However, for example, when an execution interval of polling by the storage network performance management software 164 becomes longer due to a fault or the like of the computer system, a need may arise to delete the metrics values which have not been obtained by the storage network performance management software 164 from the metrics value table 213. In such a case, the metrics value deletion module 218 of this embodiment selects metrics values assumed to be relatively low in use from the metrics values stored in the metrics value table 213, and preferentially deletes the selected metrics values.

The metrics value deletion module 218 compares the amount of stored data with a predetermined threshold value to judge whether to start processing of deleting the metrics values. Further, after the start of the processing of deleting the metrics values, the metrics value deletion module 218 compares the amount of stored data with a predetermined threshold value to judge whether to finish the processing. The former and latter threshold values may be equal, or different.

Figure 33:
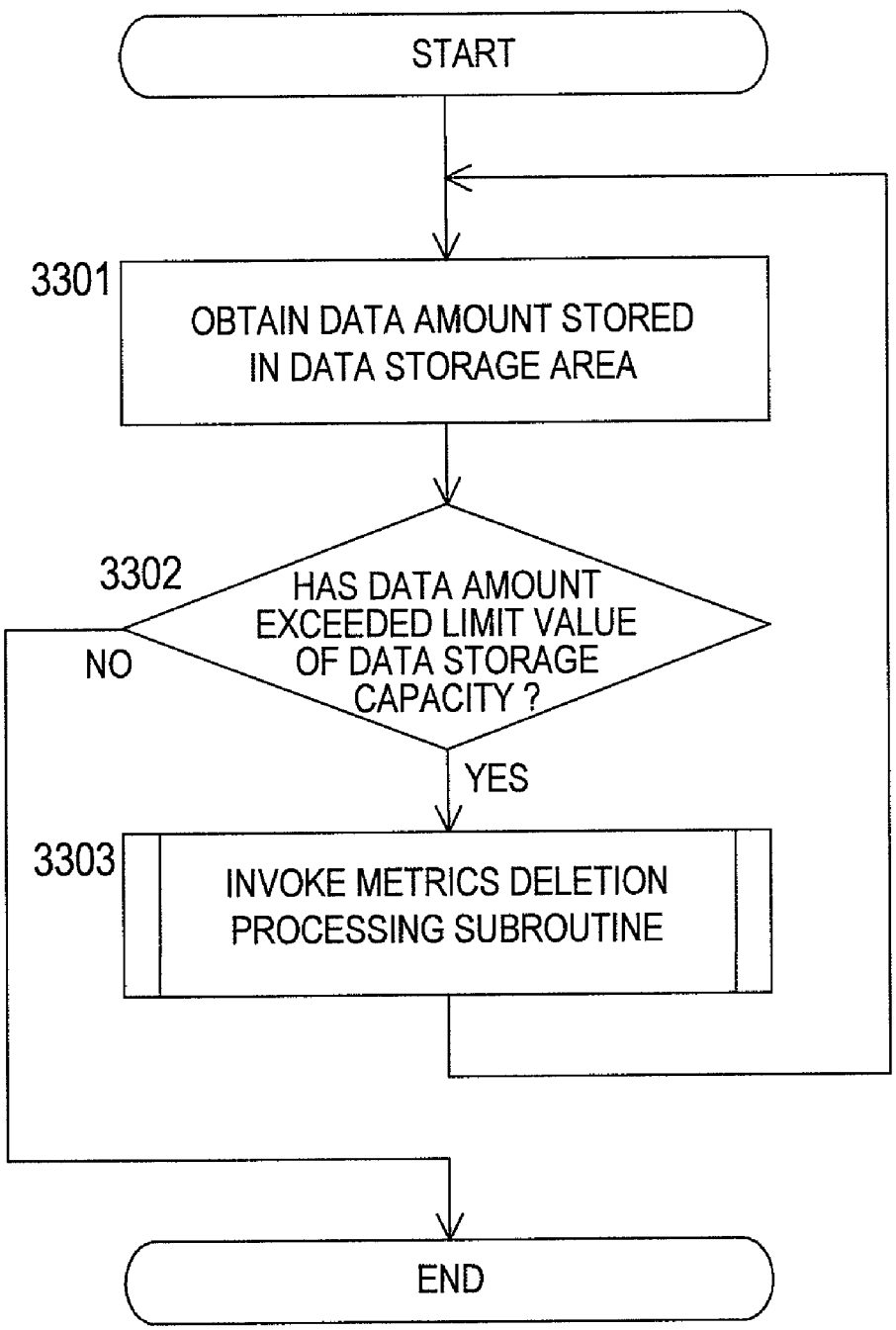
FIG. 33 is a flowchart of processing executed by a metrics value deletion unit according to the embodiment of this invention.

FIG. 33 shows processing when the former and latter threshold values are equal. On the other hand, FIG. 34 shows processing when the former and latter threshold values are different. FIG. 35 shows a common subroutine executed in both cases.

FIG. 33 is a flowchart of first processing executed by the metrics value deletion module 218 according to the embodiment of this invention.

First, the metrics value deletion module 218 obtains the amount of data stored in the data storage area managed by each of the performance information collection agents 206 to 208 (3301).

Then, the metrics value deletion module 218 judges whether the data amount obtained in the step 3301 exceeds a limit value of a storage capacity of the data storage area managed by each of the performance information collection agents 206 to 208 (3302). Here, the limit value of the storage capacity is a predetermined threshold value. As long as the limit value does not exceed the storage capacity of the data storage area, an optional value (e.g., 70% of storage capacity) can be set as the limit value.

If it is judged in the step 3302 that the data amount exceeds the limit value, a free area of the data storage area must be secured by deleting the metrics values. Accordingly, the metrics value deletion module 218 invokes the metrics value deletion processing subroutine (3303). The metrics value deletion processing subroutine will be described below referring to FIG. 35.

On the other hand, if it is judged in the step 3302 that the data amount does not exceed the limit value, it is not necessary to delete any metrics values since there is a sufficient free area in the data storage area. Thus, the metrics value deletion module 218 finishes the processing.

Figure 34:
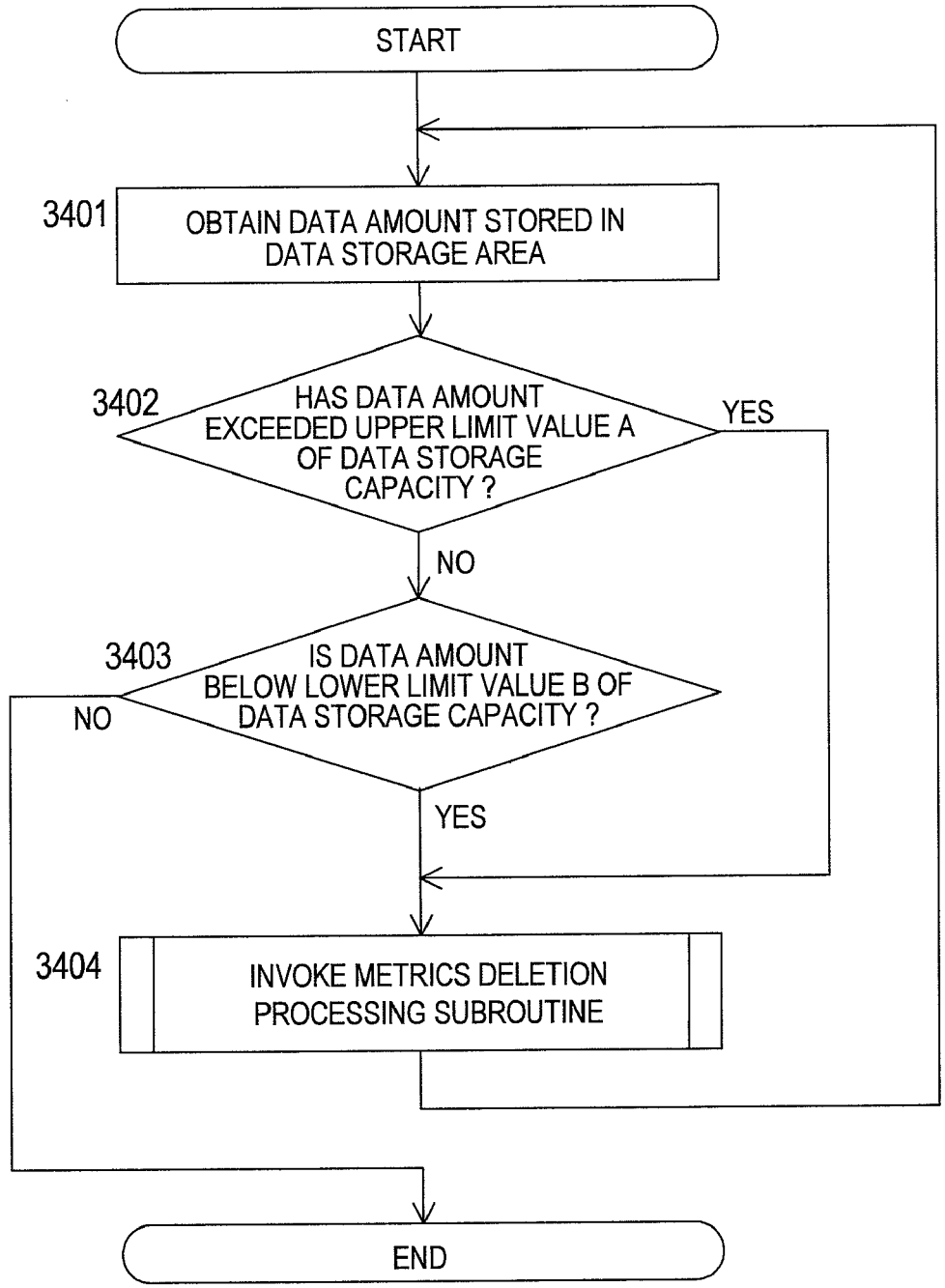
FIG. 34 is a flowchart of another processing executed by the metrics value deletion unit according to the embodiment of this invention.

FIG. 34 is a flowchart of second processing executed by the metrics value deletion module 218 according to the embodiment of this invention.

First, the metrics value deletion module 218 obtains the amount of data stored in the data storage area managed by each of the performance information collection agents 206 to 208 (3401).

Then, the metrics value deletion module 218 judges whether the data amount obtained in the step 3401 exceeds an upper limit value A of a storage capacity of the data storage area managed by each of the performance information collection agents 206 to 208 (3402). Here, the upper limit value A of the storage capacity is a predetermined threshold value. As long as the upper limit value A does not exceed the storage capacity of the data storage area, an optional value (e.g., 70% of storage capacity) can be set as the upper limit value A.

If it is judged in the step 3402 that the data amount exceeds the upper limit value A, a free area of the data storage area must be secured by deleting the metrics values. Accordingly, the metrics value deletion module 218 invokes the metrics value deletion processing subroutine (3404). The metrics value deletion processing subroutine will be described below referring to FIG. 35.

On the other hand, if it is judged in the step 3402 that the data amount does not exceed the upper limit value A, the metrics value deletion module 218 judges whether the data amount obtained in the step 3401 is below a lower limit value B of the storage capacity of the data storage area managed by each of the performance information collection agents 206 to 208 (3403).

The lower limit value B of the storage capacity is a predetermined threshold value. As long as the lower limit value B does not exceed the storage capacity of the data storage area, an optional value can be set as the lower limit value B. However, the lower limit value B must be smaller than the upper limit value A. For example, when the upper limit value A is 70% of the storage capacity, the lower limit value B may be 60% of the storage capacity.

If it is judged in the step 3403 that the data amount is below the lower limit value B, a free area of the data storage area must be secured by deleting the metrics values. Accordingly, the metrics value deletion module 218 invokes the metrics value deletion processing subroutine (3404).

On the other hand, if it is judged in the step 3403 that the data amount is not below the lower limit value B, it is not necessary to delete any metrics values as there is a sufficient free area in the data storage area. Thus, the metrics value deletion module 218 finishes the processing.

As shown in FIG. 33, when one threshold value is used, deletion processing of metrics values may be frequently performed. For example, when the limit value is 70% of the storage capacity, if the data mount even slightly drops below 70% of the storage capacity due to deletion of the metrics values, the metrics value deletion processing is finished. However, when the data amount subsequently increases to be slightly above 70% of the storage capacity, the metrics value deletion processing is started again. As a result, the metrics value deletion processing may be started at short intervals.

On the other hand, as shown in FIG. 34, when two threshold values are used, for example, metrics value deletion processing is started when the data amount exceeds 70% of the storage capacity. When the data amount drops below 60% of the storage capacity, the metrics value deletion processing is finished. Then, the metrics value deletion processing is not started until the data amount again exceeds 70% of the storage capacity. As a result, as it is possible to prevent starting of metrics value deletion processing at short intervals, a load of the computer system is reduced.

Figure 35:
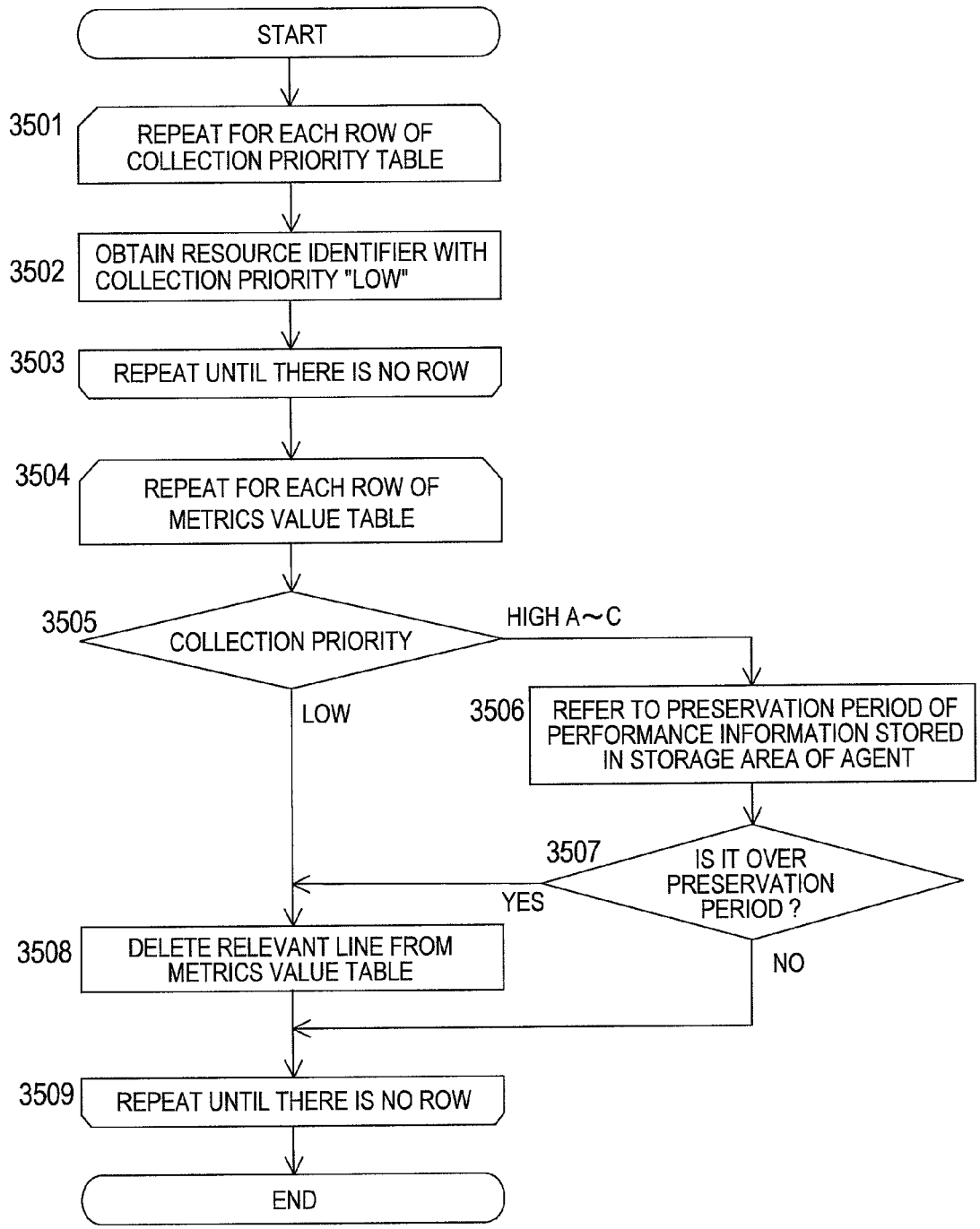
FIG. 35 is a flowchart of a metrics value deletion processing subroutine executed by the metrics value deletion unit according to the embodiment of this invention.

FIG. 35 is a flowchart of the metrics value deletion processing subroutine executed by the metrics value deletion module 218 according to the embodiment of this invention.

The processing of FIG. 35 is executed in the step 3303 of FIG. 33 and the step 3404 of FIG. 34.

First, the metrics value deletion module 218 refers to the collection priority table 219 to obtain a resource identifier of a row of low collection priority ("LOW") (3501 to 3503). For example, the metrics value deletion module 218 of the SAN switch performance information collection agent 144 refers to the collection priority table 1500 to obtain resource identifiers "PORT D", "PORT H", and "PORT I" of a row in which collection priority 1502 is "LOW".

Then, the metrics value deletion module 218 judges whether collection priority is high for each row (3504) of the metrics value table 213 (3505). For example, when collection priority is one of "High A", "High B", and "High C", collection priority is judged to be high. When collection priority is "LOW", collection priority is judged to be low. Taking examples of the metrics value table 1300 and the collection priority table 1500, a row of the metrics value table 1300 regarding the port C in which collection priority 1500 is "High B" is judged to be high in collection priority. A row of the metrics value table 1300 regarding the port D in which collection priority 1500 is "LOW" is judged to be low in collection priority.

If it is judged in the step 3505 that collection priority is low, a metrics value of this row is predicted to be relatively low in use. Accordingly, the metrics value deletion module 218 deletes the row judged to be low in collection priority from the metrics value table 213 (3508).

On the other hand, if it is judged in the step 3505 that collection priority is high, a metrics value of the row is predicted to be relatively high in use. However, if a predetermined preservation period has passed from the acquisition of the row to the present, the row can be deleted. Thus, the metrics value deletion module 218 refers to a predetermined preservation period of performance information (3506). This preservation period is stored in the storage area managed by each of the performance information collection agents 206 to 208.

Then, the metrics value deletion module 218 judges whether the row of the processing target has passed the preservation period referred to in the step 3506 (3507). Specifically, the metrics value deletion module 218 judges whether a period from the date/time (e.g., date/time 1301) registered in the row of the processing target to the present is over the preservation period referred to in the step 3506.

If it is judged in the step 3507 that the preservation period is over, the row of the processing target is deleted from the metrics value table 213 (3508).

On the other hand, if it is judged in the step 3507 that the preservation period is not over, the row of the processing target is not deleted from the metrics value table 213.

After execution of the processing of the steps 3505 to 3508 for all the rows of the metrics value table 213 (3509), the metrics value deletion processing subroutine is finished.

Thus, according to the embodiment of this invention, the storage network performance management software 164 decides a sequence of obtaining metrics values based on the obtained metrics values when the performance information collection agents 206 to 208 hold great volumes of metrics values to be obtained. Specifically, the storage network performance management software 164 sets collection priority on resources based on the obtained metrics values. Then, the storage network performance management software 164 obtains metrics values of the resources to which high collection priority is assigned in preference to those of the resources to which low collection priority is assigned.

The collection priority is assigned so that metrics values useful for detecting an occurrence of a performance problem (e.g., deterioration of performance from predetermined threshold value) and uncovering its cause can preferentially be obtained. For example, a metrics value of a resource to which a possibility of a current occurrence of a performance problem is high is supposed to be relatively useful for uncovering an occurrence of a performance problem (e.g., performance drops below predetermined threshold value). Accordingly, high collection priority is assigned on such a resource. A metrics value of a resource having a performance dependent relation with the resource of the high possibility that a performance problem currently occurs is supposed to be useful for uncovering a cause of the performance problem. Thus, high collection priority is assigned on such a resource.

Thus, by preferentially obtaining the metrics values supposed to be relatively useful, even when a great volume of metrics values to be obtained is present, it is possible to quickly detect a fault or the like of the computer system. Then, the storage network performance management software 164 does not need to obtain metrics values supposed to be relatively useless (i.e., metrics values of resources to which low collection priority is assigned) after all, or may obtain those metrics values when a load of the computer system is low.

When newly obtained metrics values cannot be stored because of a limit of the storage capacity, the performance information collection agents 206 to 208 delete the metrics values supposed to be relatively useless among the stored metrics values. As a result, it is possible to prevent deletion of metrics values supposed to be relatively useful.

What is claimed is:

1. A computer system, comprising:
a host computer;
a storage system coupled to the host computer via a network; and
a management computer coupled to the host computer and to the storage system, wherein:
the host computer includes a first interface coupled to the network, a first processor coupled to the first interface, and a first memory coupled to the first processor;
the storage system includes a physical storage device for storing data written by the host computer;
the management computer includes a second interface coupled to the host computer and to the storage system, a second processor coupled to the second interface, and a second memory coupled to the second processor; and
the management computer:
collects performance information at a first collection time among a plurality of collection times separated from one another by fixed intervals, said performance information indicating performance of resources included in at least one of the host computer, the storage system, and the network, said collecting being performed in a first sequence set based on performance information obtained before the first collection time, which first sequence determines the order of collection of the performance information from each of the resources, wherein the sequence of collection determines the performance information of the resource to be collected first and the sequence of collection of the resources to be collected thereafter, from the performance information collected from all of the resources based on said first sequence after the first collection time, assigns new priorities to the resources based on changes of value of the performance information for the resources obtained after the first collection time compared with the performance information obtained before the first collection time, the new priorities being collection priority for deciding a second sequence of collecting the performance information for each of the resources at a second collection time among said plurality of collection times, and collects the performance information of the resource assigned a first priority at said second collection time in preference to the performance information of the resource assigned a second priority lower than the first priority, wherein the assignment of the first priority and second priority is based on the change of value after the first collection time and before the second collection time of the already obtained performance information for the resource assigned the first priority being greater than the change of value of the already obtained performance information for the resource assigned the second priority; and obtains information on loads measured in the computer system, judges whether a value of the obtained information on loads exceeds a predetermined value of load information after obtaining the performance information of the resource assigned the first priority; and obtains the performance information of the resource assigned the second priority, when the value of the obtained information on loads does not exceed the predetermined value of load information.

2. The computer system according to claim 1, wherein, when a value of the obtained performance information exceeds a predetermined threshold value, the management computer assigns the first priority to the resource corresponding to the value of the performance information which has exceeded the predetermined threshold value.

3. The computer system according to claim 1, wherein the management computer:
predicts current value of the performance information based on the already obtained performance information; and
assigns, when the predicted current value exceeds a threshold value, the first priority to the resource corresponding to the predicted current value of the performance information exceeding the predetermined threshold value.

4. The computer system according to claim 1, wherein the management computer:
calculates a rate of change of a value of the performance information based on the already obtained performance information; and
assigns, when the calculated rate of change exceeds a predetermined rate, the first priority to the resource corresponding to the performance information whose rate of change exceeds the predetermined rate.

5. The computer system according to claim 1, wherein the management computer:
receives a notification indicating that a value of the performance information of the resource has exceeded the predetermined threshold value; and
assigns the first priority to the resource indicated by the received notification.

6. The computer system according to claim 1, further comprising a performance information collection computer, wherein:
the performance information collection computer includes a third interface coupled to the management computer, a third processor coupled to the third interface, and a third memory coupled to the third processor;
the management computer transmits information indicating the priority assigned to the resources to the performance information collection computer; and
the performance information collection computer:
obtains the pieces of performance information of the resources;
holds the obtained pieces of performance information;
transmits the held pieces of performance information in response to a request from the management computer; and
deletes the performance information of the resource assigned the second priority from the held pieces of performance information, upon reception, from the management computer, of the information indicating the priority assigned to the resources.

7. The computer system according to claim 1, wherein:
the management computer transmits information indicating priority assigned to the resources to the host computer; and
the host computer:
obtains the pieces of performance information of the resources;
holds the obtained pieces of performance information;
transmits the held pieces of performance information in response to a request from the management computer; and
deletes the performance information of the resource assigned the second priority from the held pieces of performance information, upon reception, from the management computer, of the information indicating the priority assigned to the resources.

8. The computer system according to claim 1, wherein the management computer assigns the first priority to the resource which has a dependence relation in performance with the resource assigned the first priority.

9. The computer system according to claim 1, wherein the change of the value of the performance information of the resource assigned the second priority exhibits substantially neither increase nor decrease.

10. The computer system according to claim 1, wherein, if operation of the management computer is suspended between the first collection time and the second collection time, and then operation of the management computer is resumed, said management computer completes collecting performance information based on said first sequence after operation is resumed, and then assigns the new priorities based on said changes of value of said performance information.

11. A method of controlling computer system, which includes a host computer, a storage system coupled to the host computer via a network, and a management computer coupled to the host computer and to the storage system, wherein the host computer includes a first interface coupled to the network, a first processor coupled to the first interface, and a first memory coupled to the first processor, the storage system includes a physical storage device for storing data written by the host computer, and the management computer includes a second interface coupled to the host computer and to the storage system, a second processor coupled to the second interface, and a second memory coupled to the second processor; and the method comprising:

collecting performance information at a first collection time among a plurality of collection times separated from one another by fixed intervals, said performance information indicating performance of resources included in at least one of the host computer, the storage system, and the network in a first sequence set based on already obtained performance information which first sequence determines the order of collection of the performance information from each of the resources, wherein the sequence of collection determines the performance information of the resource to be collected first and the sequence of collection of the resources to be collected thereafter, following collection of the performance information from all of the resources based on said first sequence, assigning priorities to the resources based on changes of value of the already obtained performance information for the resources, the priority being collection priority for deciding a second sequence of obtaining the performance information for each of the resources at a second collection time among said plurality of collection times, and obtains the performance information of the resource assigned a first priority at said second collection time in preference to the performance information of the resource assigned a second priority lower than the first priority, wherein the assignment of the first priority and second priority is based on the change of value after the first collection time and before the second collection time of the already obtained performance information for the resource assigned the first priority being greater than the change of value of the already obtained performance information for the resource assigned the second priority;

obtaining information on loads measured in the computer system, and judging whether a value of the obtained information on loads exceeds a predetermined value of load information after obtaining the performance information of the resource assigned the first priority; and obtaining the performance information of the resource assigned the second priority, when the value of the obtained information on loads does not exceed the predetermined value of load information.

12. The method according to claim 11, further comprising, when a value of the already obtained performance information has exceeded a predetermined threshold value, assigning the first priority to the resource corresponding to the value of the performance information which has exceeded the predetermined threshold value.

13. The method according to claim 11, further comprising:
predicting current value of performance information based on the already obtained performance information; and
assigning, when the predicted current value exceeds a threshold value, the first priority to the resource corresponding to the predicted current value of the performance information exceeding the predetermined threshold value.

14. The method according to claim 11, further comprising:
calculating a rate of change of a value of the performance information based on the already obtained performance information; and
assigning, when the calculated rate of change exceeds a predetermined rate, the first priority to the resource corresponding to the performance information whose rate of change exceeds the predetermined rate.

15. The method according to claim 11, further comprising:
receiving, by the management computer, a notification indicating that a value of the performance information of the resource has exceeded the predetermined threshold value; and
assigning, by the management computer, the first priority to the resource indicated by the received notification.

16. The method according to claim 11, the computer system further comprising a performance information collection computer,
the performance information collection computer including a third interface coupled to the management computer, a third processor coupled to the third interface, and a third memory coupled to the third processor,
the method further comprising:
transmitting, by the management computer, information indicating the priority assigned to the resources to the performance information collection computer;
obtaining, by the performance information collection computer, the pieces of performance information of the resources;
holding, by the performance information collection computer, the obtained pieces of performance information;
transmitting, by the performance information collection computer, the held pieces of performance information in response to a request from the management computer; and
deleting, by the performance information collection computer, the performance information of the resource assigned the second priority from the held pieces of performance information upon reception, from the management computer, of the information indicating the priority assigned to the resources.

17. The method according to claim 11, further comprising:
transmitting by the management computer, information indicating the priority assigned to the resources to the host computer;
obtaining, by the host computer, the pieces of performance information of the resources;
holding, by the host computer, the obtained pieces of performance information;
transmitting, by the host computer, the held pieces of performance information in response to a request from the management computer; and
deleting, by the host computer, the performance information of the resource assigned the second priority from the held pieces of performance information upon reception, from the management computer, of the information indicating the priority assigned to the resources.

18. The method according to claim 11, further comprising assigning the first priority to the resource which has a dependence relation in performance with the resource assigned the first priority.

19. The method according to claim 11, wherein the change of the value of the performance information of the resource assigned the second priority exhibits substantially neither increase nor decrease.

20. The method of controlling computer system according to claim 11, wherein, if operation of the management computer is suspended between the first collection time and the second collection time, and then operation of said management computer is resumed, said method further comprises completing collecting performance information based on said first sequence after operation is resumed, and then assigns the new priorities based on said changes of value of said performance information.

* * * * *